US008615414B2

(12) United States Patent
Voccola

(10) Patent No.: US 8,615,414 B2
(45) Date of Patent: Dec. 24, 2013

(54) APPARATUS AND METHOD FOR OPTIMIZING INSURANCE POLICIES

(75) Inventor: Frederick J. Voccola, New York, NY (US)

(73) Assignee: T.R.U.S.T. Technology Solutions LLC, New York, NY (US)

( * ) Notice: Subject to any disclaimer, the term of this patent is extended or adjusted under 35 U.S.C. 154(b) by 158 days.

(21) Appl. No.: 13/116,197

(22) Filed: May 26, 2011

(65) Prior Publication Data

US 2012/0232935 A1 Sep. 13, 2012

Related U.S. Application Data

(63) Continuation-in-part of application No. 13/043,317, filed on Mar. 8, 2011.

(30) Foreign Application Priority Data

Mar. 21, 2011 (EP) ..................................... 11158962

(51) Int. Cl.
G06Q 40/00 (2012.01)
(52) U.S. Cl.
USPC ............................................................ 705/4
(58) Field of Classification Search
USPC ............................................................ 705/4
See application file for complete search history.

(56) References Cited

U.S. PATENT DOCUMENTS 5,704,044 A * 12/1997 Tarter et al. ........................ 705/4
7,155,409 B1    12/2006 Stroh
7,418,424 B2 *   8/2008 Martin et al. ................... 705/37

(Continued)

FOREIGN PATENT DOCUMENTS

| AU | 2006200832 | * | 2/2006 |
|---|---|---|---|
| WO | 0126017 | | 4/2001 |
| WO | WO 01/98914 | * | 12/2001 |

OTHER PUBLICATIONS

Jose Riestra, A. S.: Credit Insurance in Europe—Impact, Measurement & Policy Recommendations, Feb. 2003, Center for European Policy Studies, pp. 1-62.*

(Continued)

*Primary Examiner* — Bijendra K Shrestha
(74) *Attorney, Agent, or Firm* — Blank Rome LLP

(57) ABSTRACT

An apparatus and method for optimizing insurance policies are disclosed. The apparatus and method include a processing device that is configured to import the various terms and conditions from one or more insurer systems and to import accounts receivable information from one or more customer systems, the processing device being in electronic data communication with the one or more insurer systems and the one or more customer systems via a network connection; a compliance module that is configured to instruct the processing device to import the various terms and conditions from the one or more insurer systems, to import the accounts receivable information from the one or more customer systems, to identify overdue accounts receivable and time periods for which those accounts receivable have been overdue, and to compare the terms and conditions to the time periods to determine if the customer is not in compliance with any of one of the various terms and conditions, and to generate an alert when the customer is not in compliance with any one of the various terms and conditions; and a graphical user interface in electronic data communication with the processing device that is configured to generate a graphical display that includes the overdue accounts receivable identified by the processing device.

22 Claims, 30 Drawing Sheets

(56) References Cited

U.S. PATENT DOCUMENTS

| | | | |
|---|---|---|---|
| 7,747,695 B1* | 6/2010 | Morris et al. | 709/206 |
| 7,877,269 B2 | 1/2011 | Bauer et al. | |
| 8,073,715 B1 | 12/2011 | Smith | |
| 2002/0042763 A1* | 4/2002 | Pillay et al. | 705/35 |
| 2002/0138388 A1 | 9/2002 | Reiss | |
| 2002/0152098 A1 | 10/2002 | Evans et al. | |
| 2003/0083916 A1* | 5/2003 | Tracey et al. | 705/7 |
| 2004/0024692 A1 | 2/2004 | Turbeville et al. | |
| 2004/0039623 A1* | 2/2004 | Setteducati | 705/8 |
| 2004/0054621 A1 | 3/2004 | Bretvin | |
| 2004/0254816 A1 | 12/2004 | Myers | |
| 2005/0240517 A1 | 10/2005 | Wolzenski et al. | |
| 2007/0067236 A1* | 3/2007 | Deinhardt et al. | 705/39 |
| 2008/0109128 A1 | 5/2008 | Littooy et al. | |
| 2008/0275737 A1 | 11/2008 | Gentry et al. | |
| 2010/0010828 A1 | 1/2010 | Gupta | |
| 2010/0223172 A1* | 9/2010 | Donnelly et al. | 705/34 |
| 2012/0290315 A1* | 11/2012 | Zadoorian et al. | 705/2 |

OTHER PUBLICATIONS

Ramsey, Colin M.: An Introduction to Business Credit Insurance, 1993, Transactions of Society of Actuaries, vol. 45, pp. 275-303.*
European Search Report dated May 14, 2012.
Office Action dated Sep. 20, 2012.

* cited by examiner

|  | Insurer A | Insurer B | Insurer C | Insurer D | Insurer E | Insurer F |
|---|---|---|---|---|---|---|
| Date Submitted | 03/03/2010 | 03/06/2010 | 05/12/2010 | 05/11/2010 | 05/12/2010 | 04/04/2010 |
| Date of Quote | 04/14/2010 | 05/25/2010 | 05/26/2010 | 05/25/2010 | 05/25/2010 | 05/25/2010 |
| Carrier Agrees to Quote? | Yes | Yes | Yes | Yes | No | Yes |
| Attach/View Quote | Attach | Attach | Attach | Attach | Attach | Attach |
| Policy Type | Named + DCL | Named + DCL | Named + DCL | Named + DCL | N/A | Named |
| Is Policy Cancellable? | No | Yes | Yes | No | N/A | Yes |
| Covered Sales | $400,000,000 | $400,000,000 | $400,000,000 | $400,000,000 | $0 | $400,000,000 |
| NQL | $100,000 | $50,000 | $50,000 | $200,000 | $0 | $0 |
| DCL | $1,500,000 Single $10,000,000 Aggregate | $100,000 Single $1,000,000 Aggregate | $100,000 Single $700,000 Aggregate | $2,000,000 Single $7,000,000 Aggregate | N/A | N/A |
| Premium | $5,000,000 | $8,000,000 | $6,500,000 | $4,500,000 | $0 | $15,000,000 |
| Premium Rate | 13 bps | 20 bps | 16 bps | 11 bps | N/A | 38 bps |
| Deductible | $750,000 | $550,000 | $550,000 | $2,000,000 | $0 | $0 |
| Deductible Rate | 2 bps | 1 bps | 1 bps | 5 bps | N/A | N/A |
| Coinsurance Rate | 10% | 15% | 15% | 15% | 0% | 0% |
| Attach/View Coverage List | Attach | Attach | Attach | Attach | Attach | Attach |
| Structure/Quote Comments |  | Non-cancellation on all the policies presents somewhat of a risk. Insurer B is often strong in this market and they have a good deal of information on the industry as a whole. | B/c this policy is cancellable and your top concerns are your top 15 Named Debtors, which make up 50% of your sales, this policy is not optimal for your risks at this time. But if you determine you want a cancellable policy, this policy is the best choice b/c Insurer B is the most aggressive on coverages. | This is a very aggressive RISK SHARING structure. | Insurer E declined to comment due to industry and sector risks. | We do not recommend this policy if you want a low-cost, high-risk sharing type of structure |
| System Recommendation | This is a strong policy b/c it is non-cancellable, less expensive, and the DCL is higher. And the functionality of this system will ensure you stay in compliance so your claims will be paid. Considering the loss history of your firm, this is the best option. |  |  |  |  | This policy is the most expensive but provides the most protection. It requires zero deductible and zero coinsurance. However, it is cancellable, and Insurer F has substantial resources in this industry. So the likelihood of cancellation for lack of info is minimal. |

FIGURE 6

| % Coverage | AR Range | Coverage Type | Region | Country |
|---|---|---|---|---|
| 100 | All | Account Cover - Customer Submitted | All | All |

GAP REPORT

During registration, you and your account manager discussed a number of goals with which you want your credit insurance policy to comply. Listed below are each goal as you described it to your account manager. How your policies are complying with this goal, and a list of debtors that are causing any discrepancy between the goal and actual performance.

Goal: 100% — 808

The stated goal is to have 100% of accounts covered for the debtors you submitted to FGI TRUST.

Actual: 44.4% — 806

As of today, this goal is 44.4% compliant. The debtors who are not covered in accordance with the goal are listed below.

| Customer-Defined Account Cover Gap Summary | | | |
|---|---|---|---|
| Debtor Name | Recent AR | Requested Coverage | Actual Coverage | Notes |
| Debtor A | $239,998 | $250,000 | $0 | |
| Debtor B | $34,297 | $60,000 | $0 | |
| Debtor C | $95,690 | $100,000 | $100,000 | Not In Compliance |
| Debtor D | $125,000 | $0 | $0 | |
| Debtor E | $74,330 | $75,000 | $100,000 | Not In Compliance |

FIGURE 8

EVENT LIST

| | EVENT |
|---|---|
| 1 | Add Debtor |
| 2 | Cancellation of Coverage |
| 3 | Change in Policy Structure |
| 4 | Change in Policy Endorsement |
| 5 | Claim Filed |
| 6 | Claim Inquiry |
| 7 | DCL Account Audit |
| 8 | Decrease in Coverage |
| 9 | Debtor Not Covered |
| 10 | Denial of Claim |
| 11 | Disputed Invoice |
| 12 | Go to Market |

Add  Edit  Delete 1102  1104  1106

FIGURE 11

NEW EVENT

Event Name  Description of Event 1202  1204

Submit

FIGURE 12  1206

ACTION DEFINITION

Event: Debtor Not Covered

| Reason 1308 | Debtor Type 1314 | Maximum Credit Limit 1320 |
|---|---|---|
| Does Not Qualify ▼ | All ▼ | N/A ▼ |
| Carrier 1310 | Coverage Type 1316 | Debtor Region 1322 |
| Insurer C ▼ | DCL ▼ | North America ▼ |
| Broker 1312 | Minimum Credit Limit | Debtor Country 1324 |
| Broker F ▼ | $ 0 ▼ 1318 | United States ▼ |

Minimum AR Balance — Maximum AR Balance

1326 — $ 0 ▼ — $25,000 ▼ — 1328

Response Process
Obtain New Coverage — 1330

Milestone: Does Customer Want to Obtain New Coverage?

Activity: A

Description:
Contact customer and discuss coverage gap identified in Gap Report. — 1332

Question:
Did the customer grant permission to obtain coverage for the debtor that does not qualify for coverage? — 1334

Answer: | Result:
Yes ▼ | Identify Potential Insurers — 1338

Expected Duration:
1336 — 2 Days — 1348

Add Answer
1340

Answer Text
No — 1344

Result of this Answer Being Chosen
Begin New Action ▼
Begin New Activity
1346 — Begin New Milestone
Close Action - Failure
Close Action - Success
Close Action - Other

| Delete | Edit | Name ▲ | Country | Requested Coverage | Actual Coverage | Most Recent AR | Date of Aging Report | Carrier | Actions Pending | Compliance for Coverage |
|---|---|---|---|---|---|---|---|---|---|---|
| 🗑 | Edit | Debtor A | United States | $250,000 | $0 | $239,993 | 30-Nov-2010 | Insurer C | CUR-CA-00005 | ○ |
| 🗑 | Edit | Debtor B | United States | $175,000 | $175,000 | $163,400 | 30-Nov-2010 | Insurer C | | ◉ |
| 🗑 | Edit | Debtor C | United States | $1,000,000 | $0 | $0 | 30-Nov-2010 | Insurer C | | ○ |
| 🗑 | Edit | Debtor D | United States | $60,000 | $0 | $34,297 | 30-Nov-2010 | Insurer C | CUR-DA-00001 | ○ |
| 🗑 | Edit | Debtor E | United States | $100,000 | $100,000 | $95,693 | 30-Nov-2010 | Insurer C | | ● |
| 🗑 | Edit | Debtor F | United States | $100,000 | $100,000 | $99,659 | 30-Nov-2010 | Insurer C | CUR-OR-00001 | ◉ |
| 🗑 | Edit | Debtor G | United States | $250,000 | $150,000 | $0 | 30-Nov-2010 | Insurer C | CUR-PC-00001 | ● |

Coverage Type: All

Generate Coverage Alerts | Add Debtor | Upload Debtors List

FIGURE 15

REQUIRED REPORTING FOR Customer A

Policy number: 450604701 ———— 1702
Carrier: Insurer C ———— 604
Requirement 1:
 Frequency: Weekly
 Start Date: 05/10/2010
 You must submit a report with Insurer C regarding Debtor B's disputed invoice on a weekly basis. ———— 1802

| 05/13/2010 | 05/20/2010 | 05/26/2010 | 06/10/2010 | 06/17/2010 | |
| Submitted | Submitted | Submitted | Not Submitted | Not Yet Required | |

REQUIRED REPORTING FOR Customer A

Policy number: 450604701 ———— 1702
Carrier: Insurer C ———— 604
Requirement 2:
 Frequency: Monthly
 Start Date: 01/15/2010
 You must submit an A.R. Aging Report for all accounts with A.R. currently greater than $10,000. ———— 1802

| Jan 2010 | Feb 2010 | Mar 2010 | Apr 2010 | May 2010 | Jun 2010 | Jul 2010 | Aug 2010 | Sep 2010 | Oct 2010 | Nov 2010 | Dec 2010 | Jan 2011 | Feb 2011 |
| Submitted | Submitted | Submitted | Submitted | Submitted | Submitted | Submitted | Submitted | Submitted | Submitted | Submitted | Not Submitted | Not Required | Not Required |

| 2212 Claims Dispute | | | | | | | |
|---|---|---|---|---|---|---|---|
| Debtor Name | Amount Current | 1-30 Days | 31-60 | 61-90 | 91-120 | 121-150 | Over 150 | Total |
| ☑ Debtor A | $1,542 | $355 | $1,600 | $9,000 | $0 | $0 | $0 | $12,497 |
| 2202 ⎯ Disputed Amount: | | | | $9,000 | | | | $9,355 |
| 2204 ⎯ Approved by Insurer A: | | | | $9,000 | | | | $9,000 |
| 2206 ⎯ Notes: Disputed invoice for $1,255 reported to and approved by Insurer A on 3/20/11. Invoice for $355 disputed for allegedly noncompliant goods. | | | | | | | | |
| ☑ Debtor B | $0 | $0 | $26,734 | $0 | $0 | $0 | $0 | $26,734 |
| 2202 ⎯ Disputed Amount: | | | | | | | | |
| 2204 ⎯ Approved by Insurer A: | | | | | | | | |
| 2206 ⎯ Notes: Debtor B declared bankruptcy on 2/13/11. | | | | | | | | |
| ☐ Debtor C | $83,216 | $21,512 | $51,133 | $0 | $0 | $0 | $0 | $155,861 |
| 2202 ⎯ Disputed Amount: | | | $20,500 | | | | | $20,500 |
| 2204 ⎯ Approved by Insurer B: | | | | | | | | |
| 2206 ⎯ Notes: Invoice for $51,133 disputed in the amount of $20,500 for allegedly damaged goods. | | | | | | | | |
| ☑ Debtor D | $0 | $0 | $0 | $0 | $24,885 | $0 | $0 | $24,885 |
| 2202 ⎯ Disputed Amount: | | | | | | | | |
| 2204 ⎯ Approved by Insurer A: | | | | | | | | |
| 2206 ⎯ Notes: Debtor D declared bankruptcy on 12/4/10. | | | | | | | | |

[Save] 2214   [Create Notification] 2210   [Cancel] 2216

| Credit Insurer | Total Policies | | | New Policies | | |
|---|---|---|---|---|---|---|
| | Number of Customers | Average Premium | Total Premium | Current Qtr | Last Qtr | Current Yr |
| Insurer A | 15 | $85,930 | $1,288,950 | 1 | 2 | 3 |
| Insurer B | 22 | $77,342 | $1,701,524 | 1 | 2 | 4 |
| Insurer C | 33 | $55,850 | $1,843,050 | 2 | 3 | 5 |
| Insurer D | 13 | $73,450 | $954,850 | 2 | 2 | 2 |
| Insurer E | 6 | $4,500 | $27,000 | 1 | 1 | 1 |
| Insurer F | 12 | $23,000 | $276,000 | 0 | 2 | 3 |
| Insurer G | 2 | $38,000 | $76,000 | 0 | 1 | 1 |
| Insurer H | 4 | $101,500 | $406,000 | 1 | 0 | 1 |
| Insurer I | 10 | $15,000 | $150,000 | 0 | 2 | 4 |
| Insurer J | 3 | $75,000 | $225,000 | 0 | 1 | 2 |
| Insurer K | 23 | $6,000 | $138,000 | 3 | 5 | 6 |
| Insurer L | 3 | $250,000 | $750,000 | 0 | 0 | 1 |
| TOTALS | 146 | $53,674 | $7,836,374 | 12 | 21 | 33 |

FIGURE 28

|  | Cancellation Appeals | Denial Appeals | Reduction Appeals | New Limits | Claims |
|---|---|---|---|---|---|
| Open | 17 | 15 | 9 | 23 | 3 |
| Successful | 39 | 45 | 34 | 156 | 8 |
| Unsuccessful | 8 | 11 | 7 | 18 | 0 |
| Success % | 83% | 80% | 83% | 90% | 100% |
| TOTALS | 64 | 71 | 50 | 197 | 11 |

FIGURE 29

| Credit Insurer | Next 30 Days | Next 60 Days | Next 90 Days | Completed Last 30 Days | Non-Renewals |
|---|---|---|---|---|---|
| Insurer A | 1 | 3 | 4 | 2 | 0 |
| Insurer B | 2 | 4 | 6 | 3 | 2 |
| Insurer C | 3 | 6 | 8 | 2 | 1 |
| Insurer D | 1 | 2 | 3 | 0 | 1 |
| Insurer E | 1 | 1 | 2 | 1 | 0 |
| Insurer F | 1 | 2 | 3 | 0 | 1 |
| Insurer G | 0 | 0 | 1 | 0 | 0 |
| Insurer H | 0 | 1 | 1 | 0 | 0 |
| Insurer I | 1 | 2 | 3 | 1 | 0 |
| Insurer J | 0 | 1 | 1 | 0 | 0 |
| Insurer K | 2 | 4 | 6 | 1 | 3 |
| Insurer L | 0 | 1 | 1 | 0 | 0 |
| TOTALS | 12 | 24 | 37 | 10 | 8 |

FIGURE 30

Report Date: 2/7/2011

Report by: Broker A
Region: United States
Credit Insurer: Insurer C
Period: 1/1/10 – 12/31/10

| | Number | Total Dollars |
|---|---|---|
| Coverage/Credit Limits | 404 | $54,000,000 |
| Cancellations | 23 | $4,800,000 |
| Percent Cancelled | 5.7% | 8.8% |
| Coverage/Credit Limits | 404 | $54,000,000 |
| Reduction | 14 | $2,300,000 |
| Percent Reduced | 3.5% | 1.2% |
| Requested New Coverage/ Credit Limits | 45 | $3,375,000 |
| Denials | 21 | $1,995,000 |
| Percent Denied | 46.7% | 59% |
| Requested Increase Coverage/ Credit Limit | 33 | $4,250,000 |
| Approvals | 14 | $1,850,000 |
| Percent Approved | 42.4% | 43.5% |
| Requested New Coverage/ Credit Limits | 45 | $3,375,000 |
| Partial Approvals | 11 | $605,000 |
| Percent Partially Approved | 24.4% | 17.9% |
| Claims Filed | 8 | $425,000 |
| Claims Denied | 1 | $50,000 |
| Percent Denied | 12.5% | 11.8% |

FIGURE 31      ↙—3100

APPARATUS AND METHOD FOR OPTIMIZING INSURANCE POLICIES

CROSS-REFERENCE TO RELATED APPLICATIONS

This application is a continuation-in-part of European Patent Application No. EP 11158962.8, filed Mar. 21, 2011, and U.S. patent application Ser. No. 13/043,317, filed Mar. 8, 2011, the entire disclosures of which are hereby incorporated by reference as if fully set forth herein.

BACKGROUND OF THE INVENTION

1. Field of the Invention

The present invention relates generally to an apparatus and method for optimizing insurance policies. More particularly, the present invention relates to an apparatus and method for identifying coverage discrepancies in credit insurance policies, managing the process of obtaining the maximum amount of desired coverage from credit insurance policies, actively monitoring credit insurance policies to determine whether a customer's coverage goals are being met, actively monitoring, customers' and debtors' activities to identify any compliance issues with the terms and conditions of credit insurance policies, automating the processes required to obtain/retain the coverage required to meet a customer's coverage goals, and automating the processes required to obtain/retain compliance with the terms and conditions of credit insurance policies.

2. Background of the Related Art

Business credit insurance, or trade credit insurance, (hereinafter referred to more generally as "credit insurance") is an insurance policy and/or risk management product that businesses purchase to insure payment of any credit extended by that business (i.e., their accounts receivable). In other words, credit insurance is insurance that covers the payment risk resulting from the delivery of goods or services. Credit insurance typically covers a portfolio of a business's debtors and pays a predetermined percentage of a credit that remains unpaid as a result of certain debtor activity, such as protracted default, insolvency, or bankruptcy.

Credit insurance is a very powerful tool, capable of providing tremendous protection and value for businesses. However, like all powerful tools, it requires proper maintenance and management to deliver optimal results. More specifically, credit insurance not only requires significant maintenance and management, most policyholders do not realize what the requirements of their policies are or how to comply with those requirements. Nor do policyholders have the resources available to perform the functions necessary to identify and comply with those requirements. As a result, a majority of policyholders are not receiving the full desired protection and value from their credit insurance policies. In other words, their credit insurance policies are not optimized.

Optimized credit insurance policies generally include three primary features: 1) they provide the maximum amount of coverage desired by the policyholder, 2) they ensure the payability of covered claims, and 3) they provide the maximum coverage available relative to the premium paid (i.e., they maximize the coverage/premium ratio). And as discussed in more detail below, conventional credit insurance policies typically lack one or more of those features. Accordingly, conventional credit insurance policies are not optimized.

Credit Insurance Coverage

Many credit insurance programs do not provide the maximum coverage desired by the policyholder due to non-optimal coverage issues, such as cancelled coverage, denied coverage, out-of-compliance Discretionary Credit Limit (DCL) coverage, etc. Some of those problems have arisen as a result of credit insurers changing their risk tolerance in response to the economic downturn in the late 2000s, which is reflected in the changes credit insurers have made to their underwriting guidelines. For example, it used to be the default position of credit insurers to offer coverage to a potential policyholder unless the credit insurer had negative information on that potential policyholder's debtors. But now it is the default position of credit insurers to NOT provide coverage to a potential policyholder unless the credit insurer has good information about that potential policyholder's debtors. Therefore, the responsibility of telling credit insurers why coverage should be provided is now on the policyholder or potential policyholder.

In many cases, to justify why coverage should be provided, the policyholder or potential policyholder must provide financial information to a credit insurer, such as Cash Flow Statements, Balance Sheets, and Income Statements for each debtor that coverage is needed. That is generally not a simple task because many debtors are private companies, from which it typically requires substantial time and effort to obtain financial information. In addition, when the debtors are foreign, those financial statements must also be translated to English, or U.S. Generally Accepted Accounting Principles (GAAP) standards, to enable underwriters to make their decision whether to cover those debtors. Accordingly, policyholders and potential policyholders must now allocate significant time and resources to obtain credit insurance.

Even where a debtor is a public company or otherwise has readily accessible financial statements, there are still other challenges that require potential policyholders to allocate significant time and resources to obtain credit insurance. For example, credit insurers are now subject to more challenges for reinsuring their portfolios. In other words, many coverages that otherwise would have been previously granted are not being granted and, as a result, the capacity of credit insurers to provide certain coverages has been diminished. Accordingly, potential policyholders are often unable to obtain the total amount of desired coverage from a single credit insurer.

Payability of Credit Insurance Claims

Obtaining payment for a claim often presents a significant challenge in the credit insurance industry. As a result, a significant percentage of all claims submitted to the credit insurers are denied. According to some reports, almost 50% of submitted claims are initially denied by credit insurers. And most of those initial denials come as a surprise to the policyholder who is filing those claims. That is because of the complexity of most credit insurance policies.

In more detail, credit insurance policies typically include a plethora of terms and conditions with which a policyholder must comply to ensure that the policy is valid and any claims thereon are payable. For example, there are over fifteen pages of detailed descriptions in most credit insurance policies that set forth various terms and conditions that must be satisfied in order for the credit insurer to remain obligated to pay a claim. In other words, most credit insurance policies include over fifteen pages of reasons why a credit insurer will NOT be required to pay a policyholder's claim. And more often than not, those terms and conditions are not even known by the policyholder, which is why policyholders are often surprised to discover that their claims are not payable due to the failure to satisfy one or more of those terms and/or conditions.

Even when a policyholder is aware of the plethora of terms and conditions that must be satisfied for a claim to be payable, the amount of time and resources required to properly comply with those terms and conditions is too great and, despite the policyholder's best efforts, they are still unable to satisfy those terms and conditions. For example, a condition that one of the largest and most well-respected credit insurers puts on their policyholders requires the filing and acceptance of accounts receivable over $10K that are past due 60 days or more for any named debtor, regardless of the upper limit of the credit insurance policy. In other words, if any amount over $10K is more than 60 days past due and has not been properly filed and recognized by the credit insurer, then the entire limit for that debtor is not eligible for a claims payment (i.e., the limit is cancelled). It is compliance issues such as those that prevent most policyholders from obtaining payment for their credit insurance claims. And as in most cases of compliance, that problem is exacerbated by the fact that the policyholder typically will not realize that it did not comply with a term and/or condition until after it files its claim, at which point their coverage will have already been canceled and the claim therefore denied.

Credit Insurance Premium

Because there are often multiple credit insurance and credit protection solutions available to potential policyholders, it is often difficult to determine the availability and coverage of those products at the right prices. More specifically, finding the right availability and coverage at the optimum price is a manual process that requires a significant amount of work, which often does not get done due to time restrictions. Moreover, a manual attempt by a broker, or by a potential policyholder, often results in human error. Accordingly, potential policyholders often do not obtain the credit insurance programs that are the best for their needs.

The difficulty in finding the right availability and coverage at the best price is further exacerbated by the fact that the carriers and providers of credit insurance products are always changing the availability and rates for those products, with their ability and/or willingness to take on certain debtors and their price tolerances changing on an almost daily basis. Moreover, the difficulty of manually sorting through the different credit insurance products offered by different carriers and providers means that those carriers and providers often do not have to compete for a policyholder's or potential policyholder's business. In other words, it is often too burdensome for a policyholder or potential policyholder to compare different credit insurance products to one another and make an educated guess as to which product to purchase. Accordingly, policyholders and potential policyholders rarely obtain a credit insurance policy that provides the maximum amount of coverage desired for the price that they are paying.

In view of the above problems with conventional credit insurance policies, and as will become more evident from the advantages of the present invention discussed below, there is a need in the art for an apparatus and method for digitally processing various terms and conditions and continuously monitoring a customer's compliance with those terms and conditions. More particularly, there is a need for an apparatus and method that enables potential policyholders to obtain a credit insurance policy with the maximum amount of coverage desired, the maximum payability of covered claims, and the maximum coverage available relative to the premium paid. And that apparatus and method preferably operate in real time so as to ensure that the credit insurance policy is optimized for the policyholder in an ongoing manner after it has obtained the desired credit insurance policy or policies.

SUMMARY OF THE INVENTION

Accordingly, it is an object of the invention to provide an apparatus and method for optimizing insurance policies. The apparatus and method include a processing device that is configured to import the various terms and conditions from one or more insurer systems and to import accounts receivable information from one or more customer systems, the processing device being in electronic data communication with the one or more insurer systems and the one or more customer systems via a network connection; a compliance module that is configured to instruct the processing device to import the various terms and conditions from the one or more insurer systems, to import the accounts receivable information from the one or more customer systems, to identify overdue accounts receivable and time periods for which those accounts receivable have been overdue, and to compare the terms and conditions to the time periods to determine if the customer is not in compliance with any of one of the various terms and conditions, and to generate an alert when the customer is not in compliance with any one of the various terms and conditions; and a graphical user interface in electronic data communication with the processing device that is configured to generate a graphical display that includes the overdue accounts receivable identified by the processing device.

According to another object of the present invention, the accounts receivable information corresponds to one or more of the customer's debtors, the various terms and conditions identify a deadline for filing a claim on the overdue accounts receivable for the one or more debtors, and the compliance module is further configured to instruct the processing device to electronically submit a claim to one or more insurers via the one or more insurer systems as the time period for the overdue accounts receivable for the one or more debtors covered by the one or more insurers comes within a predetermined number of days from the deadline for filing the claim.

And according to yet another object of the present invention, the accounts receivable information corresponds to one or more of the customer's debtors, the various terms and conditions identify a deadline for submitting a notification to one or more insurers that the one or more debtors have disputed an invoice and/or entered protracted default, and the compliance module is further configured to instruct the processing device to electronically submit a notification to the one or more insurers via the one or more insurer systems as the time period for the overdue accounts receivable for the one or more debtors covered by the one or more insurers comes within a predefined time of the deadline for filing the notification.

Those and other objects, advantages, and features of the present invention will become more readily apparent by the following written description, taken in conjunction with the accompanying drawings and claims.

BRIEF DESCRIPTION OF THE DRAWINGS

Many aspects of the present invention can be better understood with reference to the accompanying drawings, which are part of the specification and represent exemplary embodiments of the present invention. The components in the drawings are not necessarily to scale, emphasis instead being placed upon illustrating the principles of the present invention.

FIG. 6 is a graphical display illustrating an exemplary Quote Comparison Report according to a non-limiting embodiment of the present invention;

FIG. 8 is a graphical display illustrating an exemplary Gap Report according to a non-limiting embodiment of the present invention;

FIG. 11 is a graphical display illustrating an exemplary Event List according to a non-limiting embodiment of the present invention;

FIG. 12 is a graphical display illustrating an exemplary New Event Input Page according to a non-limiting embodiment of the present invention;

FIGS. 13A and 13B are a graphical display illustrating an exemplary Action Definition Page according to a non-limiting embodiment of the present invention;

FIG. 15 is a graphical display illustrating an exemplary Debtor List according to a non-limiting embodiment of the present invention;

FIGS. 18 and 19 are graphical displays illustrating exemplary Required Reporting Reports according to non-limiting embodiments of the present invention;

FIG. 22 is a graphical display illustrating an exemplary Overdues Report according to a non-limiting embodiment of the present invention;

FIG. 28 is a graphical display illustrating an exemplary Carrier Summary according to a non-limiting embodiment of the present invention;

FIG. 29 is a graphical display illustrating an exemplary Activity Summary according to a non-limiting embodiment of the present invention;

FIG. 30 is a graphical display illustrating an exemplary Renewal Summary according to a non-limiting embodiment of the present invention; and FIG. 31 is a graphical display illustrating an exemplary Coverage Stability Summary according to a non-limiting embodiment of the present invention.

DETAILED DESCRIPTION OF THE PREFERRED EMBODIMENTS

I. Introduction

Figure 1:
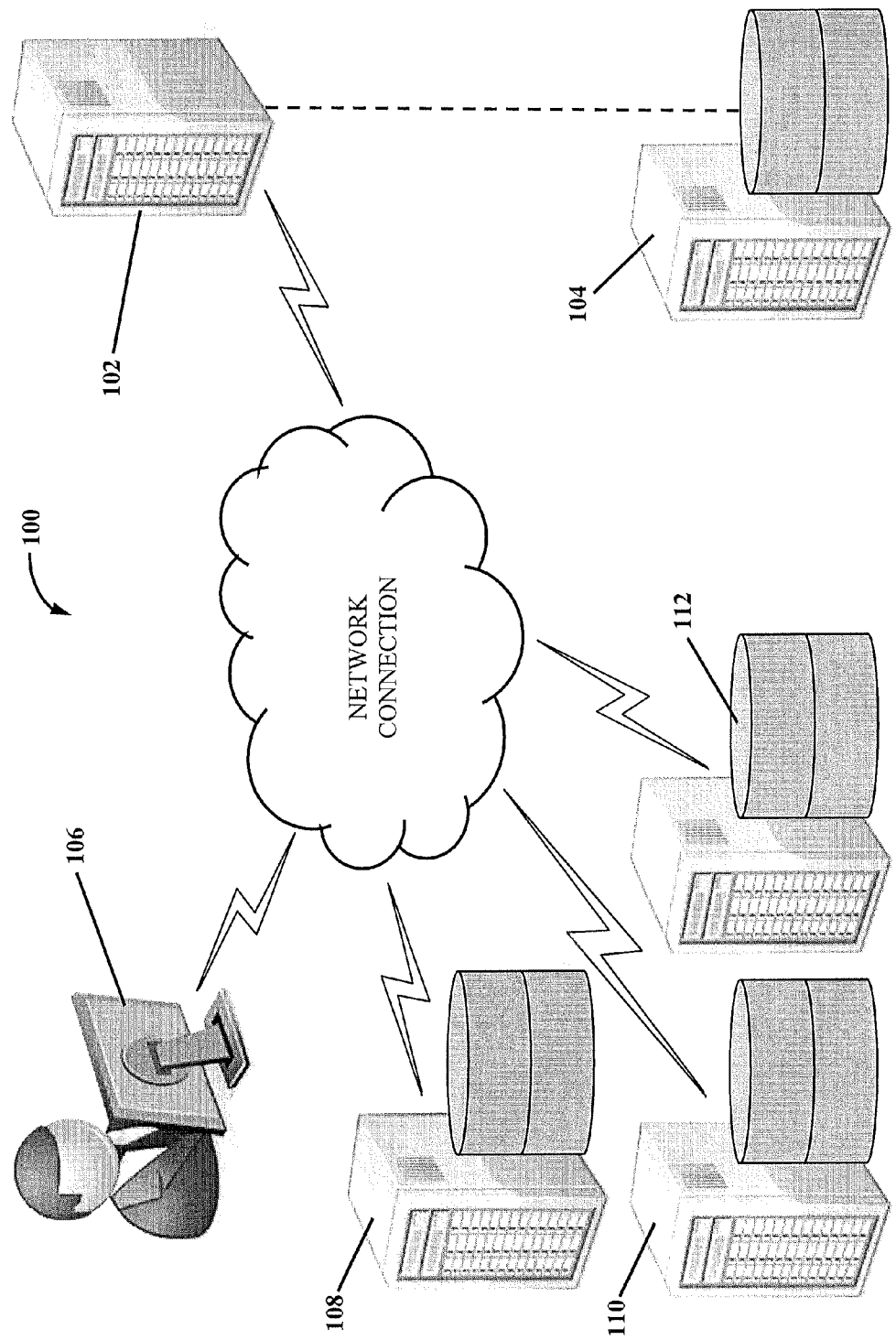
FIG. 1 is a schematic diagram illustrating an apparatus and system for digitally processing various terms and conditions and continuously monitoring a customer's compliance with those terms and conditions according to a non-limiting embodiment of the present invention.

The present invention overcomes the shortcomings of the prior art by providing a comprehensive platform designed to optimize customers' credit insurance policies. The present invention is designed to ensure that customers receive the full value out of their risk mitigation product. The apparatus and method of the present invention can be implemented at any point during the effective period of a risk mitigation product and immediately provides the critical functions required to enable a customer's risk mitigation product to be optimized. The apparatus and method of the present invention optimizes a customer's risk mitigation product or products by providing functionality for use in 1) obtaining the maximum amount of coverage desired, 2) ensuring the payability of covered claims, and 3) maximizing coverage available relative to the premium paid.

a. Maximizing Credit Insurance Coverage

The present invention allows a user to obtain the maximum amount of coverage required from various risk mitigation products by remediating various non-optimal coverage issues. For example, it automatically appeals any denials of coverage and/or coverage cancellations that may take place. It electronically communicates with the computer systems of the risk mitigation product carriers, if available, to understand the root cause of why those denials and/or cancellations occurred. And whether the reason provided from the carrier is a lack of information, country risk, industry risk, etc., the present invention automatically implements the proper appeals process to overturn that carrier's decision deny and/or cancel coverage.

In many cases, the only way for a policyholder to overturn the decision of the risk mitigation product carrier is to prove to that carrier that the debtor in question is, in fact, worthy of coverage. That often requires obtaining financial statements for the debtors. Accordingly, the present provides a fully automated process for electronically obtaining financial statements from the appropriate sources. And in the event that a carrier denies, cancels, or reduces coverage due to lack of capacity, or due to the debtor not being financially sound, the present invention will automatically communicate with other carriers, such as those that specialize in high-risk debtors, to obtain credit insurance coverage for the debtor in question. By providing such easy and automated access to multiple carriers and their respective risk mitigation products, the present invention maximizes the coverage of those products by, for example, covering accounts receivable that are not able to be covered at all or in full by a policyholder's primary insurance carrier.

b. Maximizing Credit Insurance Claims Payability

The present invention maximizes the payability of risk mitigation products by fully automating compliance issues proactively so as to ensure a policyholder's compliance with the various terms and conditions of its respective risk mitigation products. By fully automating the process of complying with the rules and conditions of its risk mitigation product or products, the present invention is able to notify the policyholder at any point in time if it would be eligible to be paid for a claim on its accounts receivable and, if not, what term and/or condition needs to be satisfied to obtain eligibility. Accordingly, the present invention works to ensure that a claim will be paid prior to those claims ever being filed.

To support that functionality, all the terms and conditions of various risk mitigation products are digitally processed and digitally processed into rules by the apparatus of the present invention, which are used to constantly monitor and measure whether a policyholder is in compliance with those terms and conditions. In the event that a debtor, or the policy in its entirety, is identified as being out of compliance with any term and/or condition of one or more risk mitigation products, the present invention will immediately alert the policyholder and initiate various automated Actions that will place the debtor/policyholder back in compliance with that term and/or condition. Accordingly, the present invention proactively eliminates the occurrence of surprise denials of claim payments, enabling policyholders to be fully confident in the knowledge that their coverages are in place and providing the desired amount of protection.

c. Maximizing Coverage/Premium Ratio

The present invention ensures that a policyholder has the proper amount of premium relative to the amount of coverage available (i.e., the best coverage/premium ratio) at a given point in time in a given market. It does that by automating the otherwise time-consuming process of exploring various markets, carriers, and risk mitigation products. The present invention automates that process by automatically and continuously exploring all markets, carriers, and risk mitigation products so that, at any time a policyholder's coverage/premium ratio is determined NOT to be optimized, it can alert the policyholder and make any adjustments required. That functionality is also implemented when a policyholder is looking for new risk mitigation products or is determining whether to renew an expiring credit insurance policy.

By automatically exploring all markets, carriers, and products, the present invention can understand as quickly as possible which carriers have what availability, as well as what combination of risk mitigation products from which carriers will provide the optimal coverage/premium ratio. Without such automation, the process would be almost impossible due to the fact that there are so many different types of risk mitigation products and carriers, as well as the fact that they are constantly changing. As a result, what is available on one day may not be available the next day. Accordingly, the present invention locks down the best available structure and price for risk mitigation products as they become available by constantly monitoring those risk mitigation products and working to put the best solution together, whether it is from a single carrier or a combination of carriers. Such real-time optimization is unique to the present invention.

Those and other advantages provided by the present invention can be better understood from the description of the preferred embodiments below and in the accompanying drawings. In describing the preferred embodiments, specific terminology is resorted to for the sake of clarity. However, the present invention is not intended to be limited to the specific terminology so selected, and it is to be understood that each specific term includes all technical equivalents that operate in a similar manner to accomplish a similar purpose. For example, the terms "credit insurance policy" and "credit insurer" are used below not only to refer to credit insurance policies and the carriers of those policies, but also to refer to all other comparable risk management products and the carriers of those products.

II. Apparatus for Optimizing Credit Insurance Policies

The invention can be implemented by a computer having a processor to perform various functions and operations in accordance with the invention. The computer can be, for example, a personal computer (PC), server, or mainframe computer. In addition to the processor, the computer hardware may include one or more of a wide variety of components or subsystems including, for example, a co-processor, input devices, monitors, and a memory or storage device, such as a database. All or parts of the system and processes can be implemented at the processor by software or other machine executable instructions that are stored on or read from computer-readable media for performing the processes described. Unless indicated otherwise, those processes are preferably implemented automatically by the processor in real time without delay. Computer-readable media may include, for example, hard disks, floppy disks, DVDs, memory sticks. CD-ROMs, downloadable files, read-only memory (ROM), or random-access memory (RAM).

Turning to the drawings, FIG. 1 is a schematic diagram illustrating a system 100 for optimizing credit insurance policies according to a non-limiting embodiment of the present invention. The system 100 includes one or more applications servers 102 and one or more database servers 104 for digitally processing various terms and conditions and continuously monitoring a customer's compliance with those terms and conditions, one or more user interfaces 106 for receiving input from a user and generating graphical displays, and one or more external computer systems 108-112. The one or more applications servers 102, one or more database servers 104, one or more user interfaces 106, and one or more external systems 108-112 are in electronic data communication with each other via any suitable network connection (e.g., ethernet connection, Digital Subscriber Line (DSL), telephone line, coaxial cable, etc.) so as that the system 100 forms a communications network (e.g., Local Area Network (LAN), Wide Area Network (WAN), Virtual Private Network (VPN), etc.). That communications network is preferably formed by secured network connections so as to protect the system 100 from unauthorized access.

At least one applications server 102, at least one database server 104, and at least one user interface 106 provide the primary functionality of the present invention via a multi-tiered architecture. The applications server 102 includes a processing device that receives instructions from different modules for performing various automated processes and it operates as the business logic tier, or middle tier, by coordinating the applications, process commands, and logical decisions and evaluations that provide the functionality of the present invention. The applications server 102 also moves and processes data between the database server 104 and the user interface based on those instructions. The database server 104 also includes a processing device that receives instructions from different modules for performing various automated processes and it operates as the data tier, or lower tier, by utilizing a database computer language (e.g., Structured Query Language (SQL), Extensible Markup Language (XML), etc.) to store and retrieve the data required to provide the functionality of the present invention in a relational database management system (RDBMS). And the user interface 106 operates as the presentation tier, or upper tier, by providing a graphical user interface that translates tasks and results into information a user can understand, such as by providing that information in a graphical display. The user interface 106 also provides a mechanism for a user to manually input data into the applications server 102 and database server 104. That multi-tiered architecture improves scalability and supports cost-efficient application building. And although a separate database server 104 is described as operating the data tier, it should be understood that the applications server 102 may operate the data tier instead of the database server 104 without departing from the spirit of the invention.

The applications server 102 is integrated or interfaced with the various external systems 108-112 to facilitate the exchange of data between the applications server 102 and those external systems 108-112. Preferably, the applications server 102 is integrated with the Application Programming Interfaces (APIs) of those external systems 108-112 so that they may seamlessly exchange data using automated processes. For example, the applications server 102 may use an automated process to identify and import various terms and conditions directly from credit insurance policy documents stored on a credit insurer system 108 and digitally process them into rules that will be used to trigger Actions (e.g., alerts, reminders, automated processes, etc.) that will ensure a policyholder complies with those terms and conditions. And the applications server 102 may also use an automated process to import and digitally process specific debtor's accounts receivable information from a customer's AR system 110 and to import and digitally process financial data about that specific debtor from an institutional system 112 (e.g., a financial statement document system, a trade reference document system, a bank reference document system, a credit report document system, etc.) to determine when to trigger those Actions. In addition to or as an alternative to those automated processes, a user may also retrieve data from those external systems 108-112 via manual access techniques (e.g., browsing web pages and downloading data, browsing web pages and/or electronic documents and cutting and pasting data, etc.).

The functionality of the present invention is preferably provided using web-based applications. In that way, a user (e.g., a customer, broker, account manager, administrator, etc.) can access the functionality of the present invention via a user interface 106 (e.g., personal computer, laptop computer, personal digital assistant (PDA), smart phone, etc.) using industry standard web browsers (e.g., the CHROME brand web browser from Google, Inc., the FIREFOX brand web browser from the Mozilla Foundation, the INTERNET EXPLORER brand web browser from the Microsoft Corporation, etc.). Preferably, the functionality of the present invention is accessed via a user interface 106 using a secure communication protocol (e.g., Hypertext Transfer Protocol Secure (HTTPS), Internet Protocol Security (IPsec), Datagram Transport Layer Security (DTLS), Secure Socket Tunneling Protocol (SSTP), etc.) so as to protect the applications server 102 and database server 104 from unauthorized access.

As discussed in more detail under separate headings below, the functionality of the present invention is provided by three separate software modules that work together to help customers, or brokers on behalf of their customers, obtain the desired amount of credit insurance coverage, maintain the payability of covered claims, and obtain the maximum coverage available relative to the premium paid. A Marketplace Module provides functionality for customers review and analyze debtors, policies, and markets when choosing credit insurance policies. A Goal/Compliance Module provides functionality for automating the ongoing processes required to ensure customers' credit insurance policies are meeting their goals and to ensure that the customers remain in compliance with those credit insurance policies. And a Brokerage Module provides functionality for brokers, account managers, or other organizations to access, manage, and evaluate multiple customers' credit insurance policies. But, while those three software modules are described as having their own separate functionality, those descriptions are of preferred embodiments. Accordingly, it should be understood that the functionality in those three software modules may also be provided in any number of software modules and/or shared between any of number of software modules without departing from the spirit of the present invention.

III. Marketplace Module

The Marketplace Module provides functionality for a user (e.g., a customer, broker, account manager, administrator, etc.) to compare a current credit insurance policy or policies against market information to determine if that policy is optimized for that user's specific needs and/or desires. More specifically, it enables a user to determine whether its current credit insurance policy provides the highest level of coverage for the lowest costs. Based on that determination, the user can cancel its existing policy and rewrite it as required to reduce costs and/or increase coverage. Or when renewing an expiring credit insurance policy or obtaining a new one, the user can identify which credit insurance product from which credit insurer will offer the highest level of coverage for the lowest costs. Accordingly, a user can utilize the functionality of the Marketplace Module at any point it is determined that a specific credit insurance policy is not satisfying a customer's needs and/or desires with respect to structure, price, and/or coverage.

For identifying which credit insurance product from which credit insurer will offer the highest level of coverage for the lowest costs for a specific customer, the Marketplace Module provides Debtor Analysis Functionality, Policy Analysis Functionality, and Market Analysis Functionality. The Debtor Analysis Functionality enables the user to determine the insurability of specific debtors; the Market Analysis Functionality enables the user to view the performance trends over time for credit insurance products from a specific credit insurer or within an entire market; and the Policy Analysis Functionality enables the user to compare aggregates for one credit insurer's product to those of other credit insurers or to the entire market. The Marketplace Module also includes Quote Summary Functionality for viewing the responses to requests for quotes from various credit insurers. But, while that functionality is described as being provided in the Marketplace Module, that description is of a preferred embodiment. Accordingly, it should be understood that the functionality in the Marketplace Module may also be provided in any other software modules and/or shared between any of number of software modules without departing from the spirit of the present invention.

a. Debtor Analysis Functionality

The Debtor Analysis Functionality aggregates data from various sources and data objects to determine the insurability of one or more debtors. For example, the applications server 102 can import and digitally process debtor coverage and decision data for specific debtors from credit insurer systems 108, import and digitally process accounts receivable data for specific debtors from customers' AR systems 110, and import and digitally process financial statements from financial statement document systems 112 (e.g., the Electronic Data Gathering, Analysis, and Retrieval (EDGAR) System, the System for Electronic Documentation Analysis and Retrieval (SEDAR), etc.). That data can be imported from those external systems 108-112 as part of any process previously performed by the present invention's other functionality (e.g., Quote Summary Functionality, Coverage Goal Functionality, Compliance Monitoring Functionality, etc.) and aggregated by the database server 104 as historical information for subsequent use by the Debtor Analysis Functionality. Accordingly, that data can be retrieved from the database server 104 based on different time periods, such as the preceding three months or the preceding forty-eight months. In the alternative, a customer can send (e.g., e-mail a file, ground mail a memory device, etc) all or some of that data to an administrator for importing into the applications server 102 and/or a user (e.g., a customer, broker, account manager, administrator, etc.) can input all or some of that data into the applications server 102 via a user interface 106 using a manual input process (e.g., scanning a document, typing on a keyboard, dictating into voice recognition software, etc.).

The coverage and decision data is retrieved for all the credit insurance products and all the credit insurers from which customers have sought coverage for a debtor. It identifies the total number of requests for coverage of specific debtors; the total number of approvals and partial approvals of those requests, including the decision amounts for each; and the total number of rejections and denials of those requests, including the reasons for each. The accounts receivable data is retrieved for all of the customers with accounts receivable for a specific debtor. It identifies the total number of suppliers that debtor has purchased from, the total number customers that the debtor paid on time or late, the total amounts paid on time or late, and the total number of late payments made within 30 days, 60 days, 90 days, or greater than 90 days of their due date. And the financial statements are retrieved for each debtor and include balance sheets, cash flow statements, income statements, and credit reports.

Figure 2:
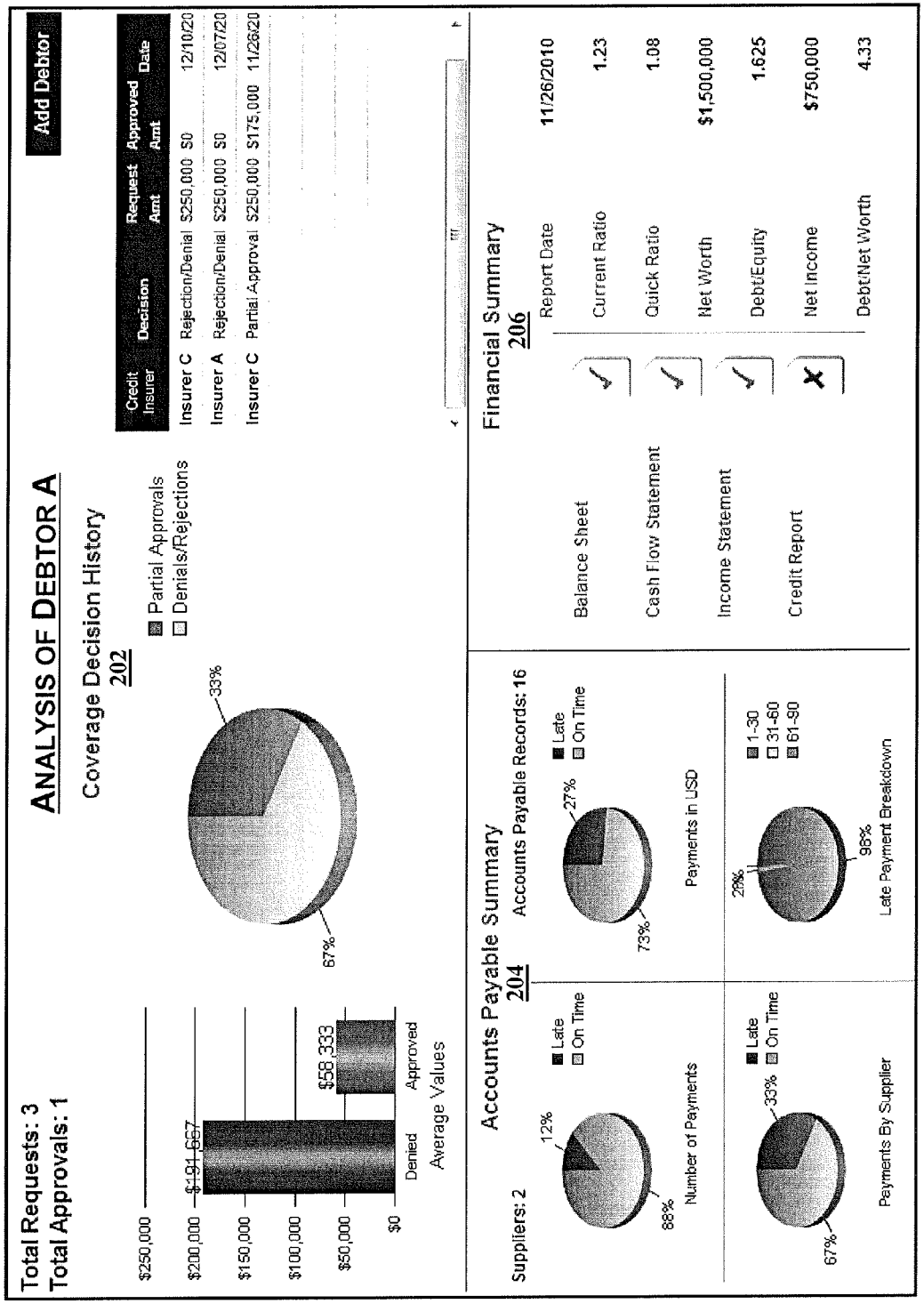
FIG. 2 is a graphical display illustrating an exemplary Debtor Analysis Report according to a non-limiting embodiment of the present invention.

As FIG. 2 illustrates, the Debtor Analysis Functionality of the present invention analyzes all of that data and provides it to a user as a graphical display, or Debtor Analysis Report 200, at a user interface 106. More specifically, the applications server 102 averages the coverage and decision data and displays the corresponding information in a Coverage Decision History window 202; calculates the associated percentages from accounts receivable data and displays them in an Accounts Payable Summary window 204; and calculates standard financial ratios (e.g., Current Ratio, Quick Ratio, Debt to Equity Ratio, and Debt to Net Worth Ratio) and values (e.g., Net Worth and Net Income) from the financial statements and displays them in a Financial Summary window 206. The Financial Summary window 206 also displays the different types of financial statements (e.g., Balance Sheets, Cash Flow Statements, Income Statements, Credit Reports, etc.) that were utilized to calculate those standard financial ratios and values and that are available and required to submit to obtain coverage for a debtor. Using all of that data as a guide, a user can determine the insurability of specific debtors.

For example, the Coverage Decision History window 202 of FIG. 2 illustrates that, of three requests for $250,000 of coverage for Debtor A (one from insurer A and two from Insurer C), only one was approved (the 11/26/20 request from Insurer C). Moreover, the one request that was approved was only approved for $175,000. Accordingly, the Coverage Decision History window 202 graphically illustrates that Debtor A demonstrates a 33% partial approval rate (one in three requests for coverage resulted in a partial approval), a 67% denial rate (two in three requests were denied), an average approved coverage value of $58,333 ($175,000/3), and an average denied coverage value of $191,667 ([(3×$250,000)−$175,000]/3). Accordingly, Debtor A is more than likely not insurable for values much larger than $175,000.

The Accounts Payable Summary window 204 and Financial Summary window 206 help explain why Debtor A is not as insurable as a customer might desire. For example, although Debtor A only made 12% (e.g., 12 of 100 payments) of its payments late, the value associated with that 12% of late payments made up 27% of the total value owed by Debtor A. Moreover, the Current Ratio and Debt/Net Worth Ratio calculated for Debtor A indicate that it may not have sufficient liquidity. Accordingly, the Accounts Payable Summary window 204 and Financial Summary window 206 give a representative picture of why credit insurers have not been willing to cover Debtor A for values much larger than $175,000.

b. Market Analysis Functionality

The Market Analysis Functionality utilizes premium, deductible, and coverage data for various credit insurers and credit insurance policies to determine which credit insurer and credit insurance policy will most likely be able to satisfy a customer's credit insurance Coverage Goals (e.g., good coverage/premium ratio and low deductible) over the full effective period of desired coverage. The applications server 102 can import that data from credit insurer systems 108 as part of an automated process performed by the Market Analysis Functionality or as part of any process previously performed by the present invention's other functionality (e.g., Quote Summary Functionality, Coverage Goal Functionality, Compliance Monitoring Functionality, etc.), as discussed above. That data is aggregated by the database server 104 as historical information for subsequent use by the Market Analysis Functionality. Accordingly, that data can be retrieved from the database server 104 based on different time periods. In the alternative, a customer can send (e.g., e-mail a file, ground mail a memory device, etc.) all or some of that data to an administrator for importing into the applications server 102 and/or a user (e.g., a customer, broker, account manager, administrator, etc.) can input all or some of that data into the applications server 102 via a user interface 106 using a manual input process (e.g., scanning a document, typing on a keyboard, dictating into voice recognition software, etc).

Instead of analyzing data for specific debtors, as discussed above with respect to the Debtor Analysis Functionality, the Market Analysis Functionality analyzes the trends of specific credit insurers and/or their respective credit insurance products within a specific market, such as a specific industry (e.g., an industry defined by Standard Industrial Classification (SIC) codes, North American Industry Classification System (NAICS), etc.), region (e.g., North America, Europe, the Middle East, and Africa (EMEA); South America; etc.), country (e.g., United States, Canada, United Kingdom, etc.), or revenue range (e.g., $5M/year, $500,000/year, etc.). More specifically, the Market Analysis Functionality identifies the trends over time of how premiums change, how premiums plus deductibles change, and how the percentage of requested coverage being approved changes within a specific market. And the premiums, deductibles, and coverage percentages that are used to identify those changes correspond to the specific type of credit insurance coverage a customer desires, which a user can define by inputting certain criteria as Coverage Goals into the applications server 102 via a user interface 106. A user can also identify the specific market for which it would like to obtain those values by inputting that criteria into the applications server 1102 via a user interface 106 (e.g., inputting SIC codes, regions, countries, revenue ranges, periods of time, etc.). Some of those criteria may be input as a customer's Coverage Goals, as discussed in more detail below with respect to the Quote Summary Functionality and Coverage Goal Functionality of the present invention.

The Market Analysis Functionality also utilizes the changes in the percentage of requested coverage being approved over time to assign a coverage stability score to a credit insurer and/or credit insurance product within a specific market. That score provides a measure of whether the percentage of requested coverage for debtors that is actually approved by credit insurers is increasing or decreasing within a specific market over the effective period of the policy. In other words, it demonstrates whether credit insurers have tended to increase, reduce, or cancel the percentage of coverage provided for debtors over the relevant effective periods of their respective credit insurance policies. And the manner in which credit insurers increase, reduce, or cancel coverage determines the effectiveness and costs of those policies. Accordingly, together with the premiums and deductibles for a credit insurer, the coverage stability score can be used to predict not only the likelihood that a credit insurer will reduce or cancel coverage during the effective period of a credit insurance policy, but also to predict the likelihood that a credit insurance policy provided by the credit insurer will become less effective, provide less value and/or become more costly during that effective period.

Figure 3:
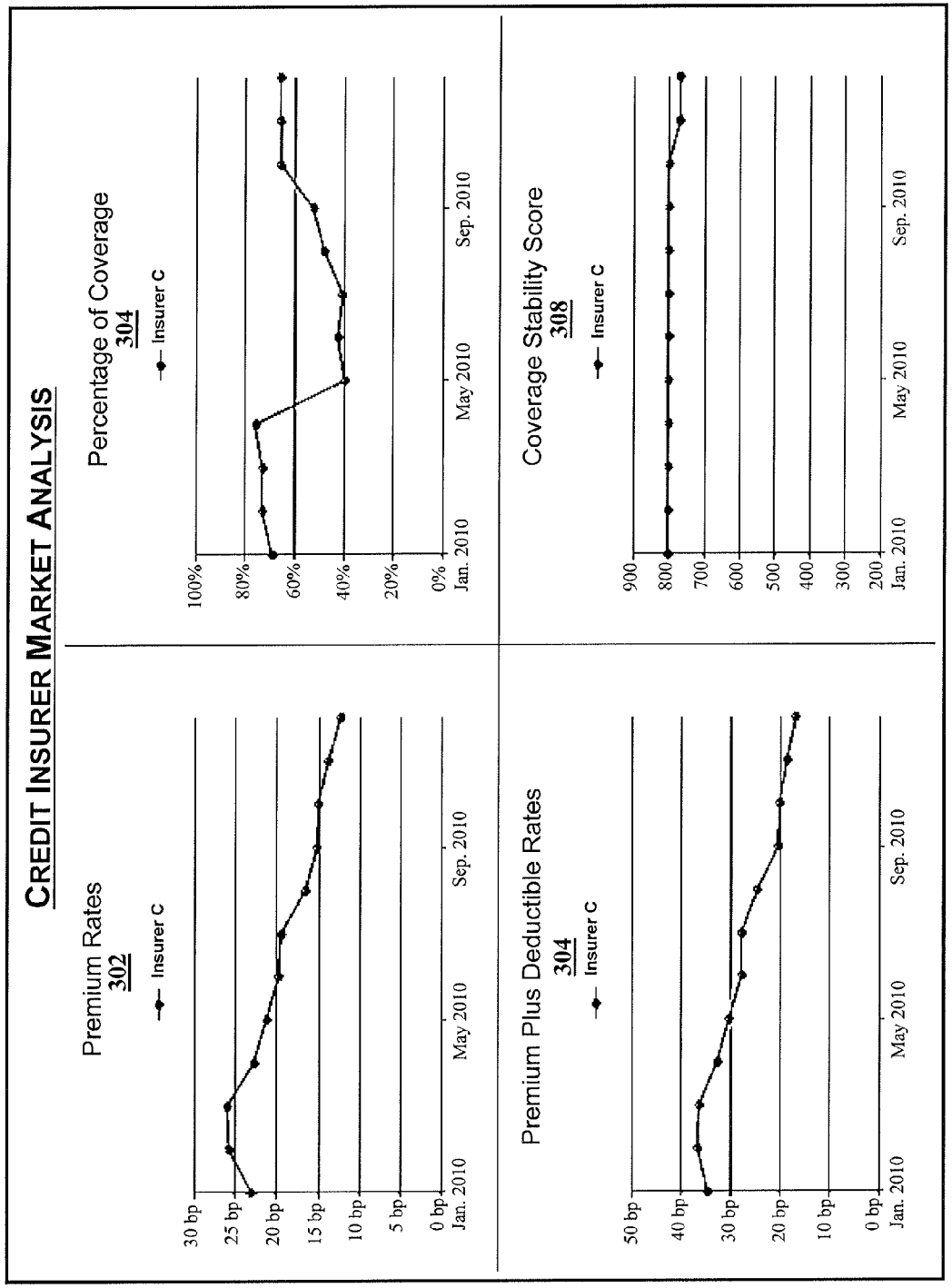
FIG. 3 is a graphical display illustrating an exemplary Credit Insurer Market Analysis according to a non-limiting embodiment of the present invention.

As FIG. 3 illustrates, the Market Analysis Functionality of the present invention analyzes all of that data and provides it to a user as a graphical display, or Credit Insurer Market Analysis 300, at a user interface 106. More specifically, the applications server 102 plots the values of premium rates, premium plus deductible rates, percentage of coverage, and coverage stability score over a designated period of time. Those values are plotted in a Premium Rates chart 302, Premium Plus Deductible Rates chart 304, Percentage of Coverage chart 306, and Coverage Stability Score chart 308, respectively.

The premium rates and premium plus deductible rates are plotted as a basis point (bp) value that represents a percentage of the policyholders' sales (e.g., 0.01%); the percentages of coverage are plotted as a percentage of credit limits authorized versus those requested for debtors; and the coverage stability scores are plotted as scores on a scale of 200 to 900. And although only one credit insurer is illustrated in FIG. 3, data for multiple credit insurers may also be plotted to provide side-by-side comparisons between those credit insurers. Using all of that data as a guide, a user can determine the likelihood that one or more credit insurers and/or credit insurance products will satisfy a customer's credit insurance Coverage Goals over the full effective period of desired coverage as well as which credit insurer will provide the optimum amount of credit insurance during that period.

For example, FIG. 3 illustrates the trend of premium rates, premium plus deductible rates, percentages of coverage, and coverage stability scores over a twelve month time period for a single credit insurer within a specific market. The premium rates and premium plus deducible rates for Insurer C have decreased over the last twelve months; the percentages of coverage approved by Insurer C have shown a steady increase starting in May; and overall coverage stability score for Insurer C have remained constant and close to the maximum level. Accordingly, Insurer C is likely to satisfy the customer's credit insurance Coverage Goals over a twelve month effective period of coverage.

c. Policy Analysis Functionality

The Policy Analysis Functionality of the present invention utilizes the information from a customer's current credit insurance policy or from a quote for a new or renewed credit insurance policy to provide a comparison of that credit insurance policy to the average values of premium rates, premium plus deductible rates, percentages of coverage, and coverage stability scores determined by the Market Analysis Functionality. The applications server 102 can import that data from credit insurer systems 108 as part of an automated process performed by the Market Analysis Functionality or as part of any process previously performed by the present invention's other functionality (e.g., Quote Summary Functionality, Coverage Goal Functionality, Compliance Monitoring Functionality, etc.). That data is aggregated by the database server 104 as historical information for subsequent use by the Market Analysis Functionality. Accordingly, that data can be retrieved from the database server 104 based on different time periods. In the alternative, a customer can send (e.g., e-mail a file, ground mail a memory device, etc) all or some of that data to an administrator for importing into the applications server 102 and/or a user (e.g., a customer, broker, account manager, administrator, etc.) can input all or some of that data into the applications server 102 via a user interface 106 using a manual input process (e.g., scanning a document, typing on a keyboard, dictating into voice recognition software, etc.).

Instead of analyzing data for specific credit insurers and/or their respective credit insurance products over time in a specific market (e.g., industry, region, country, or revenue range), as discussed above with respect to the Market Analysis Functionality, the Policy Analysis Functionality compares a customer's current policy or a quote for a new or renewed credit insurance policy to credit insurance policies of another credit insurer or to an entire market. More specifically, the Policy Analysis Functionality compares the customer's current policy or a quote for a new or renewed credit insurance policy to credit insurance policies provided by another credit insurer or to an entire market based on the average values of premium rates, premium plus deductible rates, percentages of coverage, and coverage stability scores that are determined by the Market Analysis Functionality.

Figure 4:
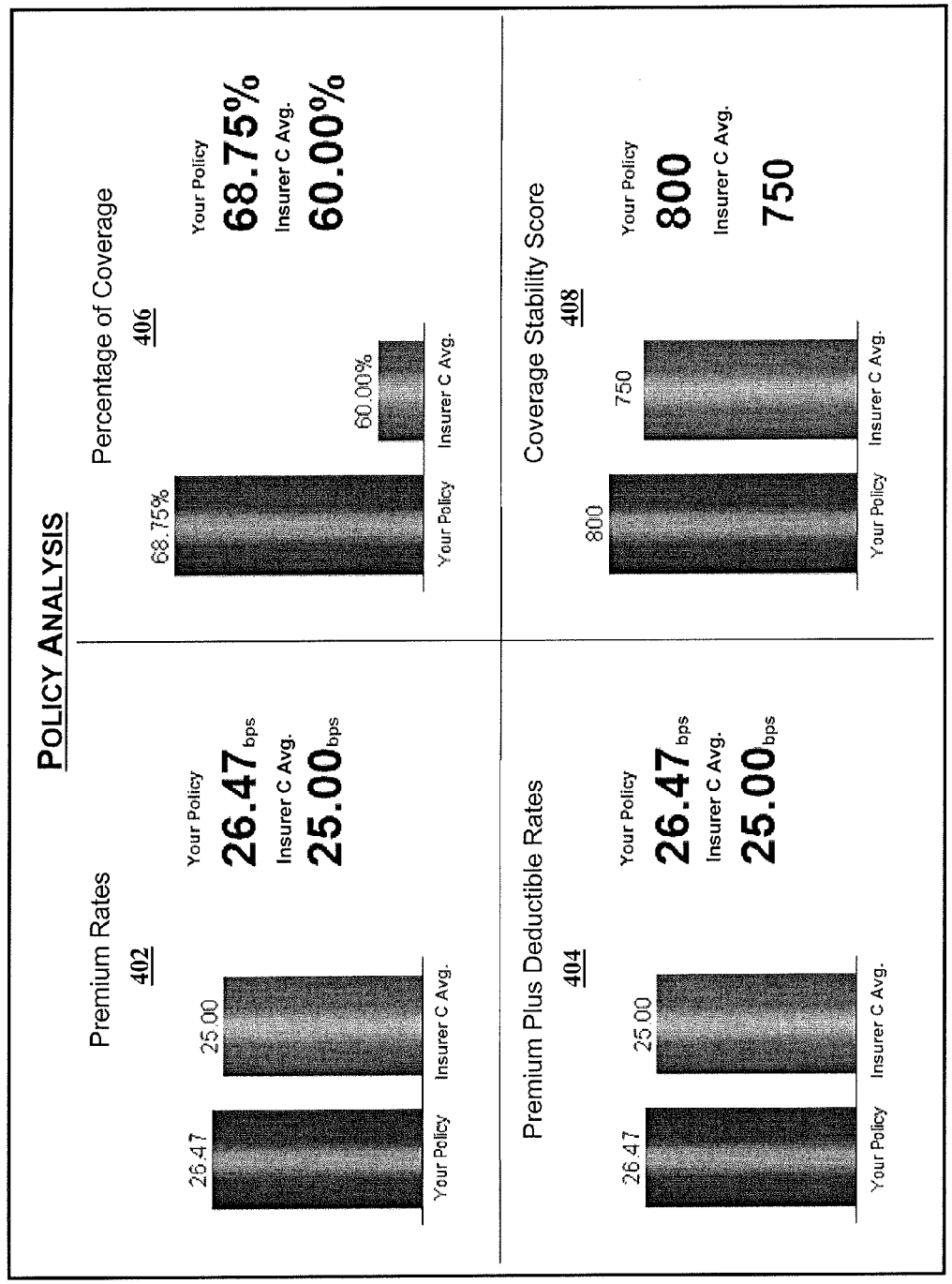
FIG. 4 is a graphical display illustrating an exemplary Policy Report according to a non-limiting embodiment of the present invention.

As FIG. 4 illustrates, the Policy Analysis Functionality of the present invention provides that data to a user as a graphical display, or Policy Report 400, at a user interface 106. More specifically, the applications server 102 displays the average values of premium rates, premium plus deductible rates, percentage of coverage, and coverage stability score for a specific market or credit insurer side-by-side with the corresponding values for a customer's current credit insurance policy. Those values are plotted in a Premium Rates bar chart 402, Premium Plus Deductible Rates bar chart 404, Percentage of Coverage bar chart 406, and Coverage Stability Score bar chart 408, respectively.

The premium rates and premium plus deductible rates are plotted as a basis point (bp) value that represents a percentage of the policyholders' sales (e.g., 0.01%); the percentages of coverage are plotted as a percentage of credit limits authorized versus those requested for debtors; and the coverage stability scores are plotted as scores on a scale of 200 to 900. Using all of that data as a guide, as user can determine how its current credit insurance policy compares to those of a specific credit insurer or those within a specific market.

For example, FIG. 4 illustrates a comparison of a customer's current credit insurance policy versus those of Insurer C. The customer's current credit insurance policy has higher premiums and deductibles than those of Insurer C, but the customer's current credit insurance policy provides significantly more coverage than those of insurer C. And because the indicated values provide a direct comparison (i.e., the two Premium Rates are determined using the same basis point and the two Percentages of Coverage are determined using the same requested amount), they can be used to determine the coverage/premium ratio (Percentage of Coverage/Premium Rates=Coverage/Premium Ratio) for the customer's current credit insurance policy (68.75/26.47=2.60) and those of Insurer C (60.00/25.00=2.40), which reveals that the customer's current credit insurance policy has a better coverage/premium ratio than those of Insurer C. Moreover, the customer's current credit insurance policy is also more stable than those of Insurer C. Accordingly, FIG. 4 indicates that the customer's current credit insurance policy meets the customer's Coverage Goals better than those of Insurer C.

The Policy Analysis Functionality of the present invention also utilizes the average values of premium rates and premium plus deductible rates that are determined by the Market Analysis Functionality and assign a customer's current credit insurance policy a competiveness score within a specific market based on how the customer's current credit insurance policy compares to those averages within that specific market.

Figure 5:
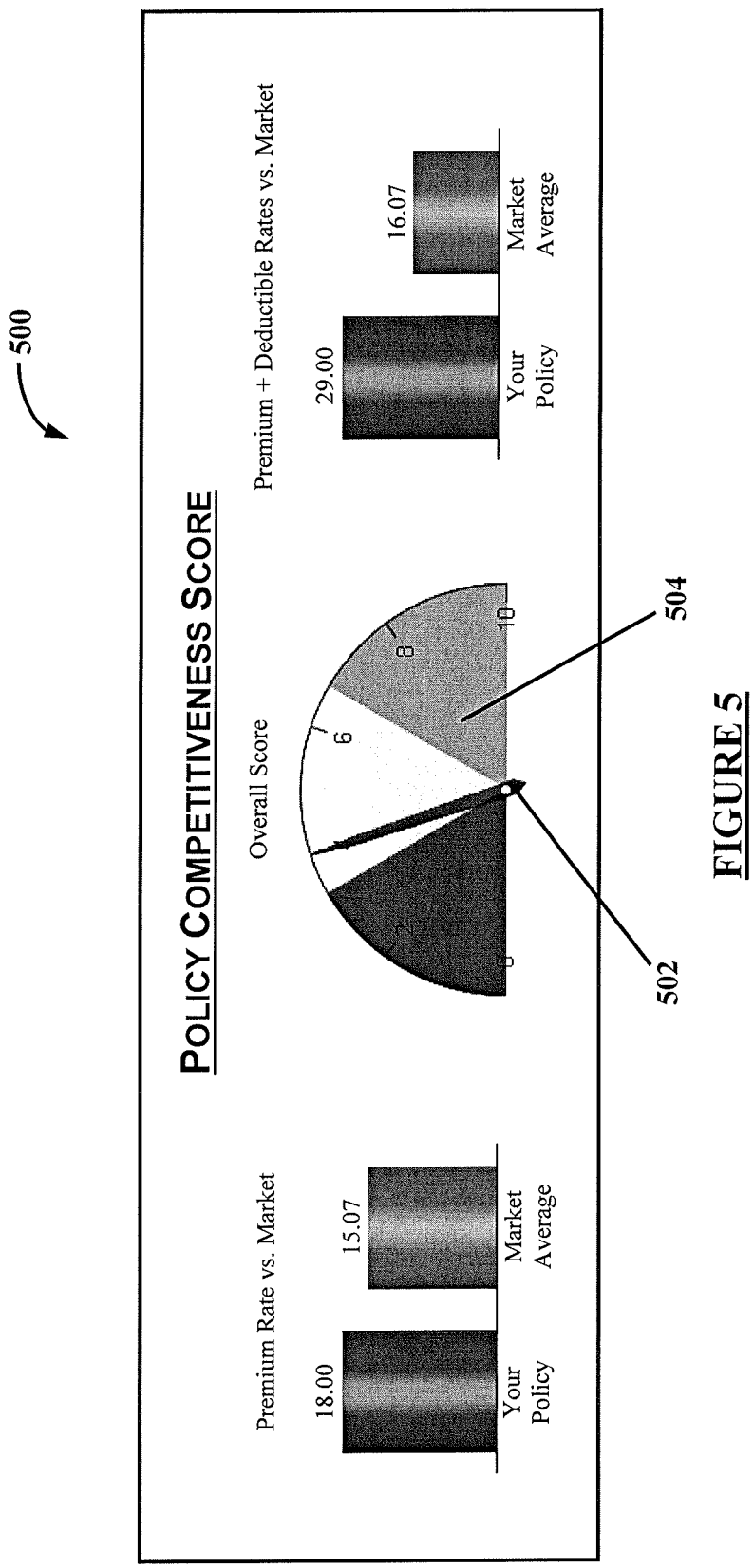
FIG. 5 is a graphical display illustrating an exemplary Competitiveness Report according to a non-limiting embodiment of the present invention.

As FIG. 5 illustrates, that data is provided to a user as a graphical display, or Competitiveness Report 500, at a user interface 106 so the user can see how a customer's current credit insurance policy is structured within a specific market. A score between 0 and 3 indicates that the customer's current credit insurance policy has a much higher premium than the rest of the market; a score between 3 and 7 indicates an average pricing structure; and a score between 7 and 10 indicates a superior pricing structure. And the customer's policy competitiveness score is indicated by a needle 502 that points to that score on a color-coded, semi-circular score meter 504, wherein had scores (1-3) appear within a red portion of the score meter 504, average scores (3-7) appear within a yellow portion of the score meter 504, and good scores appear within a green portion of the score meter 504.

d. Quote Summary Functionality

Based on the information provided by the above functionality, a customer may decide to rewrite its current credit insurance policy, renew an expiring credit insurance policy, or obtain a new credit insurance policy. But because premium rates fluctuate regularly, that information does not necessarily reflect credit insurer's current risk tolerance, which may change on a day-to-day basis. Accordingly, the customer can request quotes from different credit insurers to determine whether rewriting, renewing, or obtaining a new credit insurance policy will actually better meet its credit insurance requirements.

Desired credit insurance policy structure information may be input as part of a registration processes, or transition process, during which a customer and/or its credit insurance policy or polices are introduced into, or registered with, the system 100 of the present invention. If the customer is introduced into the system 100 without a current credit insurance policy, those credit insurance requirements can be used to identify a new credit insurance policy. If the customer is introduced into the system 100 with one or more current credit insurance policies, those credit insurance requirements can be used to rewrite that credit insurance policy. And if the customer and its credit insurance policy are already in the system 100, those credit insurance requirements can be used to either rewrite its current credit insurance policy or to renew that policy or replace it with a new one when its effective period expires.

A user (e.g., a customer, broker, account manager, administrator, etc) can input the customer's credit insurance policy structure information into the applications server 102 via a user interface 106. For example, the customer can input the following credit insurance policy structure information:

1. Coverage Type—Defines whether the credit insurance policy is a Whole Turnover policy, Named Debtor policy, Discretionary Credit Limit (DCL) policy, Rating-Multiplier policy, etc.;
2. Cancelable—Defines whether the coverage of debtors under a credit insurance policy can be cancelled by the credit insurer during the effective period of that credit insurance policy;
3. Non-Qualifying Loss (NQL)—Defines the minimum threshold of loss that must be exceeded before the credit insurance policy provides coverage;
4. Discretionary Credit Limit (DCL)—Defines the highest amount of insured credit a customer may have outstanding to any one debtor at any one time without pre-approval from the credit insurer;
5. Premium Rate—Defines the value of the premium the customer will pay for the credit insurance policy as percentage of a basis point (bp), such as the value of the customer's annual sales;
6. Deductible Rate—Defines the value of the deductible the customer will pay for the credit insurance policy as percentage of a basis point (bp), such as the value of the customer's annual sales; and
7. Coinsurance Rate—Defines the percentage of loss for which the customer will be responsible, typically in lieu of an explicit deductible dollar amount.

Although seven examples of credit insurance policy structure information are listed, a customer can also input any other information required by a credit insurer to provide a quote. Moreover, the user can input multiple values for certain credit insurance requirements (e.g., multiple Policy Types) or ranges of values for certain credit insurance requirements (e.g., ranges of NQLs, DCLs, Premium Rate, Deductible Rate, and Coinsurance Rates) so as to increase the likelihood of approval. The customer can also allow the credit insurer to set certain credit insurance requirements (e.g., Cancelable) to increase the likelihood of approval.

After a user has input the customer's credit insurance requirements into the applications server 102, the applications server 102 electronically submits requests for quotes to the credit insurer systems 108 of various credit insurers based on those credit insurance requirements. When inputting those credit insurance requirements, the user can also identify the specific credit insurers from which it wants to request quotes. Both the specific credit insurers identified and the credit insurance requirements can be guided by the information provided by the Debtor Analysis Functionality, Market Analysis Functionality, and Policy Analysis Functionality. In other words, the user can narrow down which credit insurers it would like quotes from based on how credit insurance policies from those credit insurers compared to the customer's current credit insurance policy. And the user can tailor the customer's credit insurance requirements based on the amounts, rates, percentages, etc. of coverage that those credit insurers have demonstrated a likelihood of approving. As a result, the user can greatly improve its chances of obtaining approvals and quotes.

As FIG. 6 illustrates, the Quote Summary Functionality of the present invention provides the solicited credit insurer's quotes to a user as a graphical display, or Quote Comparison Report 600, at a user interface 106. The user can specify which credit insurers 604 from which it would like to solicit quotes in a "closed" quote solicitation process, the user can solicit quotes more generally from all of the credit insurers 604 that are registered with the system 100 and that have chosen to participate in an "open" quote solicitation process. Regardless of whether the user uses the closed or open process, the credit insurers 604 that choose to respond to those solicitations will input data detailing the structure and coverage 602 they are willing to offer. Where no structure and coverage 602 information is provided for a credit insurer (e.g., Insurer E), that credit insurer either did not approve a policy that fell within the customer's credit insurance requirements, or it simply chose not respond to the request for a quote.

After reviewing the quotes provided, an account manager or broker can use a user interface 106 to input its comments and recommendations 606 for each quote. Those comments and recommendations 606 will also be provided for viewing in the graphical display. A customer can then leverage all of that information to make an informed decision as to which credit insurer to award its credit insurance policy.

IV. Goal/Compliance Module

The Goal/Compliance Module provides functionality for a user (e.g., a customer, broker, account manager, administrator, etc.) to quantify a customer's Coverage Goals in terms of the level of coverage provided to its debtors, risk mitigation, and costs. The Goal/Compliance Module also provides functionality for monitoring the customer's current credit insurance policy or policies, as well as all other available credit insurance policies, and to determine whether that customer's Coverage Goals are being met in the best way available. If one or more of those Coverage Goals is not being met, the applications server 102 will automatically move through a series of automated steps, or Milestones, to bring the customer's coverage back within those Coverage Goals with little or no input required from the user. Or the applications server 102 will initiate automated Actions that will guide the user through a series of Milestones in which the user performs various process steps (e.g., selecting a "Yes" or "No" option, importing a document or file, inputting text with a keyboard, etc.) to complete those Milestones and bring the customer's coverage back within those Coverage Goals. Either of those processes may be initiated in response to an Alert that is sent to the user requesting authorization to take the appropriate Action.

In addition to providing functionality that ensures a customer's coverage remains within its Coverage Goals, the Goal/Compliance Module also provides functionality that ensures that all the customer's credit insurance policies are, in fact, providing the amount of coverage set forth in those credit insurance policies by monitoring all the terms and conditions in those credit insurance policies that must be complied with to enforce that coverage. And when the customer is not in compliance with any of those terms and conditions, the applications server 102 will automatically move through a series of automated Milestones or guide the user through a series of process steps to bring the customer back in compliance with those terms and conditions, just as when a customer's Coverage Goals are not being met. Also as when a customer's Coverage Goals are not being met, either of those processes may be initiated in response to an Alert that is sent to the user requesting authorization to take the appropriate Action.

For ensuring that a customer's Coverage Goals are being met and that the customer is in compliance with the terms and conditions of each of its credit insurance policies, the Goal/Compliance Module includes Coverage Goal Functionality and Compliance Monitoring Functionality. The Goal/Compliance Module also includes Claim Filing Functionality for automatically filing claims on those credit insurance policies as the claims arise and Overdues Notification Functionality for automatically generate Past Due Reports and Notifications of Overdues to ensure the payability of such claims. And the Goal/Compliance Module includes Dashboard Functionality and Executive Summary Functionality for providing a user with an overview not only of how well the customer is meeting its Coverage Goals and how well the customer is complying with the terms and conditions of its credit insurance policy or policies, but also to provide the user with an overview of the state/status of various other processes for managing that customer, its credit insurance policy or policies, and the various aspects of those policies. That functionality works in conjunction with the functionality of the Marketplace Module to help ensure that customers' credit insurance policies are optimized at all times by alerting customers of non-optimal coverage issues, such as a cancellation or reduction of coverage, and automating the processes required to remediate those issues. But while that functionality is described as being provided in the Goal/Compliance Module, that description is of a preferred embodiment. Accordingly, it should be understood that the functionality in the Goal/Compliance Module may also be provided in any other software modules and/or shared between any of number of software modules without departing from the spirit of the present invention.

a. Coverage Goal Functionality

Figure 7:
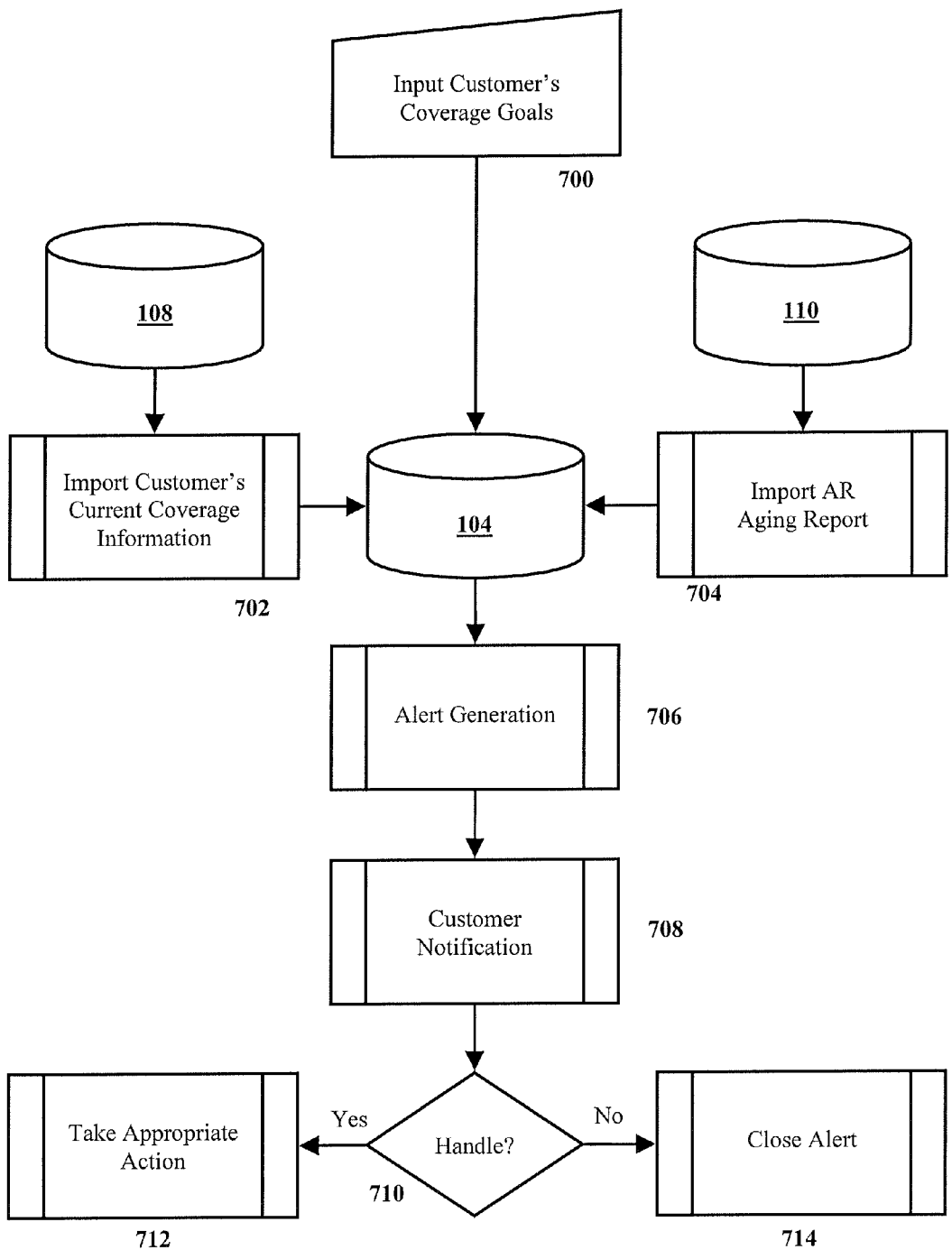
FIG. 7 is a flow chart illustrating an exemplary process implemented by the Coverage Goal Functionality of the present invention to ensure a that a customer meets its Coverage Goals.

FIG. 7 is a flow chart illustrating an exemplary process implemented by the Coverage Goal Functionality of the present invention to ensure that a customer has the specific credit insurance coverage it needs and/or desires to protect its accounts receivable. At step 700, a user defines the specific coverage the customer needs and/or desires by inputting various Coverage Goals into the applications server 102 via a user interface 106. For example, the user can input the following Coverage Goals:

1. Account Cover—Defines the specific accounts receivable that will be covered under the customer's credit insurance policy or policies;
2. Requested Limit Cover—Defines the specific amount of requested coverage that will be provided under the customer's credit insurance policy or policies; and
3. Revenue Cover—Defines the specific amount of outstanding accounts receivable that will be covered under the customer's credit insurance policy or policies.
4. Percentage of Debtors—Defines the minimum percentage of the customer's debtors that must be covered under its credit insurance policy or policies (e.g., at least 98% of customer's debtors must be covered);
5. Percentage of Requested Limit—Defines the minimum percentage of the customer's Requested Limit (i.e., the amount of coverage requested from the credit insurer) that must be approved in a credit insurance policy;
6. Specific Debtors Covered—Lists specific debtors that must be covered under the customer's credit insurance policy or policies;
7. AR Range—Defines the range of values from the customer's most recent accounts receivable for which debtors will be included in determining whether that customer's credit insurance policy or policies are meeting that customer's Coverage Goals (e.g., include all debtors with accounts receivable over $25,000 in analyzing the customer's Coverage Goals); and 8. Geographic Area—Defines the specific geographic area from which debtors will be included in determining whether that customer's credit insurance policy or policies are meeting that customer's Coverage Goals (e.g., include all debtors in the same continent, country, etc. in analyzing the customer's Coverage Goals).

The first three Coverage Goals are the primary Coverage Goals, which can be further refined with the subsequently listed Coverage Goals. And although eight total Coverage Goals are listed as examples, a user can define an unlimited number of Coverage Goals, or even a single Coverage Goal, as required to suit a specific customer's needs and/or desires. Those Coverage Goals can be met by multiple credit insurance policies whereas the credit insurance requirements discussed above with respect to the Quote Summary Functionality must be met by the specific credit insurance policy for which a quote is being sought. Accordingly, the Coverage Goal Functionality further allows a customer to define different Coverage Goals that must be met by different credit insurance policies and/or to define Coverage Goals that can be met by a combination or all of its credit insurance policies.

As discussed above, the step 700 of inputting a customer's Coverage Goals preferably occurs as part of a transition processes during which a customer and/or its credit insurance policy or polices are introduced into, or registered with, the system 100 of the present invention. In that way, as soon as a customer is registered with the system 100, the applications server 102 can being monitoring those Coverage Goals in an ongoing manner to ensure that the customer's coverage stays within those Coverage Goals. To determine if a customer's coverage falls within or outside of those Coverage Goals, in addition to any other coverage requirements, the applications server 102 imports and digitally processes data from various credit insurer systems 108 at step 702 and imports and digitally processes data from the customer's AR system 110 at step 704.

At step 702, the applications server 102 imports and digitally processes the customer's current coverage information from the credit insurer systems 108 of credit insurers currently providing credit insurance to the customer at step 702. The applications server 102 imports that information from those credit insurer systems 108 in electronic form, if available, via its network connection with those credit insurer systems 108, preferably by extracting it in tabular form (e.g., as a MICROSOFT EXCEL brand spreadsheet, Extensible Markup Language (XML) table, etc.). In the alternative, a customer can send (e.g., e-mail a file, ground mail a memory device, etc.) that information to an administrator for importing into the applications server 102 and/or a user (e.g., a customer, broker, account manager, administrator, etc.) can input that information into the applications server 102 via a user interface 106 using a manual input process (e.g., scanning a document, typing on a keyboard, dictating into voice recognition software, etc.). All of that information is then stored in a relational database by the database server 104.

The current coverage information identifies the various attributes of the customer's current credit insurance policy or policies, including premiums, deductibles, coverage, etc. Because a credit insurer may take an action that changes the coverage of the customer's current credit insurance policy at any time (e.g., cancellation), the applications server preferably imports, digitally processes, and updates that information one or more times a day. Step 702 may also occur as part of a transition process during which a customer and/or its credit insurance policy or polices are introduced into, or registered with, the system 100 of the present invention. And it may also occur as part of rewriting a current credit insurance policy, renewing an expiring credit insurance policy, or obtaining a new credit insurance policy, as discussed above with respect to the Quote Summary Functionality.

At step 704, the applications server 102 imports and digitally processes an AR Aging Report from the customer's AR system 110, typically on a monthly basis. The applications server 102 imports that information from the customer's AR system 110 in a similar manner to that described above with respect to step 702. In the alternative, a customer can send (e.g., e-mail a file, ground mail a memory device, etc.) that information to an administrator for importing into the applications server 102 and/or a user (e.g., a customer, broker, account manager, administrator, etc.) can input that information into the applications server 102 via a user interface 106 using a manual input process (e.g., scanning a document, typing on a keyboard, dictating into voice recognition software, etc.). That information is then stored in the relational database by the database server 104.

The AR Aging Report lists all of the customer's debtors and their respective outstanding accounts receivable at a specific moment in time, typically at the end of each month. That information is used to identify which debtors are covered by which credit insurance policies, if any, and to determine whether those debtors are in compliance with the terms and conditions of their respective credit insurance policies. Because those AR Aging Reports are typically updated from month-to-month, the applications server 102 preferably imports them from the customer's AR system 110 on a monthly basis. The applications server 102 may also import those AR Aging Reports more frequently, as required to identify any change in the debtors or debtors accounts receivable that need to be covered by a credit insurance policy to meet the customer's Coverage Goals. For example, the applications server 102 may import AR Aging Reports on a daily basis to identify whether the customer has taken on any new debtors that need to be covered, or the applications server 102 can import AR Aging Reports in response to any one of those reports being updated.

At step 706, the applications server 102 identifies any non-optimal coverage issues, such as insufficient account coverage, and automatically generates Alerts in real-time using the Coverage Goals input at step 700, the current coverage information and potential coverage information imported and digitally processed at steps 702, and the AR Aging Report imported and digitally processed at step 704. More specifically, the applications server 102 compares the Coverage Goals to the current coverage information and the AR Aging Report and determines whether the customer's current coverage satisfies those Coverage Goals for the debtors identified in the AR Aging Report. In other words, the applications server 102 measures all of the customer's combined coverages/protections (e.g., an insurance policy and an excess insurance policy) and determines whether the customer's Coverage Goals are being met by its current credit insurance policies. And if those Coverage Goals are not being met by the customer's credit insurance policies, the applications server 102 will generate an Alert that identifies any Coverage Goal that is not being met, any debtor for which that Coverage Goal is not being met, and the reason that Coverage Goal is not being met.

The applications server 102 determines the reason that a Coverage Goal is not being met based on a number of factors and data integration points. For example, because the applications server 102 is able to import and digitally process current coverage information from the credit insurer systems 108 of credit insurers currently providing credit insurance to the customer, the applications server 102 also is able to determine if the Coverage Goal is not being met as a result of an action taken by the credit insurer, such as a cancellation of coverage, denial of coverage, or failure to obtain coverage. And if the applications server 102 determines that the Coverage Goal is not being net as a result of an action taken by the credit insurer, the applications server 102 is able to extract the specific reason code for that action from the corresponding credit insurer system 108 (e.g., "cancellation" due to "lack of information", "denial" due to "bad sector", etc.). The applications server 102 can thereby generate an Alert to notify the customer of a credit insurer's action and the reason for that action as soon as it occurs.

In addition to identifying Coverage Goals that are not being met, debtors for which Coverage Goals are not being met, and the reasons that those Coverage Goals are not being met, the applications server 102 automates the processes required to satisfy those Coverage Goals based on the market, carrier, and product information imported and digitally processed at step 702. Those processes include submitting requests for an increase in the coverage provided by the customer's current credit insurance policy or policies and/or obtaining new credit insurance policies using the functionality of the Marketplace Module. As discussed above, the functionality of the Marketplace Module also provides a comparison of the customer's current credit insurance policy or policies to other credit insurance policies in the same marketplace so the customer can quickly and easily identify any other credit insurers and/or credit insurance policies that will help that customer meet its Coverage Goals, such as by rewriting, replacing, and/or supplementing that customer's current credit insurance policy or policies.

In other words, the applications server 102 will automatically review the customer's current coverage information and identify the Actions that need to be taken to get the customer's current credit insurance policy or policies to satisfy the customer's Coverage Goals, such as rewriting those policies to obtain new or additional coverage. The applications server 102 will automatically review the potential coverage information from various credit insurers gathered by the Marketplace Module and identify any additional amount of coverage and/or new credit insurance policy or policies that will enable the customer to meet its Coverage Goals. And the applications server 102 will even recommend new credit insurance policies based on the information generated by the Marketplace Module, such as a potential credit insurer's stability score. In that way, the Coverage Goal Functionality can work in conjunction with the functionality of the Marketplace Module to help a customer meet its Coverage Goals.

For example, if the applications server 102 determines that a specific debtor cannot be sufficiently covered or is not covered by the customer's current credit insurance policy or policies, it will identify any credit insurance policies that are available to cover the debtor in question (e.g., credit insurance policies provided by credit insurers specializing in high-risk debtors). In addition or in the alternative, the applications server 102 will determine the steps that can be taken to bring that debtor within the coverage of the customer's current credit insurance policy or policies (e.g., submitting financial statements to the credit insurer). In that way, the Alert will provide options and/or outline the process that needs to be implemented to bring the customer's coverage within the customer's Coverage Goals.

At step 708, the customer is notified of the Alert via a user-specific method of communication (e.g., e-mail, Short Message Service (SMS) text message, Instant Messaging (IM) text message, telephone call, etc.) The customer can select that user-specific method of communication, along with various other personal settings (e.g., passwords, account information, etc.), by accessing the applications server 102 with a user interface 106 and inputting the pertinent data (e.g., postal address, e-mail address, cellular telephone number, etc.) in a similar manner to that described with respect to step 700. If the customer elects to be contact via telephone call, it may be contacted by the applications server 102 using Interactive Voice Response (IVR) technology or by the user assisting them with their policy (e.g., a broker or an account manager). The customer can also select the type of Alerts it would like to receive, which may include electing not to receive certain Alerts.

Regardless of the method of communication selected, the customer will initially be presented with two options for responding any Alert it receives: 1) handle the Alert or 2) ignore the Alert. For example, the customer may receive the following Alert via e-mail:

> The AR Aging Report for November 2010 indicates that [DEBTORNAME] has fallen below the threshold for your AR Aging Report Balance coverage goal. [DEBTORNAME] has $50,000 in outstanding Accounts Receivable, but is only covered up to $25,000. Click HERE to handle the Alert. Click HERE to ignore the Alert.

Selecting the "handle the Alert" link at step 710 will automatically initiate the process for completing the required Action for remediating the cause of the Alert at step 712. And selecting the "ignore the Alert" link at step 710 will automatically close the Alert at step 714 without any Action being taken to remediate the cause of the Alert. Because of the potential consequences of ignoring an Alert, the customer will preferably be asked to confirm its decision to"ignore the Alert" when it selects that option before the Alert is closed at step 714.

As FIG. 8 illustrates, the Alert may include a copy of or a link to a graphical display, or Gap Report 800, that identifies any holes in the customer's coverage. More specifically, the Gap Report 800 identifies any debtors 802 who are not covered by the customer's current credit insurance policy or policies in accordance with that customer's Coverage Goals as well as the specific Coverage Goals 804 (e.g., Percentage of Debtors, AR Range, Coverage Type, Region, and Country) that are not being met by those debtors 802. Where applicable, the Gap Report may also identify the percentage of actual coverage provided 806 for those debtors 802 as compared to the percentage of desired coverage 808 for those debtors. Using that data as a guide, a user can determine how well a customer's Coverage Goals are being met and the reasons why any Coverage Goals are not being met.

For example, the Gap Report 800 of FIG. 8 lists the five debtors 802 that are not meeting the customer's Coverage Goals 804, which include providing 100% coverage to all debtors in all geographic areas for all AR ranges. The Gap Report 800 of FIG. 8 also lists the most recent outstanding accounts receivable amounts 810, the requested coverage amounts 812, and the actual coverage amounts 814 for each of those debtors 802 as well as coverage notes 816 that provide reason why Coverage Goals 804 are not being met. Accordingly, a user can tell from Figure that three debtors 802 (i.e., Debtor A, Debtor B, and Debtor D) are not meeting the customer's Coverage Goals 804 because their most recent outstanding accounts receivable amounts 810 are greater than their actual coverage amounts 814 and that two debtors 802 (i.e., Debtor C and Debtor E) are not meeting the customer's Coverage Goals because they are not in compliance with one or more terms and/or conditions in their respective credit insurance policy or policies, as explained in the corresponding coverage notes 816 (i.e., the actual coverage for which Debtor C and Debtor E previously qualified has been canceled or reduced below the desired coverage amount due to non-compliance issues). And because five of the customer's nine debtors 802 are not meeting that customer's Coverage Goals, the Gap Report 800 illustrates that the percentage of actual coverage provided 806 for those debtors 802 is only 44% (i.e., 5/9*100=44%), as compared to the 100% desired coverage 808.

At step 712, the applications server 102 will automatically initiate the processes for completing the various Milestones required to remediate the cause of the Alert generated at step 708. The applications server 102 may also provide functionality for walking a user through one or more Milestones that require user interaction to complete those processes. In the example of FIG. 8, those processes might include obtaining coverage for the debtors 802 that currently have no actual coverage (i.e., Debtor A, Debtor B, and Debtor D) and submitting financial documents to one or more credit insurers for the two debtors 802 that are not in compliance with one or more terms and/or conditions in their respective credit insurance policy or policies (i.e., Debtor C and Debtor E).

Figure 9:
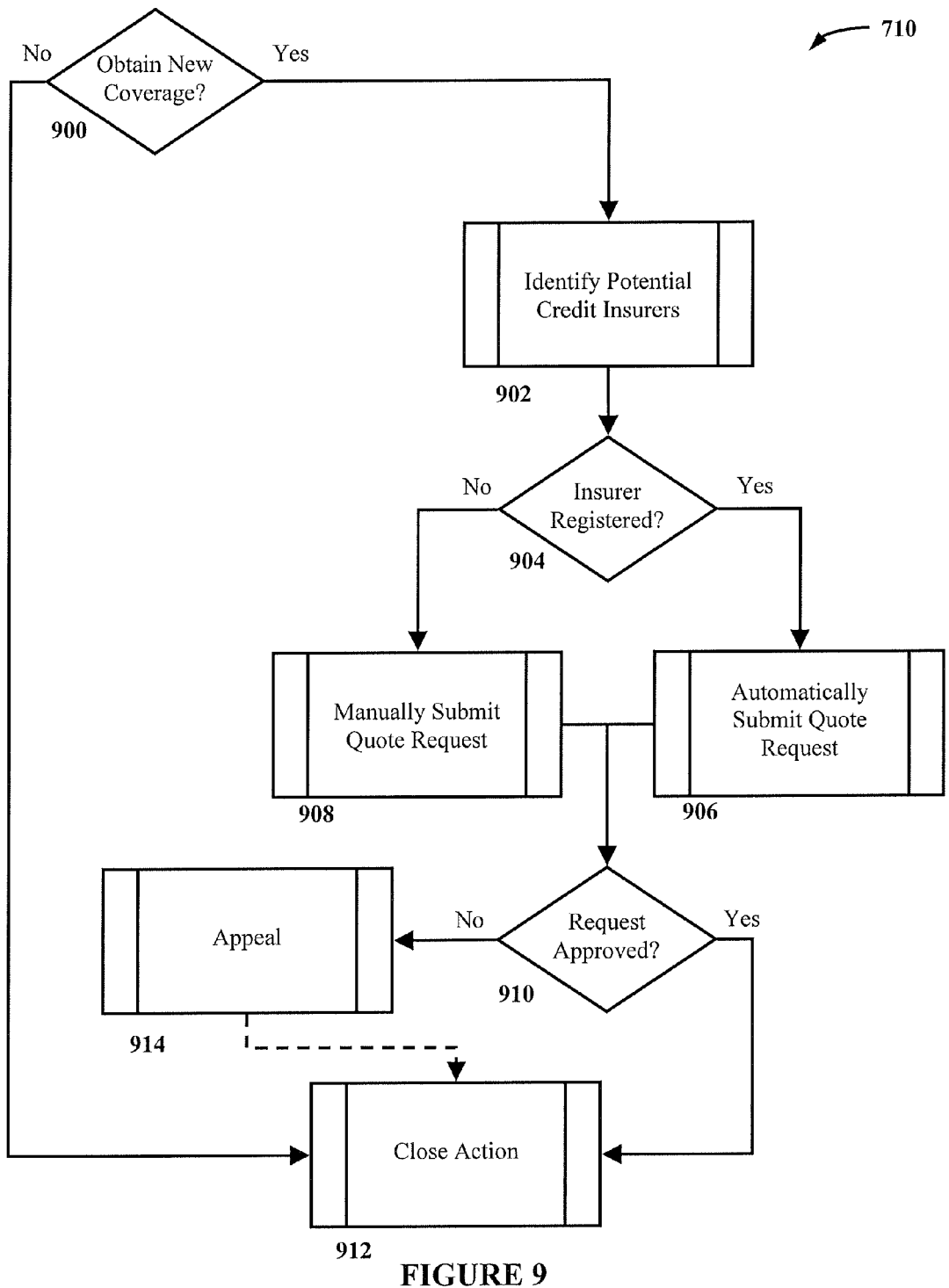
FIG. 9 is a flow chart illustrating an exemplary Action taken by the Coverage Goal Functionality of the present invention to meet a customer's Coverage Goals according to a non-limiting embodiment of the present invention.

FIG. 9 illustrates an exemplary Action, or coverage request process, that may be performed at step 712 to obtain coverage for the debtors 802 in FIG. 8 that currently have no actual coverage. The first step 900 of that process includes determining if the customer wants to obtain coverage for the debtors 802 in FIG. 8 that currently have no actual coverage. That step 900 can be performed via a telephone call with the customer and/or electronic data exchanges (e.g., e-mail, SMS text message, IM text message, etc.) during which a broker and a customer discus a coverage gap identified in a Gap Report 800. And the second step 902 of that process includes identifying credit insurers that can potentially provide the required coverage for filling the customer's coverage gap. That step can be performed using a Debtor Analysis Reports 200 created with the Debtor Analysis Functionality, a Credit Insurer Market Analysis 300 created with the Market Analysis Functionality of the Marketplace Module, and/or a Coverage Stability Summary 3100 created with the functionality of the Brokerage Module. The former can be used to determine the insurability of the subject debtor 802 within the pertinent market and the latter can be used to analyze the stability of the credit insurance policies provided by different credit insurers within the pertinent market, respectively. Based on that data, the user can decide from which credit insurers to request credit insurance to cover the subject debtor 802.

At step 904, the applications server 102 determines whether the credit insurers identified at step 902 are registered within the system 100. If a credit insurer is registered within the system 100, the applications server 102 will automatically submit a request for coverage with that credit insurer at step 906 via electronic data exchanges with the credit insurer system 108 maintained by that credit insurer. And if a credit insurer is NOT registered within the system 100, the user will need to manually submit a request for coverage with that credit insurer at step 908 via e-mail, ground mail, facsimile, filling out fields in a web page, or other suitable manual process. In either instance, the applications server 102 can be used to automatically complete any request forms that are available electronically by auto-populating fields in those forms with any corresponding data for the subject customer and debtor 802 stored on the central database by the database server 104.

At step 910, the applications server 102 determines whether the requests for coverage were approved by the corresponding credit insurers. That determination can be made using the Quote Summary Functionality of the Marketplace Module. If a request for coverage is approved, the applications server 102 will close the Action at step 912. And if a request for coverage is denied, the applications server 102 will automatically initiate a new process for appealing that denial at step 912. That appeal process may be part of the same Action or it may be a separate Action. If it is a separate Action, the Action that includes the coverage request process will be closed at step 912 as the appeal process begins at step 914.

Figure 10A:
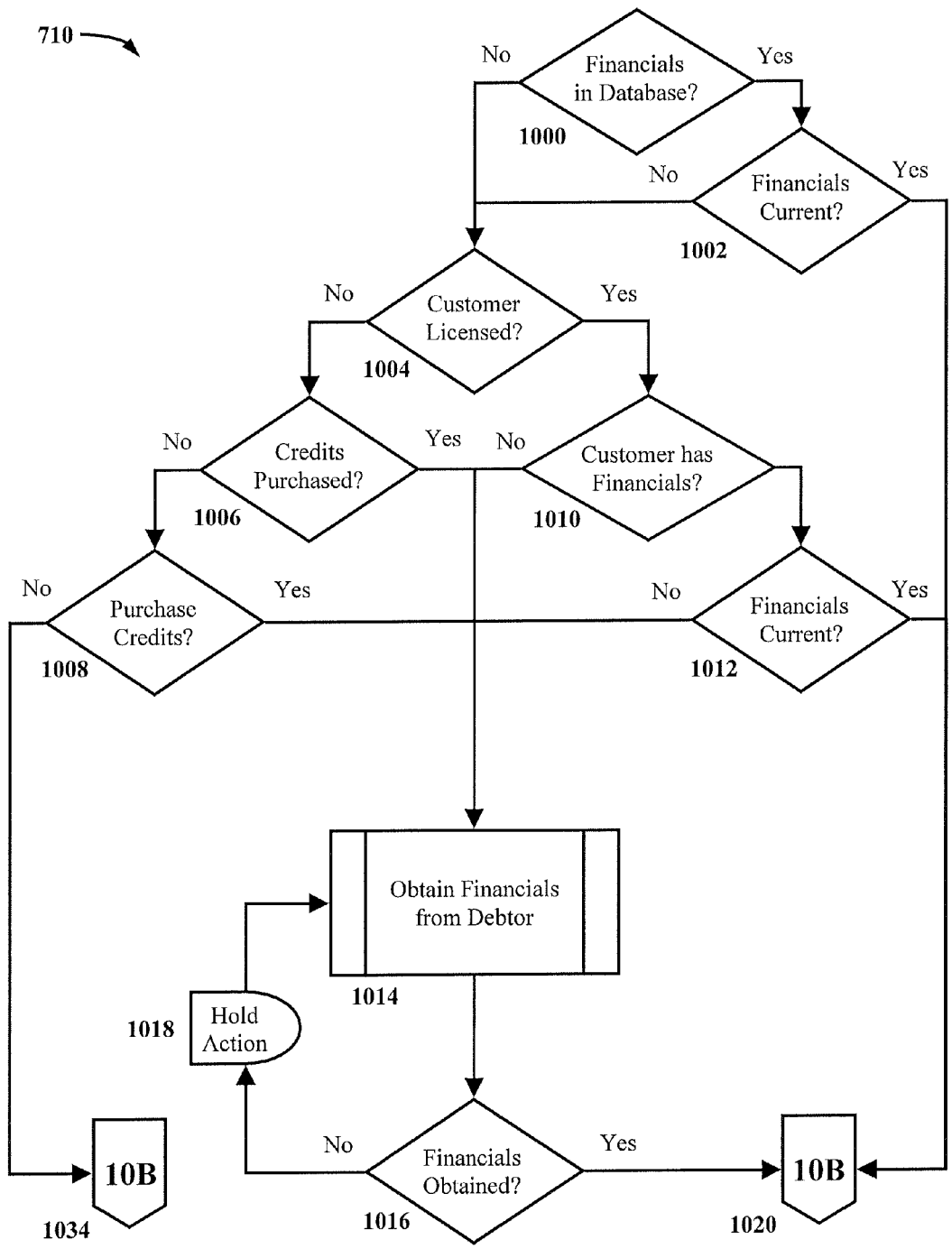
FIGS. 10A and 10B are flow charts illustrating another exemplary Action taken by the Coverage Goal Functionality of the present invention to meet a customer's Coverage Goals according to a non-limiting embodiment of the present invention.
Figure 10B:
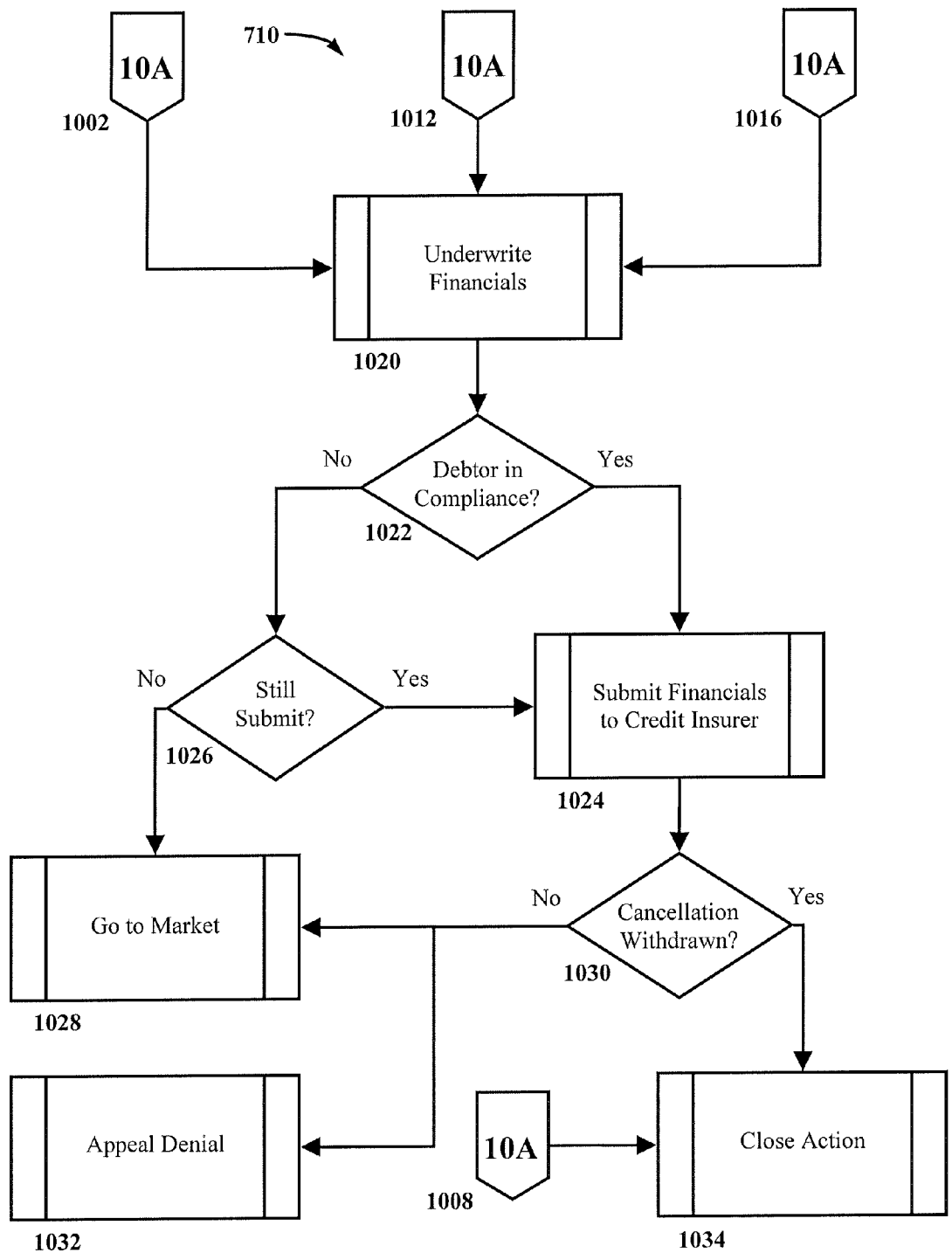

FIGS. 10A and 10B illustrate an exemplary Action, or financial submission process, that may be performed at step 712 to submit financial data to one or more credit insurers as required to bring the two debtors 802 in FIG. 8 back into compliance with one or more terms and/or conditions in their respective credit insurance policy or policies. The first step 1000 of that process includes the database server 104 searching the central database to determine whether the financial data required for the subject debtors 802 are stored on the central database. Even if the subject customer has not submitted that financial data, at least some of that financial data may have been obtained from one or more other customers that also deal with the subject debtors 802.

If the required financial data is available on the central database, the applications server 102 determines whether that data is current (e.g., within seven days of the prior month) at step 1002. And if the required financial data is not available on the central database, the applications server 102 determines whether the subject customer is a licensed user of the system 100 at step 1004. By becoming a licensed user of the Broker Module of the system 100, an unlimited number of Actions will be taken on behalf of the customer to ensure that customer's Coverage Goals are being net and continue to be met. Otherwise, the customer can purchase a specific number of "credits" that correspond to the number of Actions that will be taken on behalf of that customer. Credits are required when the subject financial data is NOT found on the central database at step 1000 and when that data is found to NOT be current at step 1002 because obtaining that data from other sources will consume additional resources of the system 100 and may even require user intervention. The credits are used to offset the costs of those additional resources.

If the required financial data for a debtor 802 is NOT found in the central database at step 1000, or if the required financial data is NOT found to be current at step 1002, the applications server 102 determines whether the customer is a licensed user of the system 100 at step 1004. If the customer is found NOT to be a licensed user of the system 100 at step 1004, the applications server 102 will determine whether that customer has purchased any credits at step 1006. And if the customer is found to NOT have purchased any credits at step 1006, the applications server 102 will send a message to the customer stating that the appropriate Action for meeting the customer's Coverage Goals cannot be taken without purchasing credits and asking the customer whether it would like to purchase credits at step 1008. That message may be sent in a similar manner to an Alert. In the alternative, steps 1004-1008 may be performed as part of the alerts generation step 706 illustrated in FIG. 7 so that the customer can be notified of any need for credits as part of the Alert sent to that customer at step 708 of FIG. 7. Those steps 1004-1008 may also be performed at the beginning of the coverage request process illustrated in FIG. 9, such as before the step 902 of identifying potential credit insurers for filling the customer's coverage gaps.

If customer is found NOT to be a licensed user of the system 100 at step 1004, is found NOT to have already purchased credits at step 1006, and declines to purchase any credits at step 1008, the Action will be closed at step 1932, as discussed in more detail below. But if customer is found to be a licensed user of the system 100 at step 1004, the applications server 102 will query that customer's AR system 110 at step 1010 to obtain the most recent financial data from in the possession of the customer. Because licensed customers will generally be registered within the system 100, that query can be performed electronically and the subject financial data retrieved via electronic data exchanges with the customer's AR system 110. If the subject financial data is found on the customer's AR system 110 at step 1010, the applications server 102 will determine whether the financial data obtained from the customer is current (e.g., within seven days of the prior month) at step 1012. If the required financial data is found to be current at step 1012, the applications server 102 will underwrite that financial data at step 1020, as discussed in more detail below. Similarly, if the required financial data is found in the central database at step 1000 and it is found to be current at step 1002, the applications server 102 will also underwrite that financial data at step 1020, as discussed in more detail below.

If the required financial data is found NOT to be current at step 1012, if the subject financial data is NOT found on the customer's AR system 110 at step 1010, if the customer decides to purchase credits at step 1008, or if the customer is found to have already purchased credits at step 1006, the required financial data will be obtained from the subject debtor 802 at step 1014. The step 1014 of obtaining the required financial data from the subject debtor 802 may include several different Activities. For example, it may involve contacting the customer to obtain the customer's permission to use its name when attempting to obtain the required financial data from the subject debtor 802. It may also include contacting the subject debtor 802 and inputting the required financial data into the applications server 102. The required financial data may be input into the applications server 102 using a manual input process (e.g., scanning a document, typing on a keyboard, dictating into voice recognition software, etc.) or using an electronic import (e.g., saving a file from an e-mail, saving a file from a memory device, importing file from a web page, importing a file from a remote server, etc.).

A time limit will generally be set for performing the step 1014 of obtaining the required financial data from the debtor 802, and at step 1016 the applications server 102 will check to see if the step 1014 of obtaining the required financial data from the debtor 802 has been completed within the set time limit. If required financial data has not been obtained from the debtor 802 within the set time limit, the Action will be temporarily closed, or put on hold, at step 1018 and scheduled for follow-up Activities at a later date. Those follow-up Activities may include placing a phone call or e-mail to the debtor 802, escalating the step 1014 of obtaining the required financial data from the debtor 802 in a user's worklist queue, and/or generating a reminder Alert at a later date for completing step 1014.

When the applications server 102 verifies that the required financial data has been obtained at step 1016, it will underwrite that data at step 1020. Underwriting the required financial data includes transforming that data by applying different formulas to determine such things as the subject debtor's 802 current ratio, quick ratio, debt-to-equity ratio, net worth, net income, and debt-to-net worth ratio. The applications server 102 compares those values to the one or more terms and/or conditions with which the subject debtor 802 was not in compliance at step 1022 to determine whether that debtor 802 is now in compliance with that one or more terms and/or conditions. If the debtor 802 is found to be in compliance with the one or more terms and/or conditions at step 1022, the required financial data will be submitted to the appropriate credit insurer at step 1024. The financial data will be submitted to the appropriate credit insurer via electronic data exchanges with that credit insurer's credit insurer system 108. Or if that credit insurer is not registered within the system 100, the financial data can be submitted to the credit insurer manually, as discussed above with respect to step 908.

Figure 17:
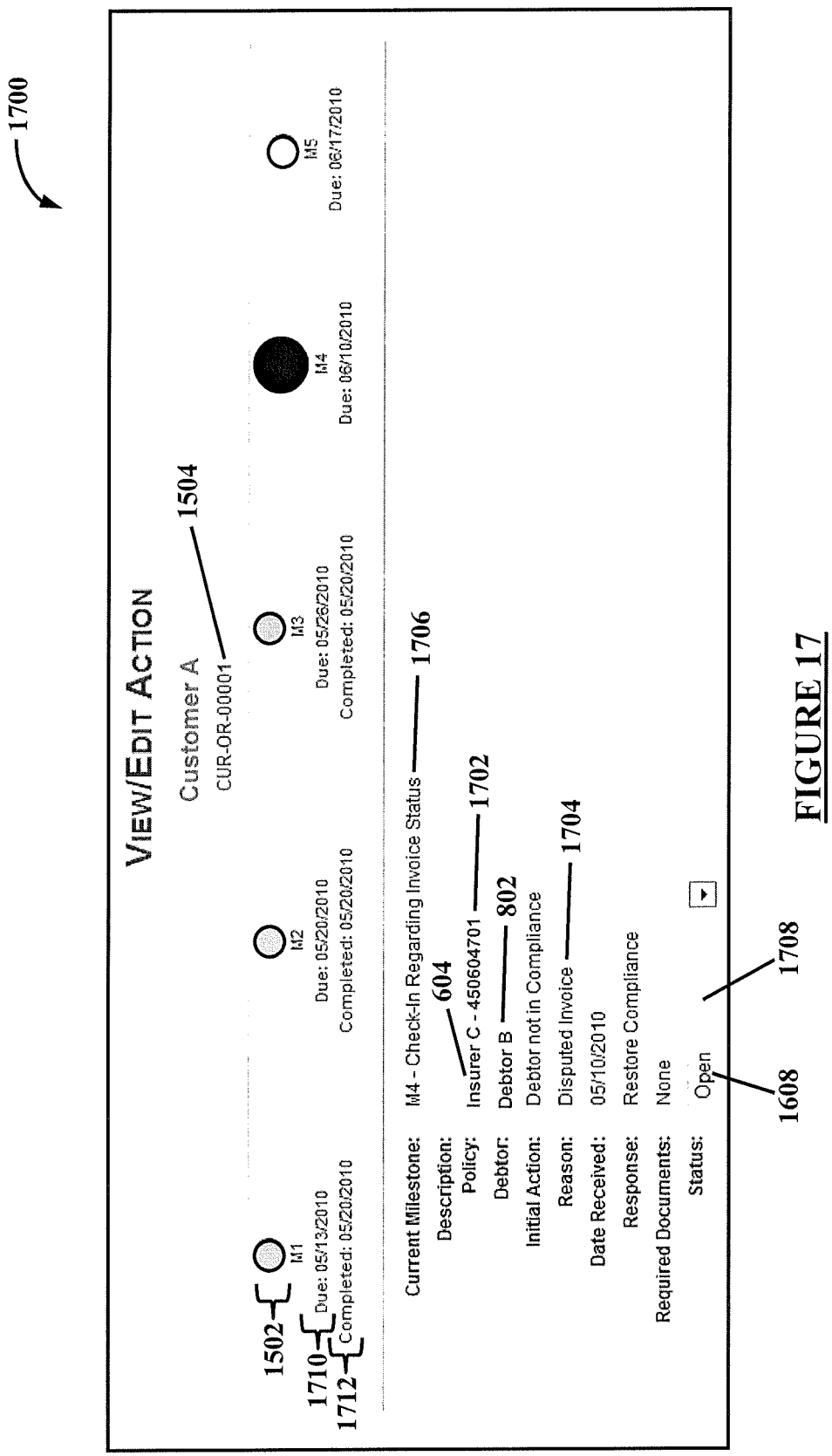
FIG. 17 is a graphical display illustrating an exemplary Action Report according to a non-limiting embodiment of the present invention.

Even if the debtor 802 is found NOT to be in compliance with the one or more terms and/or conditions at step 1022, the customer can choose to submit the subject financial data to the appropriate credit insurer anyway at step 1026. Or the customer can choose NOT to submit that financial data at step 1026, in which instance the applications server 102 will initiate a new Action at step 1028 in which the functionality of the Marketplace Module can be used to go to market and obtain new and/or additional coverage for the subject debtor 802. That Action may also be initiated if the credit insurer does not withdraw the cancellation of coverage for that debtor 802 at step 1030. In the alternative, the applications server 102 can initiate a new Action at step 1032 for appealing the cancellation coverage for the subject debtor 802. But if the credit insurer does withdraw the cancellation of coverage for the subject debtor 802 at step 1030, the applications server 102 will end the financial submission process and that Action will be identified as being "Closed" in its corresponding Action Report 1700 (FIG. 17).

As the examples above demonstrate, the step 712 of completing the required Action for remediating the cause of an Alert can include multiple process steps, or Milestones, for completing that Action. That Action may also be linked to other Actions. Similarly, each Milestone may include different Activities that must be completed as part of that Milestone. Those Actions, Milestones, and Activities and the manner in which they are performed to ensure a customer is meeting its Coverage Goals may be preprogrammed in the applications server 102. They may also be defined by a user as required to meet its individual needs and/or desires.

A user can utilize "wizard" functionality provided with the system 100 to define different Actions, Milestones, and Activities and the manner in which they are performed. The data structure of those Actions, Milestones, and Activities is defined to enable customizable, comprehensive, and flexible implementation of the processes required to handle any Event that is causing a customer's Coverage Goal NOT to be met, as well as the corresponding process steps, or Milestones, required to respond to that Event so the customer's Coverage Goals will again be met. Like the Milestones themselves, the wizard functionality will guide users through the process steps required to define different Actions, Milestones, and Activities by asking a series of predefined questions and/or presenting predefined options from which the user can select. In that way, different users can utilize different steps in different orders to respond to different Events in different ways. Different users can also utilize different steps for responding to the same Events. Accordingly, each Action, Milestone, and Activity may be specific to each customer, credit insurer, credit insurance policy, debtor, or broker.

As FIG. 11 illustrates, the applications server 102 compiles all of the Events that may require a responsive Action and presents them to a user in a graphical display, or Event List 1100. A user can add a new Events to the Event List 1100 by clicking on or otherwise selecting an "Add" button 1102, edit an Event identified in the Events List 1100 by clicking on or otherwise selecting an "Edit" button 1104, and/or delete an Event identified in the Events List 1100 by clicking on or otherwise selecting a "Delete" button 1106. Preferably, that functionality is only available to an administrator or a manager. Administrators can be part of a brokerage organization or employees of the party that maintains the system 100 of the present invention. And managers are generally parties that manage multiple brokers within a brokerage organization. Those parties can access the functionality of the Event List 1100 to define and modify various Events as required to meet specific customer's needs and/or desires.

Upon clicking on or otherwise selecting one of the "Add" button 1102 or "Edit" button in the Event List 1100, the applications server 102 will navigate a user to a graphical display, or New Event Input Page 1200, where that user can add the name and a detailed description of a new Event or edit the name and/or detailed description of an existing Event. In the latter instance, the user will be asked to select which Event in the Event List 1100 is to be edited before navigating the user to the New Event Input Page 1200. As FIG. 12 illustrates, the New Event Input Page 1200 includes an "Event Name" box 1202 where the user can add or edit the name of an Event by typing or otherwise inputting text, a "Description of Event" box 1204 where the user can add or edit the detailed description of the Event by typing or otherwise inputting text, and a "Submit" button 1206 that the user can click on or otherwise select to submit that new or edited Event to the database server 104 for storage on the central database. Upon clicking on or otherwise selecting the "Submit" button 1206 in the New Event Page Input 1200, the new or edited Event will thereafter appear in the Events List 1100 with the name added or edited using the New Event Input Page 1200.

Figure 13B:
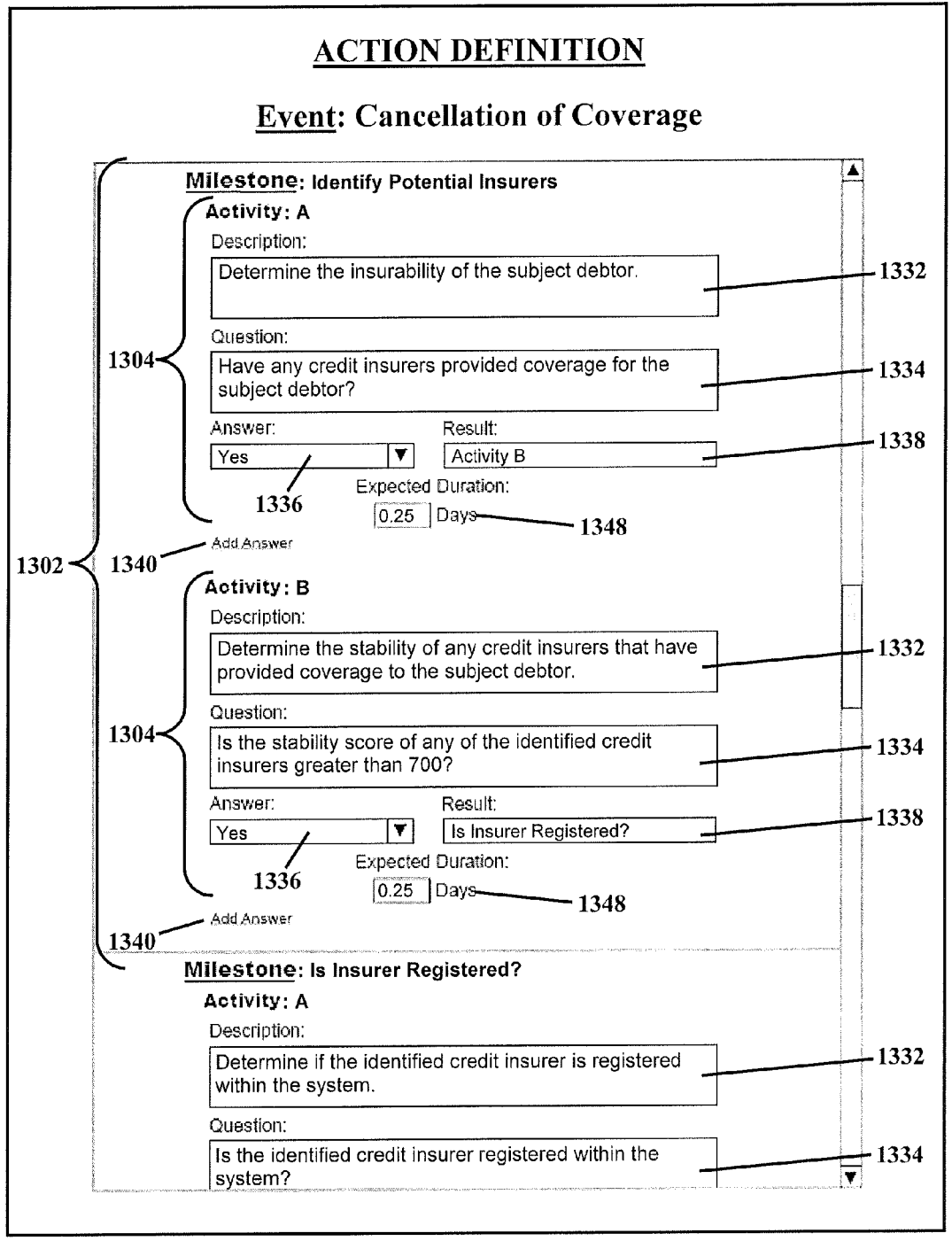

Upon clicking on or otherwise selecting an Event in the Event List 1100, the applications server 102 will navigate the user to a graphical display, or Action Definition Page 1300, where the user can define or edit the appropriate Action for responding to that Event. As FIGS. 13A and 13B illustrate, the Action Definition Page 1300 includes a Start Condition 1302 for the subject Event and Milestones 1304 and Activities 1306 for carrying out the process steps of one or more Actions in response to that Event. Different Events have their own unique Start Conditions 1302 defined by different combinations of conditions. For example the Start Condition 1302 may be defined based on conditions such as the reason 1308 the Event occurred, the credit insurer 1310 associated with the Event, the broker 1312 managing the associated credit insurance policy or policies, the debtor type 1314 of the subject debtor 802, the coverage type 1316 provided by the associated credit insurance policy or policies, the minimum credit limit 1318 and maximum credit limit 1320 provided the associated credit insurance policy or policies, the region 1322 and country 1324 where the subject debtor 802 is located, and the minimum outstanding balance 1326 and maximum outstanding balance 1328 of the subject debtor's 802 accounts receivable. And although not illustrated in FIG. 13A, the Start Condition 1302 may also be based on conditions such as start date, completion date, length of time overdue, status, policy, customer, and parent action.

As illustrated in FIG. 13A, each of those different conditions 1308-1328 can be chosen from a pulldown list that includes different choices for each condition 1308-1328, a user can add different choices to those pull-down lists in a similar manner to that described below with respect to the answer 1336 in an Activity 1306. A user can also add or remove entire conditions from the Start Condition 1302. Accordingly, there can effectively be an unlimited number of Start Conditions 1302 defined by an unlimited number of different combinations of conditions.

Each combination of conditions 1308-1328 within a Start Condition 1302 is unique to a specific Event and has a corresponding process 1330 for responding to that Event. That process 1330 is defined by the different Milestones 1304 and Activities 1306 that are used to carry out the steps of that process 1330. Each Milestone 1304 includes one or more Activities 1306 that must be completed before the process 1330 continues on to the next Action, Milestone 1304, or Activity 1306. And each Activity 1306 includes a description 1332 of the process step that is to be conducted by that Activity 1306 and a question 1334 that is to be answered as a result of that Activity 1306. The user can name the process 1330 and compose the description 1332 and question 1334 for each Activity 1306 by typing or otherwise inputting text into the corresponding areas of the Action Definition Page 1300. Although not illustrated in FIGS. 13A and 13B, each Activity 1306 may also include areas for inputting a start date, completion date, responsible user, and notes.

A user can also define different answers 1336 to the question 1334 in each Activity 1306 along with a different result 1338 for each different answer 1336. A user can add different answers 1336 to that question 1334 by clicking on or otherwise selecting an "Add Answer" link 1340 provided on the Action Definition Page 1300. As illustrated in FIG. 13A, the applications server 102 will display a pop-up window 1342 on the Action Definition Page 1300 when a user clicks on or otherwise selects the "Add Answer" link 1340. Within that pop-up window 1342, a user can type or otherwise input answer text 1344 that corresponds to a potential answer 1336 to the question 1334. The answers 1336 defined by that answer text 1344 may binary (e.g., "Yes" or "No"), free-form (e.g., "Customer Could Not Be Reached", "Debtor Disputes Invoice", etc.) or numerical (e.g., ">60", "0.25", "$25,000", etc.). The user can also choose a result type 1346 from a pull-down menu of result types 1346 to define what will occur if the answer 1336 defined by the answer text 1344 is arrived at in response to the question 1334.

For example, a user can choose the "Begin New Action" result type 1346 to begin a new Action; a user can choose the "Begin New Activity" result type 1346 to begin a new Activity 1306 within a Milestone 1304; a user can choose the "Begin New Milestone" result type 1346 to begin a new Milestone 1304 within an Action; a user can choose the "Close Action—Success" result type 1346 to close the Action; or a user can choose the "Close Action—Other" result type 1346 to temporarily close, or put on hold, completion of the Action. Upon choosing the "Begin New Action" result type 1346, the applications server 102 will automatically navigate the user to a list of processes 1330 from which that user can choose to link the answer 1336. Upon choosing the "Begin New Activity" result type 1346, the applications server 102 will automatically navigate the user to a list of Activities 1306 from which that user can choose to link the answer 1336. Upon choosing the "Begin New Milestone" result type 1346, the applications server 102 will automatically navigate the user to a list of Milestones 1304 from which that user can choose to link the answer 1336. And upon choosing the "Close Action—Other" result type 1346, the applications server 102 will automatically navigate the user to scheduling functionality for scheduling a time or identifying an Event that will re-initiate the Action at a later date. The lists of processes 1330, Activities 1306, and Milestones 1304 from which the user can choose are preferably provided in a similar manner and with similar functionality to the Event List 1100 and New Event Input Page 1200 described above.

A user can create a plurality of answers 1336 for each question 1334 with a corresponding number of different results 1338. Because each result 1338 may be linked to any new Action, Milestone 1304, or Activity 1306, and because a user can define their own Actions, Milestones 1304, and Activities 1306 using the wizard functionality, a user can effectively define an unlimited number of answers 1336 and results 1338 for each question 1334. Those answers 1336 can be manually selected or otherwise chosen from a pull-down menu by a user, or they can be automatically selected or otherwise chosen by the applications server 102 using logical decisions and evaluations programmed into the business logic tier. Accordingly, each Action, Milestone 1304, and Activity 1306 may be performed by a user, the applications server 102, or a combination thereof.

A user can also specify a duration 1348 of time during which each Activity 1306 is expected to be completed. The user can specify the duration 1348 of each Activity 1306 by typing or otherwise inputting the desired length of time into the corresponding area of the Action Definition Page 1300. As that length of times expires, the applications server may generate an Alert to inform the user responsible for completing that Activity 1306 that it is overdue or coming overdue. The applications server 102 may also escalate that Activity 1306 or its corresponding Milestone 1304 in that user's worklist queue. A user can define how the applications server 102 reacts to an Activity 1306 being overdue or coming overdue as required to suit its needs and/or desires, such as scheduling a follow-up Action to occur after a specific length of time has passed since an Action should have been completed.

The exemplary Action Definition Page 1300 of FIGS. 13A and 13B corresponds to the Action, or coverage request process, illustrated in FIG. 9. As FIGS. 13A and 13B illustrate, the Event that triggered that Action was that a debtor was not covered under the customer's credit insurance policy or polices (i.e., "Event: Debtor Not Covered"). The reason 1308 for that Event is that the subject debtor "Does Not Qualify" for coverage under the credit insurance policy or policies provided by the identified credit insurer 1310 (i.e., "Insurer C"), as set forth in the Start Condition 1302 of the process 1330 for responding to that Event. The process 1330 for responding to that Event is to "Obtain New Coverage" for the subject debtor.

The first Milestone 1304 (i.e., "Milestone: Does Customer Want to Obtain New Coverage?") of the process 1330 illustrated in FIGS. 13A and 13B corresponds to step 900 of the Action illustrated FIG. 9. As illustrated in FIG. 13A, that Milestone 1304 includes one Activity 1306 (i.e., "Activity: A"), which involves contacting the customer to discuss the coverage gap identified in a Gap Report 800, as described in the description 1332. Based on that discussion, the user obtains an answer 1336 to the question 1334 of whether the customer granted permission to obtain coverage for the debtor that does not qualify for coverage under the customer's current credit insurance policy or policies. Obtaining the answer 1336 to that question 1334 completes the Activity 1306 and determines how the process 1330 will proceed based on the result 1338 associated with that answer 1336.

As illustrated in FIG. 13A, a user has defined the result 1338 for the answer 1336 "Yes" with a "Begin New Milestone" result type 1346 so that the process 1330 will proceed to the second Milestone 1304 (i.e., "Identify Potential Insurers") when the answer 1336 to the question 1334 is determined to be "Yes". And as illustrated in FIG. 9, the result 1338 for the answer "No" is defined with a "Close Action—Success" result type 1346 so that the process 1330 will proceed end and the Action will be designated as "Closed" when the answer 1336 to the question 1334 is determined to be "No". There may also be a result 1338 for the answer "Customer Could Not Be Reached" defined with a "Close Action—Other" result type 1346 so that the process 1330 will be temporarily closed, or put on hold, until a later date, at which time another attempt to contact the customer will be made.

The second Milestone 1304 (i.e., "Milestone: Does Customer Want to Obtain New Coverage?") of the process 1330 illustrated in FIGS. 13A and 13B corresponds to step 902 of the Action illustrated in FIG. 9. As illustrated in FIG. 13B, that Milestone 1304 includes two Activities 1306 (i.e., "Activity: A" and "Activity: B"). The first Activity 1306 involves determining the insurability of the subject debtor within the pertinent market using a Debtor Analysis Reports 200 created with the Debtor Analysis Functionality. Based on that determination, the user obtains an answer 1336 to the question 1334 of whether any credit insurers have been willing to provide coverage for the subject debtor. Obtaining the answer 1336 to that question 1334 completes the first Activity 1306 of the second Milestone 1304 and determines how the process 1330 will proceed based on the result 1338 associated with that answer 1336.

As illustrated in FIG. 13B, a user has defined the result 1338 for the answer 1336 "Yes" with a "Begin New Activity" result type 1346 so that the process 1330 will proceed to the second Activity 1306 (i.e., "Activity B") within the second Milestone 1304 when the answer 1336 to the question 1334 is determined to be "Yes". And when the answer 1336 to the question 1334 is determined to be "No", the Action may be temporarily closed, or put on hold, by a "Close Action—Other" result type 1346 so that an attempt to find coverage for the subject debtor can be made at a later date. In the alternative, a new Action or Milestone 1304 may begin based on a "Begin New Action" or "Begin New Milestone" result type 1346 when the answer 1336 to the question 1334 is determined to be "No". Such new Actions or Milestones 11304 might include, for example, a process of appealing a denial of coverage for the subject debtor. Proceeding with such a new Action or Milestone 1304 will complete the second Milestone 1304.

The second Activity 1306 of the second Milestone 1304 involves analyzing the stability of the credit insurance policies provided by the credit insurers identified during the first Activity 1306 of the second Milestone using a Credit Insurer Market Analysis 300 created with the Market Analysis Functionality and/or a Coverage Stability Summary 3100 created with the functionality of the Brokerage Module. Based on that analysis, the user obtains an answer 1336 to the question 1334 of whether any of those credit insurers have earned a stability score of greater than 700. Obtaining the answer 1336 to that question 1334 completes the second Activity 1306 of the second Milestone 1304 and determines how the process 1330 will proceed based on the result 1338 associated with that answer 1336.

As illustrated in FIG. 13B, a user has defined the result 1338 for the answer 1336 "Yes" with a "Begin New Milestone" result type 1346 so that the process 1330 will proceed to the third. Milestone 1304 (i.e., "Is Insurer Registered?") when the answer 1336 to the question 1334 is determined to be "Yes". And when the answer 1336 to the question 1334 is determined to be "No", the Action may be temporarily closed, or put on hold, by a "Close Action—Other" result type 1346 so that an attempt to find coverage for the subject debtor can be made at a later date. In the alternative, a new Action or Milestone 1304 may begin based on a "Begin New Action" or "Begin New Milestone" result type 1346 when the answer 1336 to the question 1334 is determined to be "No". Such new Actions or Milestones 1304 might include, for example, repeating the process step of the second Activity 1306, except that the answer 1336 to the question 1334 is based on whether any of the subject credit insurers have earned a stability score of greater than 600 rather than 700. The process steps can continue on in that manner until the answer to the question 1334 is determined to be "Yes" (i.e., until at least one credit insurer has a stability score higher than the set value), at which point the second Milestone 1304 will be completed and the process 1330 will return to and proceed with the third Milestone 1304 (i.e., "Milestone: Is insurer Registered?") illustrated in FIG. 13B.

The third Milestone 1304 of the process 1330 illustrated in FIGS. 13A and 13B corresponds to step 904 of the Action illustrated in FIG. 9. And although not illustrated, the process 1330 illustrated in FIGS. 13A and 13B may continue on in a manner similar to that described above to carry out the remaining steps 906-912 of the Action illustrated in FIG. 9. The steps 1000-1034 of the Action, or financial submission process, illustrated in FIGS. 10A and 10B may be defined in a similar manner. The description of the remaining steps 906-912 of FIG. 9 and the Action of FIGS. 10A and 10B are omitted merely for the sake of brevity. Moreover, a person having ordinary skill in the art would readily appreciate how those steps 906-912 and 1000-1034 would be defined with the wizard functionality based on the discussion above, just as they would readily appreciate how to define other Actions, Milestones 1304, and Activities 1306 for various other Events based on that discussion. Accordingly, the wizard functionality can be used to define processes for remediating substantially any non-optimal coverage issue.

b. Compliance Monitoring Functionality

Figure 14:
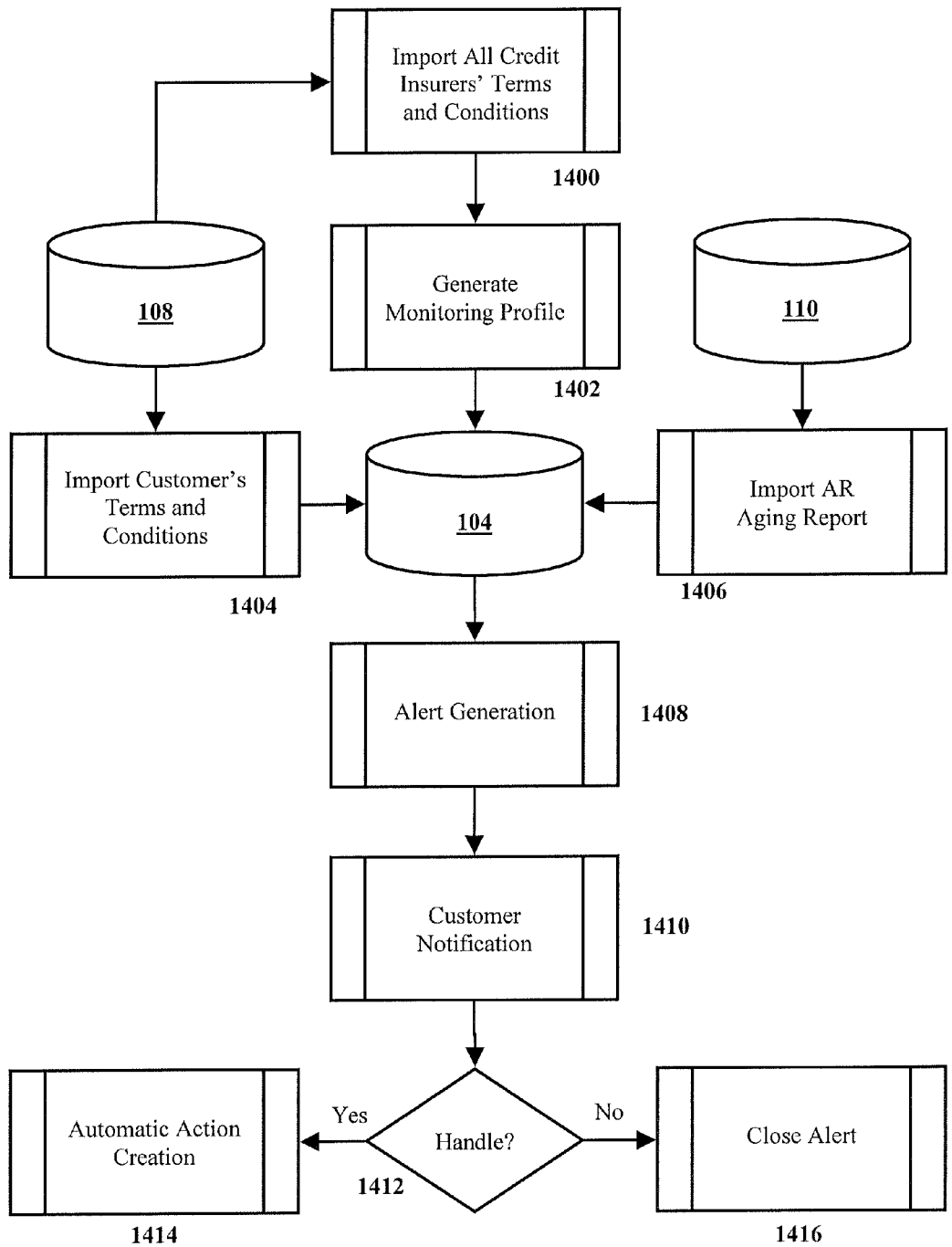
FIG. 14 is a flow chart illustrating an exemplary process implemented by the Compliance Monitoring Functionality of the present invention to ensure a customer maintains compliance with its credit insurance policy or policies and/or to being that customer back into compliance with its credit insurance policy or policies.

FIG. 14 is a flow chart illustrating an exemplary process implemented by the Compliance Monitoring Functionality of the present invention. That process automatically monitors, manages, alerts, and assists users (e.g., a customers, brokers, account managers, administrators, etc.) as required to prevent and/or remediate any type of compliance issue that may arise or exist with a customer's credit insurance policy or policies. At step 1400, the applications server 102 imports and digitally processes the terms and conditions for various credit insurance policies from the credit insurer systems 108 of the credit insurer's that offer those policies. The applications server 102 imports that information in electronic form, if available, by extracting the terms and conditions of those credit insurance policies directly from the corresponding electronic policy documents. In the alternative, a customer can send (e.g., e-mail a file, ground mail a memory device, etc) that information to an administrator for importing into the applications server 102 and/or a user can input that information into the applications server 102 via a user interface 106 using a manual input process (e.g., scanning a document, typing on a keyboard, dictating into voice recognition software, etc.). That information is then stored in the relational database by the database server 104.

The applications server 102 scrapes the credit insurer systems 108 of various credit insurers to detect any changes in the terms and conditions of the policies offered by those credit insurers. When such changes are identified, the applications server 102 imports and digitally processes the pertinent information and the database server 104 uses it to update the central database. And because that information may change from day-to-day, the applications server 102 preferably imports and digitally processes that information on a daily basis. In that way, the applications server 102 maintains an up-to-date listing of all of the possible terms and conditions that may appear in a customer's credit insurance policy or policies.

At step 1402, each of the terms and conditions imported, digitally processed, and/or updated at step 1400 is used to create corresponding rules and triggering Events that will be used by the applications server 102 to automatically monitor the whether a customer is in compliance with the terms and conditions of its credit insurance policy or policies. Those rules and triggering Events can be created automatically by the applications server 102 using data recognition, parsing, and transformation techniques. They may also be defined by a user via the wizard functionality discussed above. In that way, the rules and triggering Events can be used to drive automated processes that will identify, alert users of, and correct any non-compliance issues with the terms and conditions of the customer credit insurance policy or policies. And the Milestones 1304/Activities 1306 required to identify, alert users of, and correct those non-compliance can be automatically performed by the applications server 102 and/or performed by a user via interactive features that will walk that user through one or more of those Milestones 1304/Activities 1306.

To help support those automated processes, the terms and conditions imported and digitally processed by the applications server 102 at step 1400 are categorized based on the type of coverage provided by their corresponding credit insurance policies because those terms and conditions closely relate to the type of coverage provided. For example, Whole Turnover policies provide coverage for every debtor in a customer's accounts receivable portfolio up to a predetermined limit; Named Debtor policies (also called "critical customer policies") provide coverage only for those debtors expressly named in the policy; Discretionary Credit Limit (DCL) policies provide coverage to any debtors that satisfy specific qualifying requirements set forth in the policy (e.g., qualifying values that must be represented in accounts receivable information for one or more debtors to qualify for insurance coverage), without pre-approval from the credit insurer, up to a predetermined limit; and Rating-Multiplier policies (e.g., EZ COVER brand Rating-Multiplier policies) provide coverage to any debtors with a high enough rating assigned by the credit insurer up to a predetermined limit that has a multiplier based on that rating. And the debtors covered by Whole Turnover policies and Named Debtor policies must be pre-approved by the credit insurer, while debtors covered by DCL policies can be qualified for coverage at any point during the effective period of the policy. As a result, the terms and conditions required to comply with such policies are more extensive than those for Whole Turnover policies and Named Debtor policies. Those terms and conditions are therefore categorized based on the type of policy they define.

By way of more specific example, a debtor may only be eligible for coverage under a DCL policy if all of that debtor's payments were made within 90 days of their due date during the preceding twelve months, excluding invoices with balances of under $2,000 and payment periods that did not exceed previous payment periods by more than 60 days. And a debtor may only remain covered under a DCL policy if 10% or more of that debtor's undisputed balance of all amounts owed does not become 60 days or more past due from its original or extended due date. A customer will also need to prove and maintain a debtor's credit-worthiness via the submission of various reports and references.

By contrast, the credit-worthiness of a debtor covered under a Named Debtor policy will have already been established during the pre-approval process. Therefore, that debtor's compliance with such policies will primarily be determined based on that debtor's recent payment history with the customer, such as whether 10% or more of that debtor's undisputed balance of all amounts has become 60 days or more past due from its original or extended due date. But regardless of the type of credit insurance policy, policy-level qualifications and compliance will generally be based on the following:

1. AR Past Due Reports—As part of their reporting requirements, credit insurance policies generally require the submission of AR Past Due Reports that identify debtors with outstanding balances that are more than 60 days past due;
2. Sates Reports—As part of their reporting requirements, credit insurance policies generally require the submission of Sales Reports that identify all sates made to covered debtors during a specific period, as required by the associated credit insurer (e.g., monthly, quarterly, at policy end-date, etc.);
3. AR Aging Reports—As part of their reporting requirements, credit insurance policies generally require the submission of AR Aging Reports that identify any debtors with outstanding balances broken down by 30 day periods (e.g., current, 1-30 days, 31-60, and 61-90 days); and
4. Premium Payment—The enforceability of credit insurance policies is generally dependent on premiums being paid to the credit insurer on time.

Qualifications and compliance for specific types of coverage (e.g., Named Debtor, DCL, etc.) will be more specific. For example, coverage-level qualifications and compliance for DCL coverage may be based on the following:

1. Percentage Outstanding—DCL coverage will typically be canceled for a debtor if a certain percentage (e.g., 10% or more) of the undisputed outstanding balance owed by a debtor becomes past due from the original or extended due date by a certain amount of time (e.g., 60 days or more);
2. Payment History—A customer may need to establish prompt payment history over a certain period of time for invoice amounts greater than a certain dollar amount for to obtain/maintain DCL coverage for a debtor;
3. Bank References—A customer may need to posses and subsequently submit bank references to obtain/maintain DCL coverage for a debtor;
4. Favorable Trade References—A customer may need to posses and subsequently submit favorable trade references to obtain/maintain DCL coverage for a debtor;
5. Favorable Credit Agency Reports—A customer may need to posses and subsequently submit favorable credit agency reports to obtain/maintain DCL coverage for a debtor; and
6. CFO Approval—A credit insurer may require a customer to obtain approval from the Chief Financial Officer (CFO) of their company before that customer can receive DCL coverage.

If any of those terms and/or conditions is not complied with, claims submitted based on the activities of one or more debtors may be denied. And although only four terms and/or conditions are listed as examples for policy-level qualifications and compliance and only six terms and/or conditions are listed as examples for coverage-level qualifications and compliance, those examples are non-exhaustive. Generally, there will be more terms and conditions for each type of credit insurance policy. Moreover, any one credit insurance policy may include different types of coverage (see, e.g., FIG. 6), in which case that policy will have different terms and conditions for the different debtors covered by the different types of coverage.

By importing and digitally processing all of the terms and conditions for various credit insurers' credit insurance policies at step 1400 and using that information to create corresponding rules and triggering Events at step 1002, the applications server 102 is able to maintain an up-to-date monitoring "profile" that not only includes all of the terms and conditions that may potentially appear in a customer's credit insurance policy or policies, but also the corresponding rules and triggering Events for automating the processes required for the customer to maintain compliance with those terms and conditions. That monitoring profile may be substantially the same as or similar to the Event List 1100 and New Event Input Page 1200 discussed above, wherein a user can add new triggering Events to the monitoring profile as required to address any term and/or condition that may appear in a customer credit insurance policy or policies. Similarly, a user can define the various Actions, Milestones 1304, and Activities 1306 required to keep a customer in compliance with those terms and conditions based on different Start Conditions 1302 that correspond to those triggering Events.

Steps 1400 and 1002 are performed on an ongoing basis to ensure that the monitoring profile remains up to date so that whenever a customer registers its credit insurance policy or policies within the system 100, the rules and triggering Events required to comply the terms and conditions of that policy or policies will already exist within the system 100. In that way, the applications server 102 can quickly identify and implement the Actions required to maintain that customer's compliance with the terms and conditions of that credit insurance policy or policies by selecting the appropriate Actions from among those defined in the monitoring profile.

At step 1404, the applications server 102 imports and digitally processes the terms and conditions for each of the customer's current credit insurance policies. The applications server 102 imports that information in electronic form, if available, from the credit insurer systems 108 of the credit insurers from whom the customer obtained those policies. And the terms and conditions of those credit insurance policies are extracted directly from the corresponding electronic policy documents. In the alternative, a customer can send (e.g., e-mail a file, ground mail a memory device, etc.) that information to an administrator for importing into the applications server 102 and/or a user can input that information into the applications server 102 via a user interface 106 using a manual input process (e.g., scanning a document, typing on a keyboard, dictating into voice recognition software, etc.). That information is then stored in the relational database by the database server 104.

The step 1404 of importing and digitally processing the terms and conditions for each of the customer's current credit insurance policies preferably occurs as required to include all of the terms and conditions for all of that customer's current credit insurance policies. For example, step 1404 may occur as part of a transition processes during which a customer and/or its credit insurance policy or polices are introduced into, or registered with, the system 100 of the present invention. And it may also occur as part of rewriting a current credit insurance policy, renewing an expiring credit insurance policy, or obtaining a new credit insurance policy, as discussed above with respect to the Quote Summary Functionality. In that way, as soon as a customer is registered with the system 100 and/or rewrites, renews, or obtains a new credit insurance policy, the applications server 102 can match the terms and conditions in the customer's credit insurance policy or policies to the corresponding rules and triggering Events in the monitoring profile so it can begin monitoring the terms and conditions in those policies in an ongoing manner, thereby ensuring the payability of any potential claims a customer may make on those policies. And if those policies include any unique terms and conditions that do not yet exist in the monitoring profile (e.g., terms and conditions that may have been customized for a specific customer in a specific credit insurance policy), steps 1400 and 1002 will be repeated for those terms and conditions so they can be added to the monitoring profile with the appropriate rules and triggering Events for maintaining compliance therewith.

Step 1404 may also include importing the customer's current coverage information from the customer's AR system 110 if that information has not already been imported by the Coverage Goal Functionality at step 702. Or in the alternative, the terms and conditions for each of the customer's current credit insurance policies may be imported from the customer's AR System 110 as part of step 702. But regardless of when the customer's coverage information is imported, that information is needed by the Compliance Monitoring Functionality to determine which debtors are covered by which of the customer's credit insurance policies so it can be used at step 1408 to match those debtors to the respective terms and conditions that must be satisfied to maintain coverage for them under their respective credit insurance policies.

To determine if the terms and conditions of a customer's credit insurance policy or policies are being satisfied (i.e., to identify any non-optimal coverage issues), the applications server 102 imports AR Aging Reports from the customer's AR system 110 and digitally processes them at step 1406. The applications server 102 imports those AR Aging Reports from the customer's AR system 110 in a similar manner to that described above with respect to step 1404, preferably by extracting the pertinent information in tabular form. In the alternative, a customer can send (e.g., e-mail a file, ground mail a memory device, etc.) that information to an administrator for importing into the applications server 102 and/or a user (e.g., a customer, broker, account manager, administrator, etc.) can input that information into the applications server 102 via a user interface 106 using a manual input process (e.g., scanning a document, typing on a keyboard, dictating into voice recognition software, etc.). That information is then stored in the relational database by the database server 104.

Because AR Aging Reports are typically updated from month-to-month, the applications server 102 preferably imports them from the customer's AR system 110 on a monthly basis. The applications server 102 may also import those AR Aging Reports more frequently, as required to identify compliance issues with any terms or conditions that require action in shorter periods than one month. For example, if a customer must report an unpaid accounts receivable that is past due by fifteen days, the applications server 102 will import the corresponding AR Aging Reports fifteen days from the past due date. Depending on the required timing, step 1406 may be performed by the Coverage Goal Functionality at step 704 or vice versa.

At step 1408, the applications server 102 identifies any non-optimal coverage issues, such as overdue accounts receivable, and automatically generates Alerts in real-time using the terms and conditions and coverage information for each of the customer's current credit insurance policies imported and digitally processed at step 702/1404, the terms and conditions for various credit insurance policies imported and digitally processed at step 1002, the AR Aging Reports imported and digitally processed at step 704/1406, and the debtor compliance information imported and digitally processed at step 1406. More specifically, the applications server 102 compares the accounts receivable information and the debtor compliance information to the terms and conditions in each of the customer's current credit insurance policies and determines whether the customer and its debtors are in compliance with those terms and conditions. And the applications server 102 makes those comparisons using the various rules and triggering Events that were/are created from the terms and conditions imported and digitally processed at step 1002.

As part of step 1408, the applications server 102 performs a line-by-line analysis of the AR Aging Reports and compares the data therein with the terms and conditions required for the associated debtor to be covered by the customer's credit insurance policy or policies. For example, the applications server 102 will automatically identify any past due payments, the amount of those past due payments, and the debtor responsible for those past due payments. And if any debtor is identified as being out of compliance with any of those terms and conditions, the applications server 102 will generate an Alert that identifies those debtors and the reasons that those debtors are not in compliance with those terms and conditions.

In more detail, the applications server 102 uses the customer's current coverage information to identify which debtors are covered by which of the customer's credit insurance policies and then compares the accounts receivable and/or debtor compliance information for those debtors to the terms and conditions of the appropriate credit insurance policies to make sure those debtors are in compliance with the corresponding terms and conditions. And if the applications server 102 determines that any debtors are not in compliance or may fall out of compliance with the corresponding terms and/or conditions if the appropriate Action is not taken, it will identify which terms and/or conditions are not being complied with by which debtors and the appropriate Action to place those debtors in compliance with those terms and/or conditions. The applications server 102 can thereby generate an Alert to notify the customer that those debtors are not in compliance or may fall out of compliance with their respective credit insurance policies and, therefore, claims on those debtor's accounts receivable may not be payable. Moreover, it allows the customer to take the appropriate corrective Action to maintain compliance or get back into compliance with the terms and conditions of its credit insurance policy or policies.

Those corrective Actions include processes for meeting credit insurers' reporting requirements, submitting financial information for debtors, and even submitting requests for an increase in the coverage provided by the customer's current credit insurance policy or policies and/or obtaining new credit insurance policies using the functionality of the Marketplace Module. Such additional and/or new coverage can be obtained when no other corrective Action will result in a debtor being covered under the customer's current credit insurance policy or policies. For example, if a debtor becomes such high risk that the customer's current credit insurer or insurers refuse to provide coverage for that debtor, the functionality of the Marketplace Module will identify any credit insurance policies that are available to cover the debtor in question (e.g., credit insurance policies provided by credit insurers specializing in high-risk debtors).

At step 1410, the customer is notified of the Alert via a user-specific method of communication (e.g., e-mail, SMS text message, IM text message, telephone call, etc.) The customer can select that user-specific method of communication, along with various other personal settings (e.g., passwords, account information, etc), by accessing the applications server 102 with a user interface 106 and inputting the pertinent data (e.g., postal address, e-mail address, cellular telephone number, etc.) in a similar manner to that described with respect to step 700. If the customer elects to be contact via telephone call, it may be contacted by the applications server 102 using Interactive Voice Response (IVR) technology or by the user assisting them with their policy (e.g., a broker or an account manager). The customer can also select the type or Alerts it would like to receive, which may include electing not to receive certain Alerts.

Regardless of the method of communication selected, the customer will be presented with two options for responding any Alert it receives: 1) handle the Alert or 2) ignore the Alert. For example, the customer may receive the following Alert via e-mail:

[DEBTORNAME] is listed in the AR Aging Report for November, 2010 as owing $30,000 between 61 and 90 days, $15 between 91 and 120 days, $10 between 121 and 150 days, $5 over 150 days, and has either not reported this to the carrier, or the carrier has not approved further shipments. Click HERE to handle the Alert. Click HERE to ignore the Alert.

Selecting the "handle the Alert" link at step 1412 will automatically initiate the process of performing the Milestones 1304/Activities 1306 required to remediate the cause of the Alert at step 1414. And selecting the "ignore the Alert" link at step 1412 will automatically close the Alert at step 1416 without any Action being taken to remediate the cause of the Alert. Because of the potential consequences of ignoring an Alert, the customer will preferably be asked to confirm its decision to "ignore the Alert" when it selects that option before the Alert is closed at step 1416.

As FIG. 15 illustrates, the Alert may include a copy of or a link to a graphical display, or Debtor List 1500, that identifies any of the customer's debtors 802 that are not in compliance with the terms and conditions of a credit insurance policy. The Debtor List 1500 includes a "Compliance for Coverage" column that displays a color-coded status buttons 1502 for each of the debtors 802. The color of those status buttons 1502 indicates whether or not the corresponding debtor 802 is in compliance with the terms and conditions of its corresponding credit insurance policy. For example, a white status button 1502 indicates that the debtor 802 is not covered by any credit insurance policy (e.g., Debtor A, Debtor C, and Debtor D); a green status button 1502 indicates that the debtor 802 is in compliance with its credit insurance policy (e.g., Debtor F and Debtor B); and a red status button 1502 indicates that the debtor is out of compliance with its credit insurance policy (e.g., Debtor E and Debtor F).

Upon clicking on or otherwise selecting a white status button 1502, the applications server 102 will automatically navigate a user to the functionality of the Marketplace Module so the user can evaluate and obtain the appropriate coverage for any non-covered debtors 802 by rewriting an existing credit insurance policy or obtaining a new credit insurance policy. Upon clicking on or otherwise selecting a green status button 1502, the applications server 102 will automatically navigate a user to a historical record of the Actions taken to keep the corresponding debtor 802 in compliance, such as a Required Reporting Report 1800 (FIGS. 18 and 19). And upon clicking on or otherwise selecting a red status button 1502, the applications server 102 will automatically navigate a user to a graphical display, or Issues Report 1600, that identifies any compliance issues that may have resulted in the corresponding debtor 802 not being in compliance. In the alternative, the applications server 102 will automatically navigate a user to the same location regardless of the color of the status button 1502 clicked on or otherwise selected. That same location may be an issues Report 1600.

Figure 16:
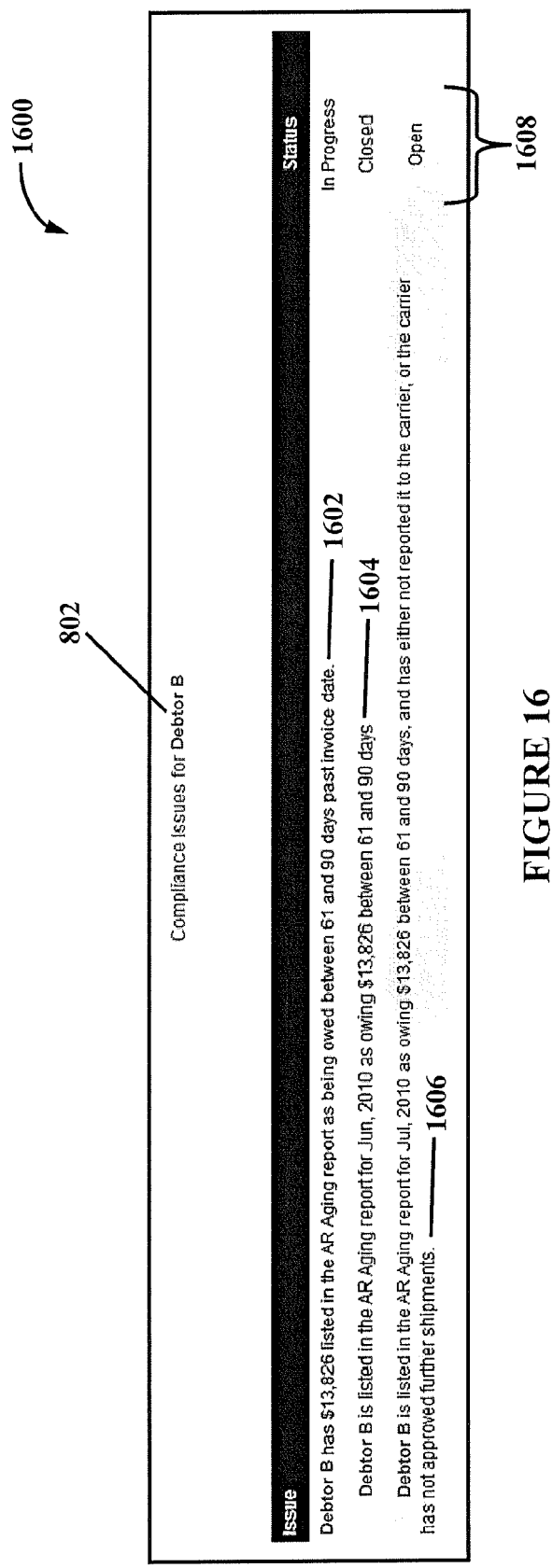
FIG. 16 is a graphical display illustrating an exemplary Issues Report according to a non-limiting embodiment of the present invention.

As FIG. 16 illustrates, such an Issues Report 1600 lists any issues that have been "Closed", are "In Progress", or that are "Open". More specifically, the Issues Report 1600 will list any overarching out-of-compliance issues 1602 and the corresponding sub-issues 1604 and 1606 that must be addressed to prevent and/or remediate those overarching out-of-compliance issues 1602. The Issues Report 1600 will also list the action status 1608 of those issues 1602-1606. In FIG. 16, for example, Debtor B's out-of-compliance issue 1602 is that it is responsible for accounts receivable of greater than $10,000 that have gone unpaid for 61 to 90 days past their due date. And the corresponding sub-issues 1604 and 1606 needed to address that out-of-compliance issue 1602 are to report the out-of-compliance issue 1602 and its reason to the appropriate credit insurer on a monthly basis. One sub-issue 1604 was remediated for the month of June by reporting that the outstanding amount was the result of a disputed invoice. That sub-issue is therefore identified as being "Closed". However, such a report has not been filed for July, which is why another sub-issue 1606 remains "Open". And because there are still "Open" sub-issues 1606, the out-of-compliance issue 1602 is identified as being "In Progress." If no Action had been taken to address any of those sub-issues (i.e., if the report had not been sent in June) 1604 and 1606, the out-of-compliance issue 1602 would be identified as being "Open."

Returning to FIG. 15, the Debtor List 1500 also includes an "Actions Pending" column that displays the action numbers 1504 that correspond to any Actions that may be pending with respect to a debtor 802. For example, out-of-compliance debtors 802 (e.g., Debtor E and Debtor F) will have action numbers 1504 that correspond to Actions that must be taken to bring those debtors back into compliance with the terms and conditions of their respective credit insurance policies (e.g., report disputed invoice, report debtors with past due accounts receivable to credit insurer 604, submit financial statements to credit insurer, etc.). Debtors 802 that are not covered by any credit insurance policy (e.g., Debtor A and Debtor D) will have action numbers 1504 that correspond to Actions that must be taken to obtain coverage for those debtors 802 (e.g., submit financial statements, rewrite existing credit insurance policy, obtain new credit insurance policy, etc.)). And debtors 802 that have no outstanding accounts receivable (e.g., Debtor C) and/or that are adequately covered (e.g., Debtor B and Debtor C) will not have action numbers 1504. The user can sort the information in the Debtor List 1500 as required to filter the list to a manageable number of entries, such as by sorting it by coverage type 1506 (e.g., Whole Turnover, Named, DCL, etc.).

Clicking on or otherwise selecting an action number 1504 will navigate a user to a graphical display, or Action Report 1700, that identifies any such Actions. A user may also be navigated to an Action Report 1700 by clicking on or otherwise selecting an out-of-compliance issue 1602 or sub-issue 1604 and 1606 in an Issues Report 1600. In the former instance, the subject matter of the Action Report 1700 will correspond to the Milestone that needs the most immediate attention. And in the latter instance, the subject matter of the Action Report 1700 will correspond to the Milestone needed to prevent and/or remediate the selected issue 1602-1606.

As FIG. 17 illustrates, such an Action Report 1700 identifies the Action(s) needed to complete, or "Close", any out-of-compliance issues 1602 or sub-issues 1604 and 1606. Those Actions are identified and implemented at step 1414. More specifically, the applications server 102 will automatically identify the appropriate corrective Action required to bring any out-of-compliance debtors 802 back into compliance with the terms and conditions of their respective credit insurance policies 1702. And the applications server 102 will either automatically move through a series of automated Milestones 1304/Activities 1306 to bring those debtors 802 back into compliance with the terms and conditions of their associated credit insurance policies 1702 with little or no input required from the user, or it will initiate automated processes that will guide the user through a series of Milestones 1304/Activities 1306 in which the user performs various process steps (e.g., selecting a "Yes" or "No" option, downloading or importing a document or file, inputting text with a keyboard, etc.) to complete the associated corrective Action and bring those debtors 802 back into compliance with the terms and conditions of their associated credit insurance policy or policies 1702. The applications server 102 may also implement a combination of those two processes to bring debtors 802 back into compliance with the terms and conditions of their associated credit insurance policies 1702, either of which may be initiated by clicking on or otherwise selecting the appropriate item in a Debtor List 1500 or an Issues Report 1600.

In FIG. 17, for example, the applications server 102 has initiated an automated process to guide the user through a series of Milestones 1304/Activities 1306 that must be completed to bring Debtor B back into compliance with the terms and conditions of its associated credit insurance policy 1702. The Action Report 1700 identifies the reason 1704 that Debtor B is not in compliance with the terms and conditions of its associated credit insurance policy 1702 as well as the current Milestone 1706 that needs to be completed to bring that debtor 802 back into compliance with its associated credit insurance policy 1702. More specifically, the reason 1704 that Debtor B is not in compliance with the terms and conditions of its associated credit insurance policy 1702 is a "Disputed Invoice". That reason 1704 corresponds to the reason 1308 set forth in the Start Condition 1302 for the Action that will bring that debtor 802 back into compliance with its associated credit insurance policy 1702. And that Milestone 1706 corresponds to one of the Milestones 1304 that must be completed as part of that Action (i.e., "Check-In [with credit insurer 604] Regarding Invoice Status").

To complete the Milestone 1706 listed in the Action Report 1700 of FIG. 17, the user can communicate with the credit insurer 604 external to the system 100 (e.g., via telephone, facsimile, etc.) or via the electronic communications of the system 100 (e.g., electronic transmission between the applications server 102 and the credit insurer system 108 of the appropriate credit insurer 604) to update the credit insurer 604 on the state/status of the disputed invoice. In the former instance, the user can make the telephone call and then update the action status 1608 of the corresponding issue 1602-1606 in a status box 1708 in the Action Report 1700. And in the latter instance, the user can click on or otherwise select the current Milestone 1706 so that the applications server 102 automatically navigates the user to Require Reporting Report 1800, as illustrated in FIG. 18 or 19.

As FIG. 18 illustrates, such a Required Reporting Report 1800 identifies the reporting requirement 1802 that corresponds to the reason 1704 why a term and/or condition has not been met. It also identifies each reporting instance that corresponds to that reporting requirement 1802, including the reporting due date 1804 and reporting status 1806 of each instance. For a reporting status 1806 of "Submitted", the appropriate report has been submitted and the associated issue 1602-1606 is therefore "Closed." For a reporting status 1806 of "Not Submitted", the appropriate report is due or about to become due and the associated issue 1602-1606 is therefore "Open" or "In Progress." And for a reporting status 1806 of "Not Yet Required", the appropriate report is not yet due with the associated reporting due date 1804 indicating when that report will become due.

Upon clicking on or otherwise selecting a "Submitted" reporting status 1806, the applications server 102 will automatically navigate a user to a record of the submitted report, which may include a copy of the report as well as the time and date it was submitted. And upon clicking on or otherwise selecting a "Not Submitted" reporting status 1806, the applications server 102 will automatically obtain and electronically submit the required report to the appropriate party or navigate a user to functionality for obtaining and electronically submitting the required report to the appropriate party, such as a dialog box that allows a user to select and upload a file from the database server 104 to a credit insurer system 108 or that allows the user to identify a location from which the applications server 102 can automatically upload files as reports come due. The "Not Yet Required" reporting status 1806 does not provide such functionality, but when the corresponding reporting due date 1804 approaches, or after the preceding reporting requirement 1802 is satisfied, the reporting status 1806 of "Not Yet Required" will automatically change to "Not Submitted" so as to provide the required functionality. Upon submitting the required records via that functionality, the applications server will automatically change the action status 1608 of the corresponding issue 1602-1606 to "Closed" and update any related status indicator (e.g., a status button 1502 under a "Policy Reporting" heading in the Dashboard 2300 (FIG. 23)). All such data communications between are stored by the database server 104.

Such Required Reporting Reports 1800 are available for any number of different reporting requirements for any number of credit insurers 604. In FIG. 19, for example, a Required Reporting Report 1800 sets forth the reporting requirement 1802 for submitting an AR Aging Report for all outstanding accounts receivable that are greater than $10,000. That reporting is required on a monthly basis throughout the effective period (i.e., January 2010 through December 2010) of the associated credit insurance policy 1702 (i.e., Policy number: 450604701). And a user can use that Require Reporting Reports 1800 to review previously submitted AR Aging Reports, to submit current AR Aging Reports, and to identify the future dates at which any AR Aging Reports will be due. In a similar manner, a Required Reporting Report 1800 can be provided to help a user easily identify and satisfy substantially any type of reporting requirement.

Returning to FIG. 17, the Action Report 1700 includes a status button 1502 for each Milestone 1304/1706 that must be completed to bring a debtor 802 back into compliance with the terms and conditions of its credit insurance policy 1702 and/or to keep that debtor 802 in compliance with those terms and conditions. The Action Report 1700 also includes the corresponding Milestone due dates 1710 and Milestone completion dates 1712 for each of those Milestones 1304/1706. And when those Milestones 1304/1706 include satisfying reporting requirements, the Milestone due dates 1710 will be the same as the reporting due dates 1804 (e.g., FIGS. 18 and 19). As FIG. 17 also illustrates, the size of a specific status button 1502 (e.g., M4) will become larger compared to the size of other status buttons 1502 (e.g., M1, M2, M3, and M5) when the Milestone 1304/1706 that corresponds to that specific status button 1502 is "Open" or "In Progress", thereby drawing a user's attention to that Milestone 1304/

1706. The shape of a specific status button 1502 (not shown) may also change to indicate a change in status.

The color of the status buttons 1502 in the Action Report 1700 indicate whether or not the corresponding Milestone 1304/1706 has been accomplished. For example, a white status button 1502 may indicate that the Milestone 1304/1706 is not yet due (e.g., M5); a green status button 1502 may indicate that the Milestone 1304/1706 has been completed (e.g., M1, M2, and M3) and a red status button 1502 may indicate that a Milestone 1304/1706 is past due (e.g., M4). And if the color of any status button 1502 in the Action Report 1700 is red for any debtor 802 (i.e., if any Milestone 1304/1706 remains outstanding for placing a debtor 802 in compliance with the terms and conditions of its credit insurance policy 1702), the status button 1502 for that debtor 802 in the "Compliance for Coverage" column of the Debtor List 1500 will also be red so as to draw a user's attention to that outstanding Milestone 1304/1706.

Upon clicking or otherwise selecting a white status button 1502, the applications server 102 will automatically navigate a user to a graphical display that includes the requirements that will need to be met to complete that Milestone 1304/1706 when it comes due, such as an Action Report 1700. Upon clicking on or otherwise selecting a green status button 1502, the applications server 102 will automatically navigate a user to a historical record of the completed Milestone 1304/1706, which may include a copy of any documents used to complete that Milestone 1304/1706 as well as the time and date those document were used/submitted. And upon clicking on or otherwise selecting a red status button 1502, the applications server 102 will automatically complete the Milestone 1304/1706 or navigate a user to functionality for completing that Milestone 1304/1706, such as a dialog box that allows a user to select and upload a file from the database server 104 to a credit insurer system 108 or that allows the user to identify a location from which the applications server 102 can automatically upload files as they come due.

All of that functionality for placing a debtor back in compliance with the terms and conditions of its corresponding credit insurance policy is part of steps 1408-1414, wherein non-compliance issues are identified at step 1408, the user is notified at step 1410, and the appropriate corrective Action is implemented at step 1414. For example, a debtor may be identified as no longer being insurable at step 1408 because of bad financial data. The customer needing coverage for that debtor may be notified that the debtor is no longer insurable because of the had financial data at step 1410. And the customer or another user (e.g., the customer's broker) user can submit good financial data to the subject credit insurer at step 1414 to remediate that issue.

When the appropriate corrective Action of step 1414 includes submitting debtor compliance information, such as good financial data, to a credit insurer, the applications server 102 can import that debtor compliance information from the customer's AR system 110. That information can be imported from the customer's AR system 110 on a monthly basis, or more frequently, depending on the customer's payment terms. For example, if a customer requires a debtor to make payments every fifteen days, the applications server 102 can import the associated debtor compliance information for that debtor every fifteen days.

The applications server 102 can import debtor compliance information from the customer's AR system 110 and digitally process it in a similar manner to that described above with respect to step 1404, preferably by extracting the pertinent documents (e.g., financial statements, trade references, bank references, credit reports, dispute information, etc.). Debtor compliance information may also be imported from various other systems (i.e., institutional systems 112) from which the pertinent documents can be obtained. For example, financial statements may be imported from the EDGAR system and/or SEDAR, and trade reference documents can be imported from the FCIB's World Trade Reference system. In the alternative, a customer can send that information (e.g., e-mail a file, ground mail a memory device, etc.) to an administrator for importing into the applications server 102 and/or a user (e.g., a customer, broker, account manager, administrator, etc.) can input that information into the applications server 102 via a user interface 106 using a manual input process (e.g., scanning a document, typing on a keyboard, dictating into voice recognition software, etc.). That information is then stored in the relational database by the database server 104.

As discussed above, the appropriate corrective Action taken at step 1414 can be defined using the wizard functionality of the present invention. More specifically, a user can utilize the wizard function to define different Actions, Milestones 1304, and Activities 1306 that can be implemented to bring out-of-compliance debtors back into compliance with the terms and conditions of their respective credit insurance policies, thereby prevent in-compliance debtors from falling out of compliance with the terms and conditions of their respective credit insurance policies. For example, those Actions, Milestones 1304, and Activities 1306 can be defined to submit documents (e.g., financial statements, trade references, credit reports, etc.) and other information (e.g., Past Due Report, Notification of Overdues, etc.) to credit insurers to satisfy the requirements of different terms and conditions.

There may be any number of different terms and conditions with which a debtor may be out of compliance, and the applications server 102 will automatically perform the specific steps required to address each of those terms and conditions based on the Actions, Milestones 1304, and Activities defined in the monitoring profile. For example, the applications server 102 may auto-generate a list of out-of-compliance debtors (e.g., debtors with accounts receivable past due >30 days) and electronically send a Notification of Overdues to the credit insurer system 108 of the credit insurer who issued the policy with which those debtors are out of compliance. Or in the alternative, the applications server 102 may provide interactive functionality that guides a user through the steps required to generate and submit that list.

Figure 20:
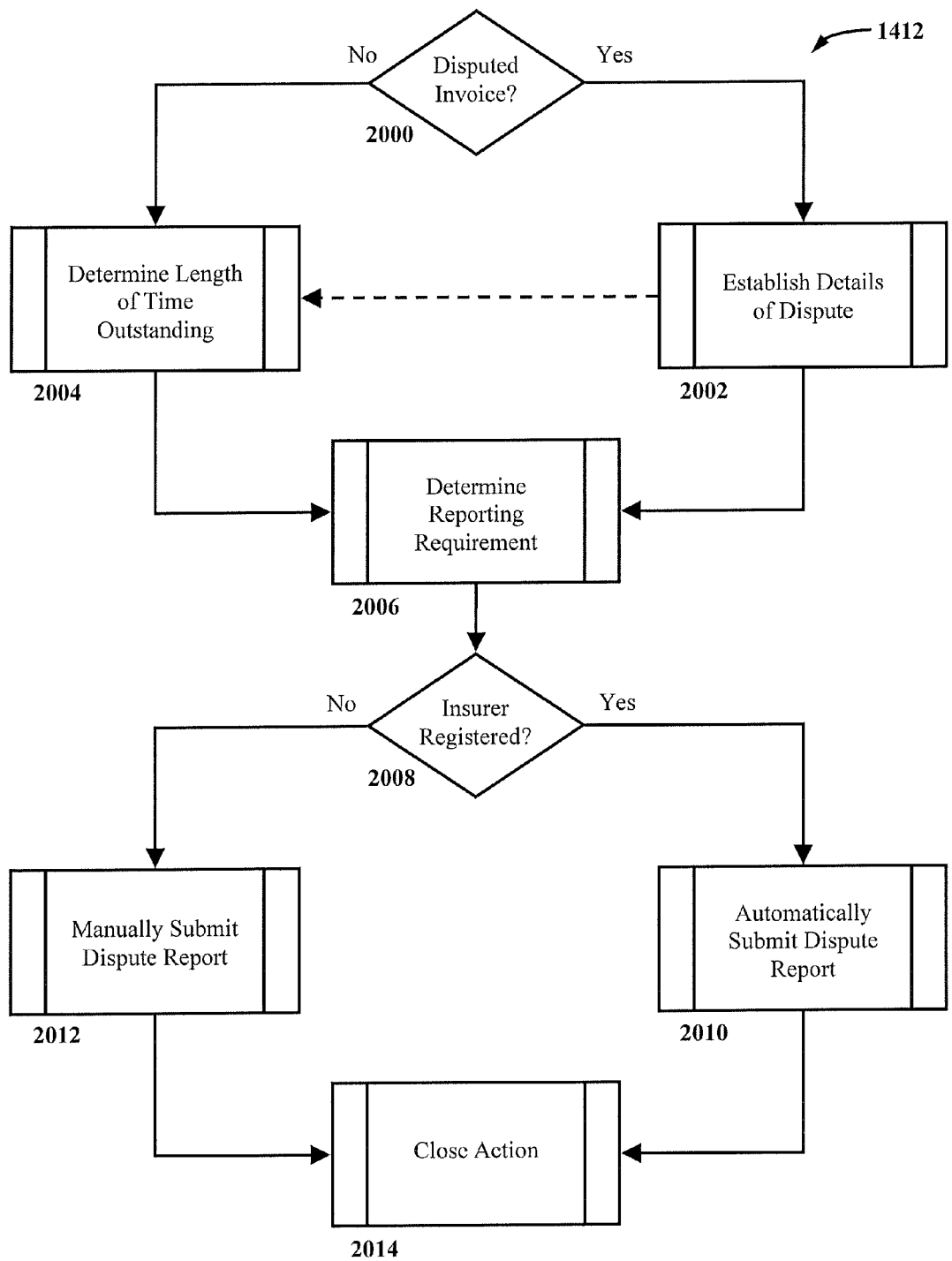
FIG. 20 is a flow chart illustrating an exemplary Action taken by the Compliance Monitoring Functionality of the present invention to address an out-of-compliance issue according to a non-limiting embodiment of the present invention.

By way of more specific example, FIG. 20 illustrates an Action, or account reporting process, that may be performed at step 1414 to satisfy the reporting requirements for a debtor that has overdue accounts receivable. As a result, the customer is out of compliance with one or more of the terms and conditions of its credit insurance policy or policies. In the alternative, the customer may be at risk of being out of compliance with one or more of those terms and conditions. In either instance, the overdue accounts receivable serve as a triggering Event requiring a corrective Action.

The Start Condition 1302 for the Action illustrated in FIG. 20 is driven by the condition that a debtor has exceeded the maximum outstanding balance 1328 of accounts receivable for one of the customer's credit insurance policies. However, no reason 1308 may have been provided for the maximum outstanding balance 1328 being exceeded. Accordingly, the first step 1000 of the Action illustrated in FIG. 20 is determining whether the accounts receivable remain outstanding due to a disputed invoice. If the accounts receivable remain outstanding due to a disputed invoice, the next step 2002 of the corrective Action of FIG. 20 is to contact the customer and establish the details of the disputed invoice (e.g., damaged goods, noncompliance of goods/services with contracts, goods/services not received, etc.). And if the accounts receivable do NOT remain outstanding due to a disputed invoice, the next step 2004 of the corrective Action of FIG. 20 is to determine how long the accounts receivable have been outstanding (e.g., >30 days, >60 days, >90 days, etc.). Determining the details of the disputed invoice at step 2002 may also include the step 2004 of determining the length of time the accounts receivable have been outstanding, as indicated by the dashed arrow in FIG. 20.

The details of the disputed invoice may be obtained outside the system 100 by contacting the customer directly, such as via telephone, e-mail, etc. And the length of time the accounts receivable have been outstanding may be obtained from the AR Aging Reports imported from the customer's AR system 110 at step 1406. Accordingly, even though the step 2002 of determining the details of the disputed invoice may include determining the length of time the accounts receivable have been outstanding, it is a separate step from the step 2004 determining the length of time the accounts receivable have been outstanding because the former step 2004 may require performing Activities outside of the system 100. In the alternative, the details of the disputed invoice and/or the length of time the accounts receivable have been outstanding may be obtained by providing a user with a link or pop-up window that includes interactive features that will walk the user through the process of obtaining and inputting the details of the disputed invoice and/or the length of time the accounts receivable have been outstanding, such as navigating the user to the location of a file for download or import.

At step 2006, the applications server 102 determines the reporting requirements for the overdue accounts receivable based on the reason for the disputed invoice and/or the length of time the accounts receivable have been outstanding. Those reporting requirements are determined from the terms and conditions of the customer's credit insurance policy or policies that are imported, digitally processed, and matched to the corresponding rules and triggering Events in the monitoring profile at step 1404. Accordingly, step 2006 incorporates the appropriate Action defined for those rules and triggering Events into the Action illustrated in FIG. 20. For example, the Activity 1306 performed at step 2006 will include a question 1334 as to the reason 1308 the outstanding balance remains overdue. If the answer 1336 to that question 1334 is that the invoice was disputed, the result 1338 will be defined by a "Begin New Action" result type 1346 that is linked to an Action for completing a Past Due Report. And if the answer the answer 1336 to that question 1334 is that the invoice is overdue by more than thirty days due but is not disputed, the result 1338 will be defined by a "Begin New Action" result type 1346 that is linked to an Action for completing a Notification of Overdues. Those two instances may be handled with different Actions because the reporting requirements are different for disputed invoices and accounts receivable that are overdue without reason (i.e., a Past Due Report is different than a Notification of Overdues). And those Actions may include completing a Overdues Report 2200 (FIG. 22) to generate the appropriate Past Due Report and/or Notification of Overdues, as discussed in more detail below with respect to the Overdues Notification Functionality of the present invention.

Upon completing the appropriate Action at step 2006, the applications server 102 determines whether the credit insurer that provided the subject credit insurance policy is registered within the system 100 at step 2008. If the credit insurer is registered within the system 100, the applications server 102 will automatically submit the Past Due Report or Notification of Overdues to that credit insurer at step 2010 via electronic data exchanges with the credit insurer system 108 maintained by that credit insurer. And if a credit insurer is NOT registered within the system 100, the user will need to manually submit the Past Due Report or Notification of Overdues with that credit insurer at step 2012 via e-mail, ground mail, facsimile, filling out fields in a web page, or other suitable manual process. In either instance, the applications server 102 can be used during the step 2006 to automatically complete Past Due Report forms or Notification of Overdues forms that are available electronically by auto-populating fields in those forms with any corresponding data for the subject customer and debtor 802 stored on the central database by the database server 104. Upon submitting the completed Past Due Report or Notification of Overdues at step 2010 or 2012, the Action illustrated in FIG. 20 is closed at step 2014.

The Milestones 1304 and Activities 1306 for carrying out steps 2000-2014 of the Action, or account reporting process, illustrated in FIG. 20 may be defined with the wizard functionality of the present invention in a similar manner as that described above with respect to FIG. 9 and FIGS. 13A and 13B. In a similar manner, other Actions, Milestones 1304, and Activities 1306 can also be defined to remediate and/or prevent almost any issue that may arise with respect to a non-compliance issues, such as submitting AR Aging Reports, paying premiums, filing claims, and submitting evidence of insurability. Those Actions, Milestones 1304, and Activities 1306 can be defined by a user via the wizard functionality provided with the system 100, they can be downloaded from the provider of the system 100, and/or they can be predefined by the provider of the system and provided as part of the system 100.

As should be understood from the description above, the processes of the Compliance Monitoring will intertwine with the processes of the Coverage Goal Functionality in some instances. For example, if a customer is out of compliance with one or more of the terms and/or conditions of its credit insurance policy or policies, coverage may be canceled or reduced for one or more of that customer's debtors. As a result, the customer may then fail to meet one or more of its Coverage Goals (see, e.g., FIG. 8, Debtors C and E). Accordingly, the process required to bring the customer back into compliance with the terms and conditions of its credit insurance policy or policies may be the same as the processes required to help meet that customer's Coverage Goals (e.g., a process for appealing a cancellation or reduction of coverage, a process for satisfying a reporting requirement, a process for establishing the insurability of a debtor, etc.).

However, the processes of the Compliance Monitoring Functionality will preferably identify and remediate any potential out-of-compliance issues with the customer credit insurance policy or policies before coverage is cancelled or reduced for any debtors so as to ensure the payability of claims for those debtors. And the processes of the Coverage Goal Functionality will preferably identify whether any gaps in that coverage exist when the customer is in compliance with all of the terms and conditions of its credit insurance policy or policies so as to ensure that customer's Coverage Goals are being met. For example, the Compliance Monitoring Functionality will identify when outstanding accounts receivable may result in the cancellation or reduction of coverage, and the Coverage Goal Functionality will identify when those outstanding accounts receivable are in amounts larger than the largest amounts covered by the customer's credit insurance policies. In that way, the Compliance Monitoring Functionality and the Coverage Goal Functionality work together to proactively ensure the payability of a customer's claims in amounts commensurate with that customer's Coverage Goals before any such claims arise.

c. Claim Filing Functionality

Using automated processes similar to those described above with respect to the Coverage Goal Functionality and the Compliance Monitoring Functionality, the Claim Filing Functionality automatically completes and files claims on a customer's credit insurance policy or policies as those claims arise. More specifically, the applications server 102 digitally processes a customer's accounts receivable information when it is imported from that customer's AR system 110, compares it to the terms and conditions of the customer's credit insurance policy or policies, and identifies instances where a claim should be filed, such as when a debtor has accounts receivable past due for more than a specific period of time (e.g., 91 to 120 days). In that instance, the applications server 102 will generate an Alert that identifies the situation and asks the customer whether it would like to file a "protracted default" claim for the overdue amount. If the customer chooses to file the claim, the applications server 102 will automatically complete the Milestones required complete and file the appropriate claim form and/or it will walk the customer, or another user, through those Milestones. Even if some user input is required to complete the claim form, the applications server 102 will preferably auto-populate all of the fields in the form for which data is available within the system 100. And the claim form will preferably be filed electronically via electronic data exchanges between the applications server 102 and the appropriate credit insurer system 108.

As another example, the applications server 102 will also generate an Alert and complete the Milestones for completing and filing a claim when a bankruptcy notice is received for a debtor. That notification may be received from a credit insurer system 108 or the customer's AR system 110. Because the applications server 102 is interfaced with a plurality of credit insurer systems 108 within the system 100, that notification need not be received from the credit insurer system 108 of the credit insurer that is providing credit insurance to the customer that has the debtor that declared bankruptcy. Instead, it can be received from the credit insurer system 108 of any credit insurer that has provided coverage to that debtor. In that way, the Claim Filing Functionality provides an extra degree of safety for identifying bankruptcy situations.

Figure 21:
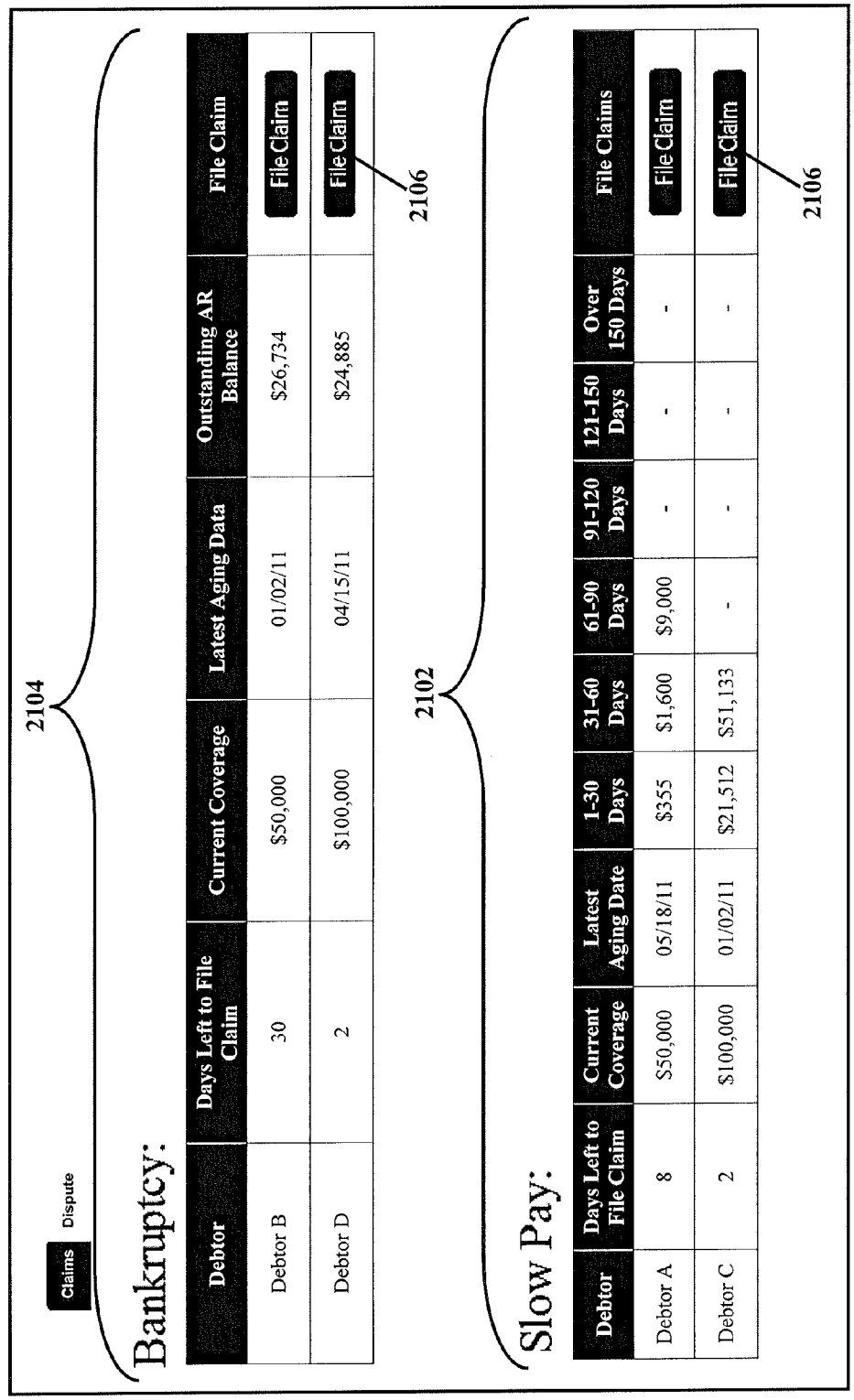
FIG. 21 is a graphical display illustrating an exemplary Claims Report according to a non-limiting embodiment of the present invention.

As FIG. 21 illustrates, the Claim Filing Functionality of the present invention generates a graphical display, or Claims Report 2100, that provides a user (e.g., a customer, broker, account manager, administrator, etc.) with an overview of the state/status of all of the debtors that are either in protracted default or that have declared bankruptcy. The Claims Report 2100 includes a "Slow Pay" list 2102 that lists the all of the debtors identified as having accounts receivable past due for more than a specific period of time and a "Bankruptcy" list 2104 that lists all of the debtors with overdue accounts receivable identified as having bankruptcy status. Each of those lists 2102 and 2104 includes summary data from which the user can quickly assess why an Alert was generated and whether to file a claim for the overdue amounts for specific debtors. For example, both lists 2102 and 2104 include the number of days the user has remaining to file a claim for the overdue amount, the customer's current coverage, and the date of the latest AR Aging Report for each debtor with overdue accounts receivable. The "Slow Pay" list 2102 further includes the overdue amounts for each debtor for different time periods, while the "Bankruptcy" list 2104 further includes the total outstanding amount for each bankrupt debtor. Based on that summary data, the user can decide whether and when to file a claim, which he or she can do by clicking on or otherwise selecting a "File Claim" button 2106 provided for each debtor. And by including the number of days left to file a claim, the Claims Report 2100 allows the user to see the timeframe for submitting such claims, thereby ensuring that those claims are submitted in time to be payable.

The Milestones that define how to complete and file such claims are defined by the terms and conditions of the customer's credit insurance policy or policies, just as the Milestones for complying with reporting requirements, are defined by those terms and conditions, as discussed above. And where user input is required, those Milestones may navigate a user to a graphical display where that user can input any information not available within the system 100 into a claim form using a graphical user interface 106. Thus, while the Coverage Goal Functionality and the Compliance Monitoring Functionality ensure that the customer has the appropriate amount of insurance coverage and that the claims under that coverage are payable, the Claim Filing Functionality ensures that those claims are filed accurately and on time.

d. Overdues Notification Functionality

As discussed above, some overdue accounts receivable may be overdue because one or more debtors disputed an invoice. And to ensure the payability of a claim on any subsequent accounts receivable that become overdue, it may be necessary for the customer to report the disputed overdue accounts receivable to an insurer within a certain time frame to obtain authorization to continue shipping goods to the debtor with whom the dispute exists. Accordingly, the Invoice Dispute Functionality of the present invention allows a user to report those disputed invoices before filing a claim for any overdue accounts receivable. That functionality not only allows a user to ensure the payability of a claim when it comes due, it also allows the user parse out which portions of their overdue accounts receivable are the result of disputed invoices so they can be dealt with accordingly.

As FIG. 22 illustrates, the Invoice Dispute Functionality of the present invention generates a graphical display, or Overdues Report 2200, that provides a user (e.g., a customer, broker, account manager, administrator, etc.) with an overview of all of a customer's overdue accounts receivable, including which portions of those overdue accounts receivable are the result of a disputed invoice. The Overdues Report 2200 includes similar formation as that listed in the Claims Report 2100, except that it further includes disputed amount fields 2202, approved amount fields 2204, and notes 2206 fields. Data can be manually input into those fields 2202-2206 by a user via a user interface 106 and/or the applications server 102 can auto-populate data into those fields 2202-2206 with data consumed from commercial dispute notices and/or bankruptcy notices that have been imported and/or loaded into the system 100 of the present invention. That data is then used to generate Past Due Reports and/or Notifications of Overdues for sending to the credit insurers 604 that provide coverage for the subject debtors 802

In FIG. 22, for example, Debtor A disputed an invoice for $9,000 (e.g., Disputed Amount: $9,000 at 61-90 Days), which the customer has already reported to Insurer A. As a result, in Insurer A allowed Debtor A to continue shipping goods to Debtor A (e.g., Approved by Insurer A: $9,000 at 61-90 Days). Unfortunately, however, Debtor A has not made a payment since the dispute invoice and has even disputed another invoice (e.g., Disputed Amount: $355 at 1-30 Days). Accordingly, the user may need to send Insurer A a Past Due Report and Notification of Overdues for Debtor A. If Insurer A is registered within the system 100 of the present invention, the applications server 102 will automatically generate and submit the Past Due Report and Notification of Overdues to Insurer A using the information in the Overdues Report 2200 in combination with other information available within the system 100. In the alternative, the user can choose to generate and submit the Past Due Report and Notification of Overdues by clicking on or otherwise selecting the "Create Notification" button 2208 at the bottom of the Overdues Report 2200. Even in the latter instance, the applications server 102 preferably auto-populates all of the fields in the Past Due Report form and the Notification of Overdues form for which the corresponding data is available within the system.

Also in FIG. 22, Debtor C has disputed an invoice (e.g., Disputed Amount: $9,000 at 61-90 Days) and failed to pay subsequent invoices. And Debtors B and D have failed to pay invoices (e.g., $26,734 at 31-60 Days and $24,885 at 61-90 Days, respectively) due to bankruptcy. Debtors B and D are covered by Insurer A and Debtor C is covered by Insurer B. Accordingly, the user may also need to send Insurers A and B Past Due Reports and Notifications of Overdues. The applications server 102 can automatically group the data for all of the debtors that correspond to the same insurer so as to generate and submit a single Past Due Report and single Notification of Overdues for all of those debtors, thereby making the notifications process more efficient. Similarly, if the user chooses to generate and submit the Past Due Report and Notification of Overdues by clicking on or otherwise selecting the "Create Notification" button 2208, he or she can group the data for multiple debtors into a single Past Due Report and/or single Notification of Overdues by selecting the check boxes 2212 provided beside each of the debtors' names that correspond to a specific insurer (e.g., Debtors A, B, and D for Insurer A). At any point in that process, the user can save the data input into the Overdues Report 2200 and exit the Overdues Notification Functionality by selecting the "Save" button 2214 at the bottom of the Overdues Report 2200, or he or she can exit the Overdues Notification Functionality without saving that data by selecting the "Cancel" button 2216 at the bottom of the Overdues Report 2200.

The Milestones that define how to generate and submit such Past Due Reports and Notifications of Overdues are discussed above with respect to the Compliance Monitoring Functionality of the present invention. The Overdues Report 2200 can be used to receive user input to complete one or more of those Milestones and/or to display data gathered and input by the applications server 100 while completing those Milestones. And although not shown in FIG. 22, those Overdues Reports 2200 can include a field that lists the days left to file a Past Due Report and/or Notification of Overdues to ensure they are filed within the time line established by the terms and conditions of a customer credit insurance policy or policies. Completing those Milestones in a timely manner, and therefore completing those Past Due Reports and/or Notifications of Overdues in a timely manner, helps customer's obtain approval to continue goods to debtors that have disputed invoices and ensure the payability of claims on overdue accounts receivable for debtors who are bankrupt or in protracted default. Thus, the Overdues Notification Functionality performs as part of the Compliance Monitoring Functionality to help ensure that claims under a customer's credit insurance policy or policies are payable.

e. Dashboard Functionality

Figure 23:
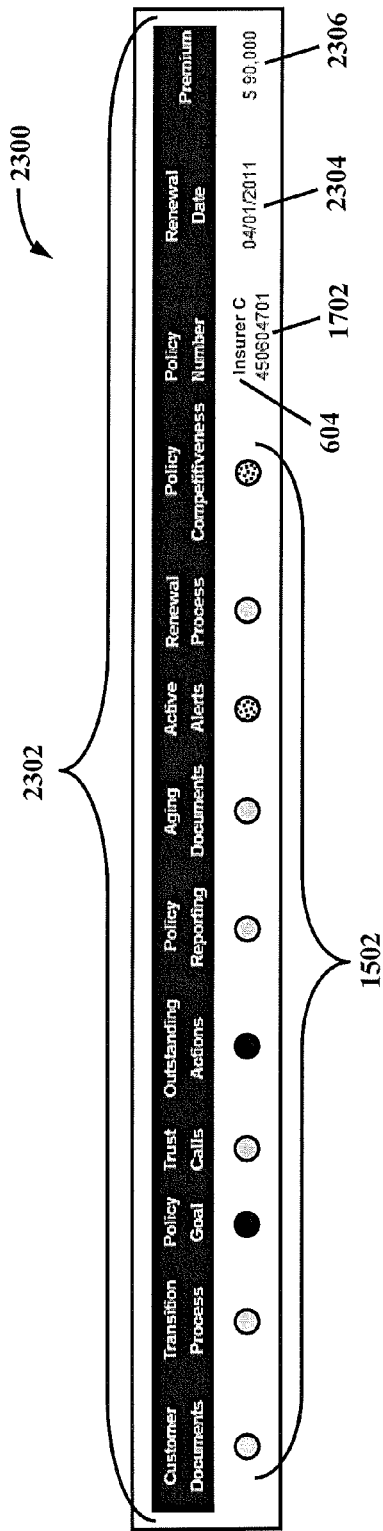
FIG. 23 is a graphical display illustrating an exemplary Dashboard according to a non-limiting embodiment of the present invention.

As FIG. 23 illustrates, the Dashboard Functionality of the present invention generates a graphical display, or Dashboard 2300, that provides a user (e.g., a customer, broker, account manager, administrator, etc.) with an overview of the state/status of all of the credit insurance policies to which that user has access. The Dashboard 2300 includes a Status Bar 2302 that identifies the different processes and/or conditions for which the user wants to know the state/status. And a status button 1502 is provided below each corresponding process and/or condition identified in the Status Bar 2302 to provide a visual indicator to a user of each of those processes and/or conditions. The user can define which processes and/or conditions are identified in the Status Bar 2302 based on its individual preferences, as well as the order in which they appear, for each credit insurance policy 1702.

In the Dashboard 2300, there are four potential colors for each status button 1502 red, yellow, green, or white. And the meaning of each color depends on the process and/or condition to which that status button 1502 corresponds. But not every status button 1502 will utilize every color. A brief description of the headings for the processes and/or conditions illustrated in the Status Bar 2302 of FIG. 23 is provided below along with exemplary meanings of the different colors that can be displayed in their respective status buttons 1502.

The status button 1502 under the "Customer Documents" heading indicates whether the documents required to manage a customer's credit insurance policy or policies have been acquired, uploaded, and stored by the applications server 102. Those documents are generally acquired as part of a transition process during which a customer and/or its credit insurance policy or polices 1702 are introduced into, or registered with, the system 100 of the present invention. A green status button 1502 indicates that all the documents are acquired, uploaded, and stored, while a red status button 1502 indicates that one or more documents is missing beyond its due date. There need only be a single document missing for that status button 1502 to be red. The due date for each document can be customized by the user as required, and a system administrator can define the list of documents required from each customer. By default, the documents that must be acquired, uploaded, and stored by the applications server 102 include a Broker of Record Later, an Application, a Credit Form, and a Credit Insurance Policy. But the list of documents can be defined differently based on the requirements and/or preferences of the brokerage company utilizing the present invention.

The status button 1502 under the "Transition Processes" heading indicates whether the required processes have been followed for introducing the customer and/or its credit insurance policy or polices 1702 into the system 100 of the present invention. A green status button 1502 indicates that all of the appropriate steps of those processes have been completed by their respective due dates, while a red status button 1502 indicates that one or more of those steps has not been completed by its due date. Only a single step need be incomplete for that status button 1502 to be red. The process list can be defined by the system administrator, with each process step having a defined due date. Moreover, the transition process can be defined differently for different customers, credit insurance policies, types of coverage, and management companies (e.g., a licensed group of users).

The status button 1502 under the "Policy Goal" heading indicates whether a customer's Coverage Goals are currently being met. That determination is made by the Coverage Goal Functionality. A white status button 1502 indicates that no Coverage Goal has been set for a credit insurer 604; a green status button 1502 indicates that all of the customer's Coverage Goals are being met; and a red status button 1502 indicates that one or more of those Coverage Goals is not being met. There need only be a single Coverage Goal not met for that status button 1502 to be red.

The status button 1502 under the "Trust Calls" heading indicates whether periodic status calls have been completed. A green status button 1502 indicates that the most recent status call has been completed and completed according to a defined process; and a red status button 1502 indicates that the most recent status call has not occurred in the required timeframe, has been declined or missed by the parties mandatory to be on the call, or was not completed per the defined process. Those calls generally take place between the policy holder and either the broker, account manager, or someone assisting the policy holder with their credit insurance policy 1702. And a system administrator can define the frequency of those calls, the type of calls (e.g., Initial, Mid-Term, Renewal, etc.), who is required on the calls (e.g., customer contacts, brokers, account managers, solution architects), as well as the information required to be documented for each of those calls.

The status button 1502 under the "Outstanding Actions" heading indicates whether there are any Actions that need to be taken to bring one or more debtors back into compliance with the terms and conditions of the respective credit insurance policies 1702 under which they are to be covered and/or to ensure a customer's Coverage Goals are being met (e.g., appealing coverage decisions, requesting new credit limits, acquiring financial documents, etc.). And those Actions include completing the appropriate Milestones required to resolve any outstanding compliance issues 1602-1606. A green status button 1502 indicates that there are no outstanding Actions, while a red status button 1502 indicates that there is one or more outstanding Action. There need only be a single outstanding Action for that status button 1502 to be red.

The status button 1502 under the "Policy Reporting" heading indicates whether a customer is in compliance with the reporting requirements of its credit insurance policy or policies 1702 (e.g., monthly AR Aging Report, weekly check-ins for disputed invoices, etc.). That determination is made by the Compliance Monitoring Functionality. A white status button 1502 indicates that there are no reporting requirements; a green status button 1502 indicates that there are not outstanding reports; and a red status button 1502 indicates that there is one or more outstanding reports. There need only be a single outstanding report for that status button 1502 to be red.

The status button 1502 under the "Aging Documents" heading indicates whether a customer's AR Aging Reports have been acquired, uploaded, and stored by the applications server 102 as required to enable the Coverage Goal Functionality and Compliance Monitoring Functionality. Accordingly, that determination is made by the Coverage Goal Functionality and Compliance Monitoring Functionality. And in certain instances, the Coverage Goal Functionality and Compliance Monitoring Functionality will require additional and/or different AR Aging Reports any such reports that are required by a credit insurer 604 as part of its reporting requirements, which is why those documents are covered under a separate heading than reporting requirements. A green status button 1502 indicates that current (e.g., within seven days of the prior month) AR Aging Reports have been acquired, uploaded, and stored for each of a customer's debtors, while a red status button 1502 indicates that the current AR Aging Report has not been acquired, uploaded, and stored for one or more of a customer's debtors.

The status button 1502 under the "Active Alerts" heading indicates whether a customer has received an Alert notification for a Coverage Goal that is not being met and/or for a compliance issue 1602-1606 that remains "Open" or is still "In Progress". That determination is made by the Coverage Goal Functionality and/or the Compliance Monitoring Functionality. A green status button 1502 indicates that all of the Milestones required to remediate the cause of any such Alerts have been completed such that the cause has been remediated; a yellow status button 1502 indicates that all Milestones required to remediate the cause of any such Alerts up until that point have been completed, but that the user is awaiting some other Event to occur before it can proceed to the next Milestone; and a red status button 1502 indicates that one or more Milestone for one or more Alert remains incomplete so that the Alert is still active. There need only be a single incomplete Milestone for a single Alert for that status button 1502 to be red.

The status button 1502 under the "Renewal Process" heading indicates whether a customer and/or broker have taken the necessary steps to renew one or more of the customer's credit insurance policies 1702. A user can view a list of those steps by clicking on or otherwise selecting the status button 1502 under the "Renewal Process" heading. A yellow status button 1502 indicates that a renewal process is coming due; a green status button 1502 indicates that all the steps required up until that point have been taken to renew the customer credit insurance policy or policies 1702; and a red status button 1502 indicates that one or more of those steps is past due. A user can define a default timeframe (e.g., two months) before a renewal process comes due at which the status button 1502 will turn from green to yellow. There need only be a single past due step for a single credit insurance policy 1702 for that status button 1502 to be red. And although not illustrated, status buttons 1502 with similar functionality may be provided under separate headings for rewriting or obtaining new credit insurance policies using the Quote Summary Functionality (e.g., "Rewriting Process" and "New Policy Process" headings). Or all three of those processes can be combined under a single heading (e.g., an "Approval Process" heading).

The status button 1502 under the "Policy Competitiveness" heading indicates how the customer's credit insurance policy or policies 1702 compare in price to the overall market. That determination is made by the Policy Analysis Functionality. A green status button 1502 indicates that the customer's credit insurance policy or policies 1702 have a better than average pricing structure, while a red status button 1502 indicates that the customer's credit insurance policy or policies 1702 have a below average pricing structure.

Although the indications described above for each of the status buttons 1502 is somewhat "absolute" (i.e., a single instance of a certain Event will result in a red status button 1502), those indications may also be more "relative". For example, the status button 1502 under the "Policy Goal" heading may indicate the percentage of the customer's Coverage Goals that are being met, wherein a green status button 1502 indicates that 100% of the customer's Coverage Goals are being met; a yellow status button 1502 indicates that 80% to 99% of the customer's Coverage Goals are being met; and a red status button 1502 indicates that less than 80% of the customer's Coverage Goals are being met. The status button 1502 under the "Policy Reporting" heading may indicate the percentage of reporting requirements that are being met for the customer's credit insurance policy or policies, wherein a green status button 1502 indicates that 85%-100% of those reporting requirements are being met; a yellow status button 1502 indicates that 50%-85% of those reporting requirements are being met; and a red status button 1502 indicates that 0%-50% of those reporting requirements are being met And the status button 1502 under the "Policy Competitiveness" heading may indicate how the customer's credit insurance policy or policies 1702 score compared to other credit insurance policies in terms of pricing structure (i.e., based on its policy competitiveness score), wherein a green status button 1502 indicates that the customer's credit insurance policy or policies 1702 scored 7-10 on a scale of 1-10; a yellow status button 1502 indicates that the customer's credit insurance policy or policies 1702 scored 3-7 on a scale of 1-10; and a red status button 1502 indicates that the customer's credit insurance policy or policies 1702 scored 1-3 on a scale of 1-10. A user can set the ranges of percentages and scores and their corresponding colors as required to suit their specific needs and/or desires.

Figure 25:
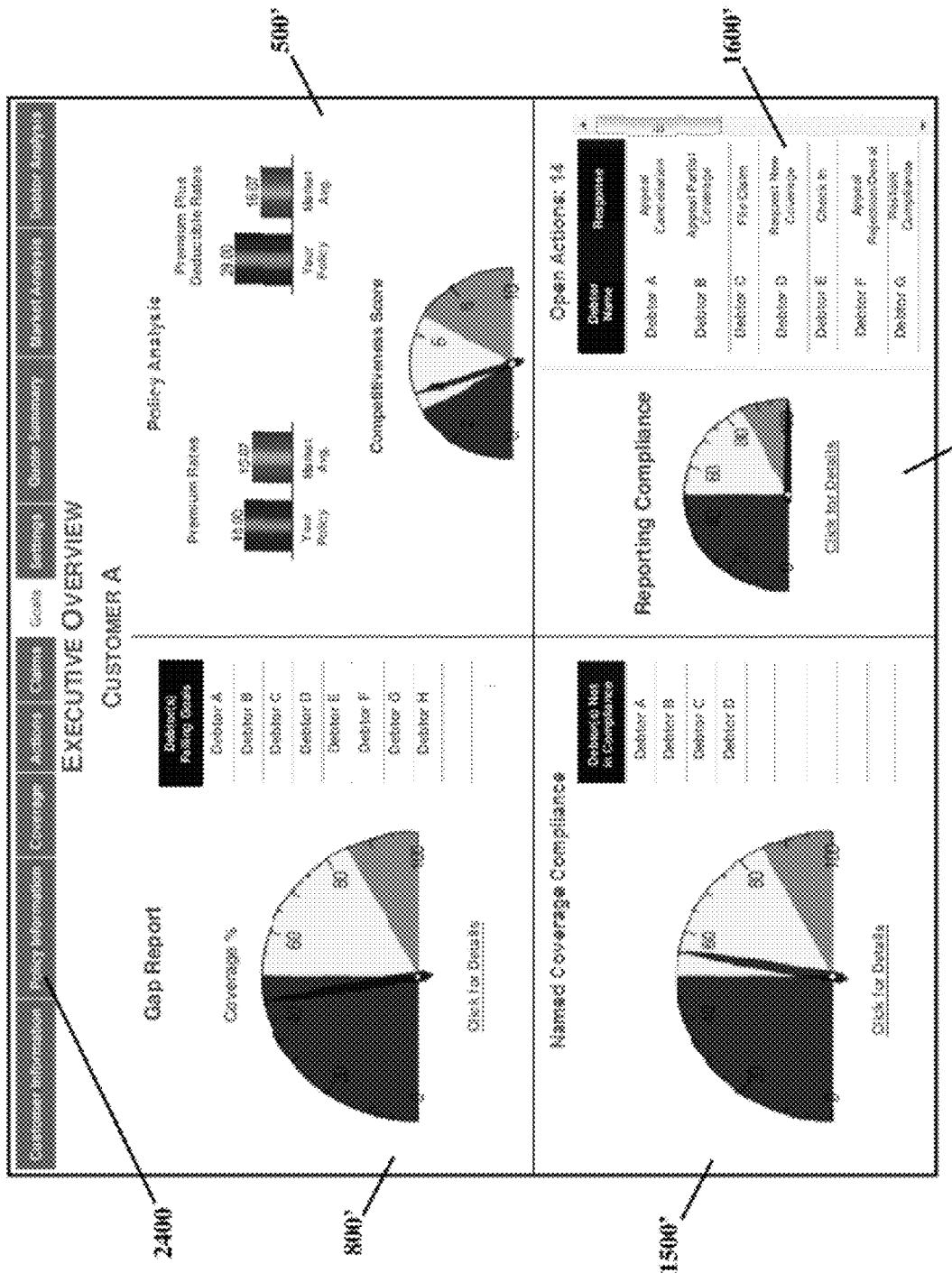
FIG. 25 is a graphical display illustrating an exemplary Executive Overview according to a non-limiting embodiment of the present invention.

Those "relative" indications will be the same as would be indicated in a semi-circular score meter 504 provided for the associated values, as discussed above with respect to the Competitiveness Report 500 (FIG. 5) and below with respect to the Executive Overview 2500 (FIG. 25). Accordingly, whatever color the needle 502 points to in one of those semi-circular score meters 504 will be the same color displayed in the corresponding status button 1502 if the user chooses to display "relative" indications in the Status Bar 2302. But because the user can choose between such "absolute" and "relative" indications for any of the headings in the Status Bar 2302, the user can choose to have "absolute" indications in the Status Bar 2302 and "relative" indications in other graphical displays (e.g., a Competitiveness Report 500 and or an Executive Overview 2500).

In addition, although some of the status buttons 1502 described above provide indications for overlapping items, they are provided as separate status buttons 1502 because they also provide indications for different items, which allows a user to make quick and intuitive determinations based on different combinations of status buttons 1502. In FIG. 23, for example, the status buttons 1502 under the "Customer Documents", "Transition Process", "Trust Calls", "Policy Reporting", "Aging Documents", and "Renewal Process" headings are green; the status buttons 1502 under the "Active Alerts" and "Policy Competitiveness" headings are yellow; and the status buttons 1502 under the "Policy Goal" and "Outstanding Actions" headings are red. Because the status buttons 1502 under the "Policy Reporting" and "Aging Documents" headings are green, a user can intuit that the red indicator button 1502 under the "Outstanding Action" heading was not caused by an unsatisfied reporting requirement or a missing AR Aging Report. And because the only other red indicator button 1502 is under the "Policy Goal Heading", the only apparent reason for the red indicator button 1502 under the "Outstanding Action" is a policy goal that is not being met.

The yellow indicator button 1502 under the "Active Alerts" heading helps a user further intuit the potential issue by indicating that the user is waiting for some Event to occur before completing whatever outstanding Action there may be with respect to the customer's Coverage Goals. And the green status button 1502 under the "Renewal Process" heading indicates that the user has indicates that all the steps required up until that point to obtain approval for a rewritten, renewed, or new credit insurance policy or policies. Accordingly, a user is awaiting approval of a rewritten, renewed, or new credit insurance policy to satisfy the policy goal that is not being met. Upon approval and purchase of that policy, the status buttons 1502 under the "Policy Goal", "Outstanding Balance", and "Active Alerts" headings should turn green.

As described in the example above, the indications of the status buttons 1502 in the Dashboard 2300 can be used to quickly and intuitively determine the state of a customer's coverage. That process can be personalized for any user by selecting different types of indications (i.e., "absolute" or "relative") for different status buttons 1502 and by selecting different combinations of processes and/or conditions (i.e., "Customer Documents", "Transition Process", "Policy Goal", etc.) to which those indications correspond. A user can further personalize its Dashboard by adding other pertinent information, such as the credit insurer 604 and credit insurance policy or policies 1702 for which state/status is being indicated by the status buttons 1502, the renewal/expiration date 2304 of that credit insurance policy or polices 1702, and the premium amount 2306 of that credit insurance policy or policies 1702. And although state/status is only being indicated for one credit insurance policy in the Dashboard 2300 of FIG. 23, a user may select any number of credit insurance policies 1702 to appear in the Dashboard 2300. Each different credit insurance policy 1702 may have its own Status Bar 2302 and status buttons 1502, they may share a Status Bar 2302 and have separate status buttons 1502, or they may share both a Status Bar 2302 and status buttons 1502, wherein the state/status indicated by those status buttons 1502 will correspond to the cumulative state/status of the different credit insurance policies 1702.

The Dashboard 2300 not only provides a central point at which a user can determine the state/status of all of the credit insurance policies to which it has access, it also provides a central point from which that user can navigate obtain additional information about the state/status of those credit insurance policies. More specifically, upon clicking on or otherwise selecting any of the status buttons 1502 in the Dashboard 2300, the applications server 102 will automatically navigate the user to a graphical display that provides more detailed information about the process and/or condition to which that status button 1502 corresponds. For example, selecting the status button 1502 under the "Policy Goal" heading may navigate the user to a Gap Report 800 (FIG. 8); selecting the status button 1502 under the "Outstanding Actions" heading may navigate the user to an Action Report 1700 (FIG. 17); selecting the status button 1502 under the "Policy Reporting" or "Aging Documents" heading may navigate the user to a Required Reporting Report 1800 (FIGS. 18 and 19); selecting the status button 1502 under the "Active Alerts" heading may navigate the user to am Issues Report 1600 (FIG. 16); selecting the status button 1502 under the "Renewal Process" heading may navigate the user to a Quote Comparison Report 600 (FIG. 6); and selecting the status button 1502 under the "Policy Competitiveness" heading may navigate the user to a Competitiveness Report 500 (FIG. 5). And when the selected status button 1502 is red or yellow, the applications server 102 will preferably navigate the user to the graphical display that corresponds to the reason that status button 1502 is red or yellow.

Figure 24:
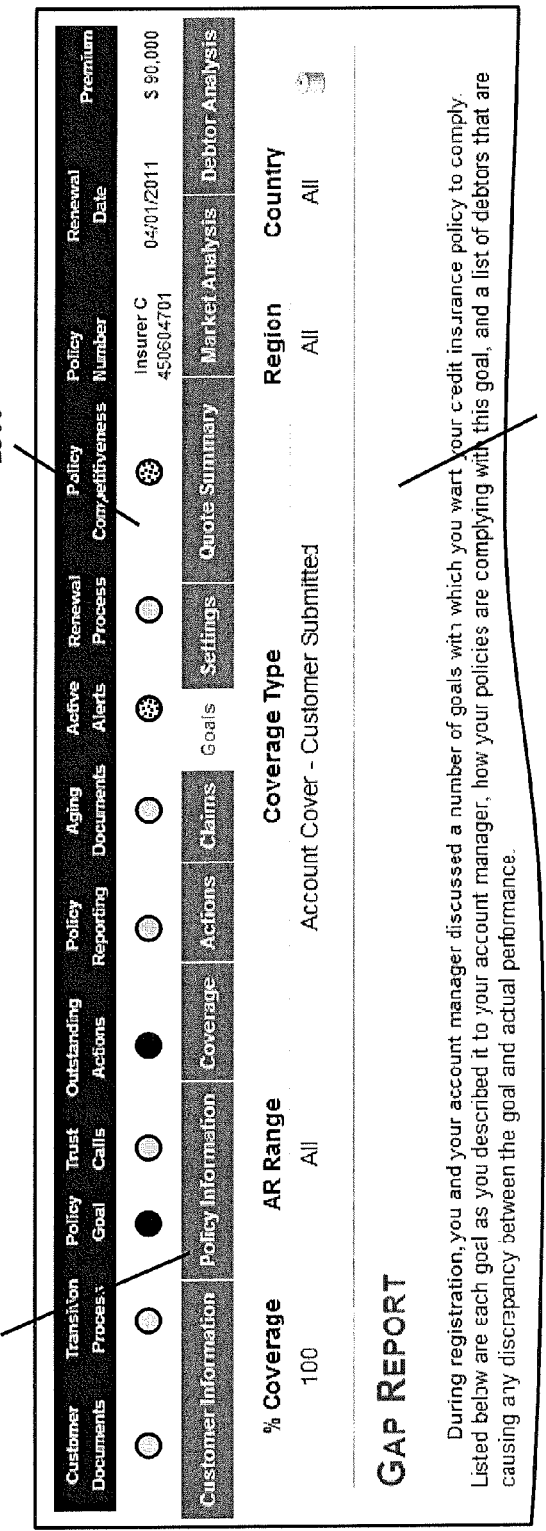
FIG. 24 is a graphical display illustrating the Dashboard of FIG. 17 and a Menu Bar provided at the top of the Gap Report of FIG. 8.

A user can configure the Dashboard 2300 so that it is displayed at the top of any graphical display that the user is viewing (e.g., Debtor Analysis Reports 200, Credit Insurer Market Analyses 300, Policy Reports 400, Competitiveness Reports 500, Quote Comparison Reports 600, Gap Reports 800, Debtor Lists 1500, Issues Reports 1600, Action Reports 1700, Required Reporting Reports 1800, etc.). In FIG. 24, for example, the Dashboard 2300 is displayed at the top of a Gap Report 800. In that way, the user can monitor the state/status of its credit insurance policy or policies 1702 at all times while working within the system 100. And because the status buttons 1502 are updated in real time, the user will see those status buttons 1502 change color as Milestones are completed while working within those different graphical displays.

As also illustrated FIG. 24, a Menu Bar 2400 may be provided at the top of any graphical display that the user is viewing. By clicking on or otherwise selecting tabs in the Menu Bar 2400, a user can navigate from one graphical display to another. For example, selecting the following tabs will navigate a user as described:

1. "Customer Information" Tab—Navigates the user to a graphical display that includes the documents and other information that define a specific customer (e.g., contacts, postal addresses, e-mail addresses, Uniform Resource Locators (URLs), sales information, business description, etc.);

2. "Policy Information" Tab—Navigates the user to a graphical display that includes the documents and other information that define that customer's credit insurance policy or policies (e.g., structure of each policy, type of each policy, coinsurance for each policy, premium for each policy, start and end date for each policy, compliance and reporting requirements for each policy, etc.);

3. "Coverage" Tab—Navigates the user to a graphical display that includes the documents and other information that define the coverage provided by that credit insurance policy or policies (e.g., Debtor Lists 1500);

4. "Actions" Tab—Navigates the user to a graphical interface that provides functionality for the user to identify and complete any Actions that need to be taken in response to any Alerts (e.g., Action Reports 1700);

5. "Claims" Tab—Navigates the user to a graphical display that includes the documents and other information that correspond to any claims the customer has filed or is filing on its credit insurance policy or policies (e.g., Actions related to a claim, similar to those provided in an Action Reports 1700, but only related to filing claims);

6. "Goals" Tab—Navigates the user to a graphical display that identifies the customer's Coverage Goals and how/whether they are being met (e.g., Gap Reports 800);

7. "Settings" Tab—Navigates the user to a graphical display that provides functionality for a user to review and input its personal preferences for how the system will operate (e.g., passwords, Coverage Goals, which alerts the customer will receive, "absolute" versus "relative" indications for status buttons 1502, which processes and/or conditions are identified in the Status Bar 2302, tabs that appear in the Menu Bar 2400, etc.);

8. "Quote Summary" Tab—Navigates the user to a graphical display that provides information on any quote requests for rewritten, renewed, or new credit insurance policies (e.g., Quote Comparison Reports 600);

9. "Market Analysis" Tab—Navigates the user to a graphical display that identifies whether one or more credit insurance policies will be able to satisfy that customer's Coverage Goals over the full effective period of desired coverage (e.g., Credit Insurer Market Analyses 300); and 10. "Debtor Analysis" Tab—Navigates the user to a graphical display that provides information that identifies the insurability of one or more debtors (e.g., Debtor Analysis Reports 200).

Although not illustrated in FIG. 24, other tabs may also be provided in the Menu Bar 2400 as desired by the user, such as a "Policy Analysis" tab that navigates the user to a graphical display that provides a comparison of the customer's credit insurance policy to market averages (e.g., Policy Reports 400) or a "Competitiveness" tab that navigates the user to a graphical display that identifies how the customer's current credit insurance policy is structured within a specific market (e.g., Competitiveness Reports 500).

Together with the Dashboard 2300, the Menu Bar 2400 allows a user to navigate from one graphical display to another within the system 100 as required to view various information, complete various tasks, and make various decisions in an effective and efficient manner. More specifically, the Dashboard 2300 and the Menu Bar 2400 allow a user to quickly identify any problems a customer is having with meeting its Coverage Goals and/or complying with the terms and conditions of its credit insurance policies and to navigate to the appropriate graphical display to take the appropriate Action to remediate those issues. The Dashboard 2300 and the Menu Bar 2400 also enable a user to quickly compare a customer's current credit insurance policy or policies against market information to determine if that policy or those policies are optimized for that customer's specific needs and/or desires. In other words, the Dashboard Functionality further streamlines the already-improved processes of the present invention.

f. Executive Summary Functionality

As FIG. 25 illustrated, the Dashboard Functionality of the present invention generates a graphical display, or Executive Overview 2500, that provides a user (e.g., a customer, broker, account manager, administrator, etc.) with a Summary view of the various other graphical displays provided by the present invention. Preferably, those summary views include less information than the graphical displays they represent so as to provide a simple visual summary of the information in those graphical displays, such as in the form of bar charts or scaled meters. One or more of those summary views may also include all of the same information provided in the graphical displays they represent. And one or more of those views may also summarize data for a plurality of graphical displays of a similar type. A user can select what information from what graphical displays are provided in the Executive Overview 2500 as required to suit its needs and/or desires.

In FIG. 25, for example, the user has elected to display in a summary view 500' all of the information from a Competitiveness Report 500; the user has elected to display in a summary view 800' the actual coverage provided 806 and a list of debtors 802 without the desired amount of coverage from a Gap Report 800, further electing to display the actual coverage provided 806 on a on a color-coded, semi-circular score meter rather than as a numerical value; the user has elected to display in a summary view 1500' the percentage of debtors in compliance with their respective credit insurance policies and a list debtors that are not in compliance from a Debtor List 1500, further electing to display that percentage on a on a color-coded, semi-circular score meter rather than as a numerical value; the user has elected to list in a summary view 1600' a plurality of Actions with "Open" action items from a plurality of the customer's Issues Reports 1600; and the user has elected to display in a summary view 1500' the percentage of a customer's reporting requirements have been satisfied from one or more Required Reporting Reports 1800, further electing to display that percentage only for Named Debtor policies. The user can click on or otherwise select the "Click for Details" link within the Gap Report 800 summary view 800', the Debtor List 1500 summary view 1500', and the Required Reporting Reports 1800 summary view 1800' to view the information not included in those views. And the user can click on or otherwise select any one of the action items listed in the Issues Reports 1600 summary view 1600' to access the Action Report 1700 for that action item. Accordingly, the Executive Overview 2500 provides similar drill down functionality to the Dashboard 2300 and the Menu Bar 2400, allowing the user to quickly navigate from one graphical display to another as required to optimize a customer's credit insurance policy or policies.

V. Brokerage Module

The Brokerage Module provides functionality to a user for generating aggregated statistical information on a plurality of different customers and their respective credit insurance policies. That information can be used by brokers, partners, and other organizations with access to multiple customers' credit insurance policies to assist them with the management of their territories, their account managers, and the representatives managing their customers' accounts. That information is generated and provided to such users in a graphical display, or report, at a user interface 106. Such graphical displays preferably include tables and/or graphs that summarize the information the user has selected to view.

A user can select the specific information that will be provided in each of those graphical displays from any of the data captured by the applications server 102 (e.g., customer information, credit insurer information, accounts receivable information, credit insurance policy information, market information, etc.). That information will be used to populate rows and columns in a table and/or to generate graphs. And the user can select how that data is arranged/presented in the table and/or graph by selecting one type of information as reference data and selecting other types of data as the related data. The reference data will form the first column, or reference column, of a table and/or the reference axis of a graph, and the related data will form the adjacent columns, or quantity columns, of a table and/or the quantities displayed in a graph, with descriptions of each of those types of information forming the top row, or header row, of the table and/or the legends of the graph. And the user can select the reference column and/or header row of the table to be different than the reference axis and/or legends of the graph in each graphical display. A user can also select how that information is filtered and sorted within each of those graphical displays.

Figure 26:
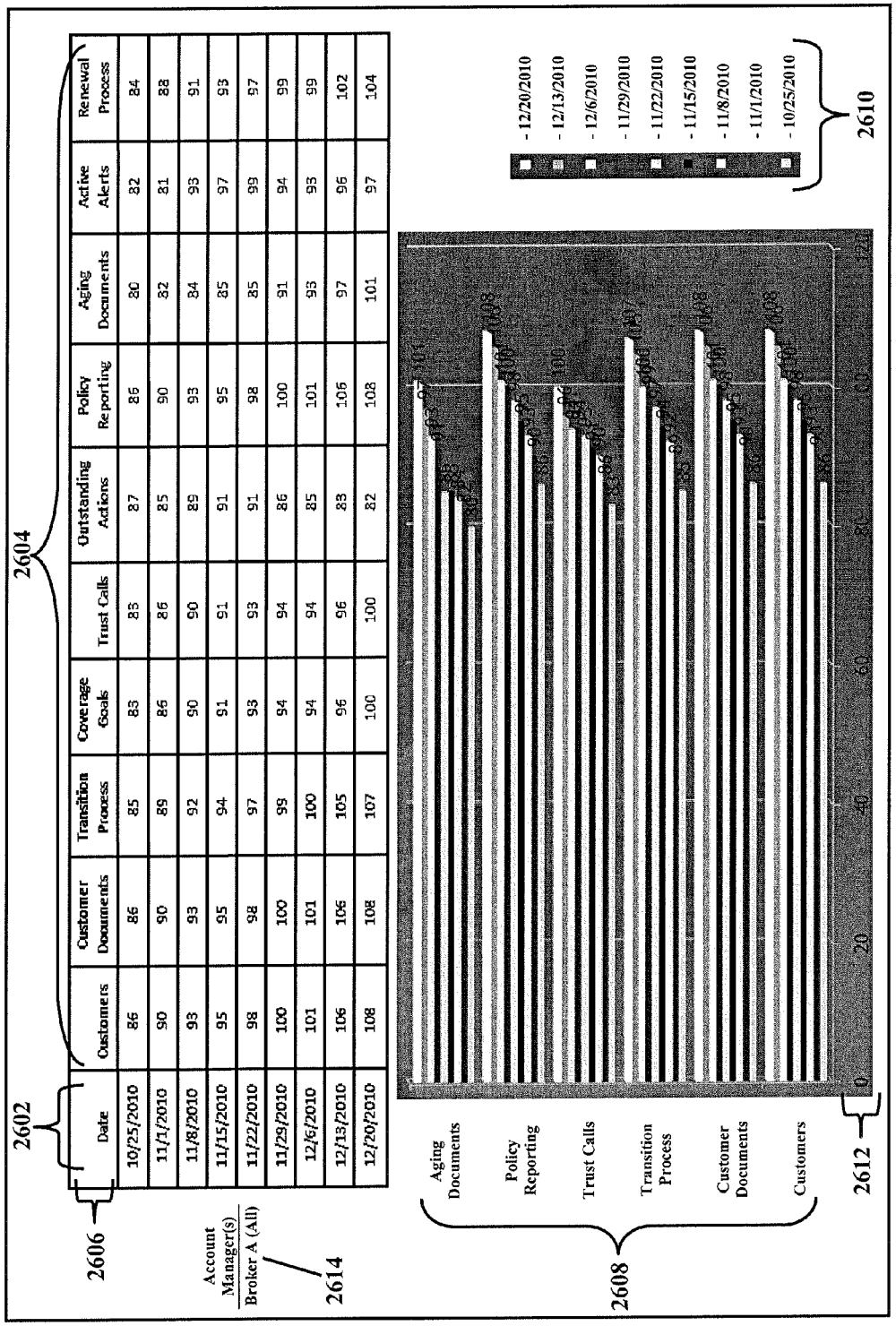
FIG. 26 is a graphical display illustrating an exemplary Broker Report according to a non-limiting embodiment of the present invention.

In FIG. 26, a user has created a graphical display, or Broker Report 2600, that provides data on how well a plurality of account managers are performing according to the broker that is managing them. And in FIG. 27, a user has created a graphical display, or Account Manager Report 2700, that provides data on how well a specific account manager is performing. More specifically, the user has created graphical displays 2600 and 2700 that provide aggregated summary data on how well various account managers are keeping up with completing the tasks required to satisfy their respective customers' Coverage Goals and to keep those customers in compliance with their respective credit insurance policies. That summary data has been aggregated on a week-to-week basis.

Figure 27:
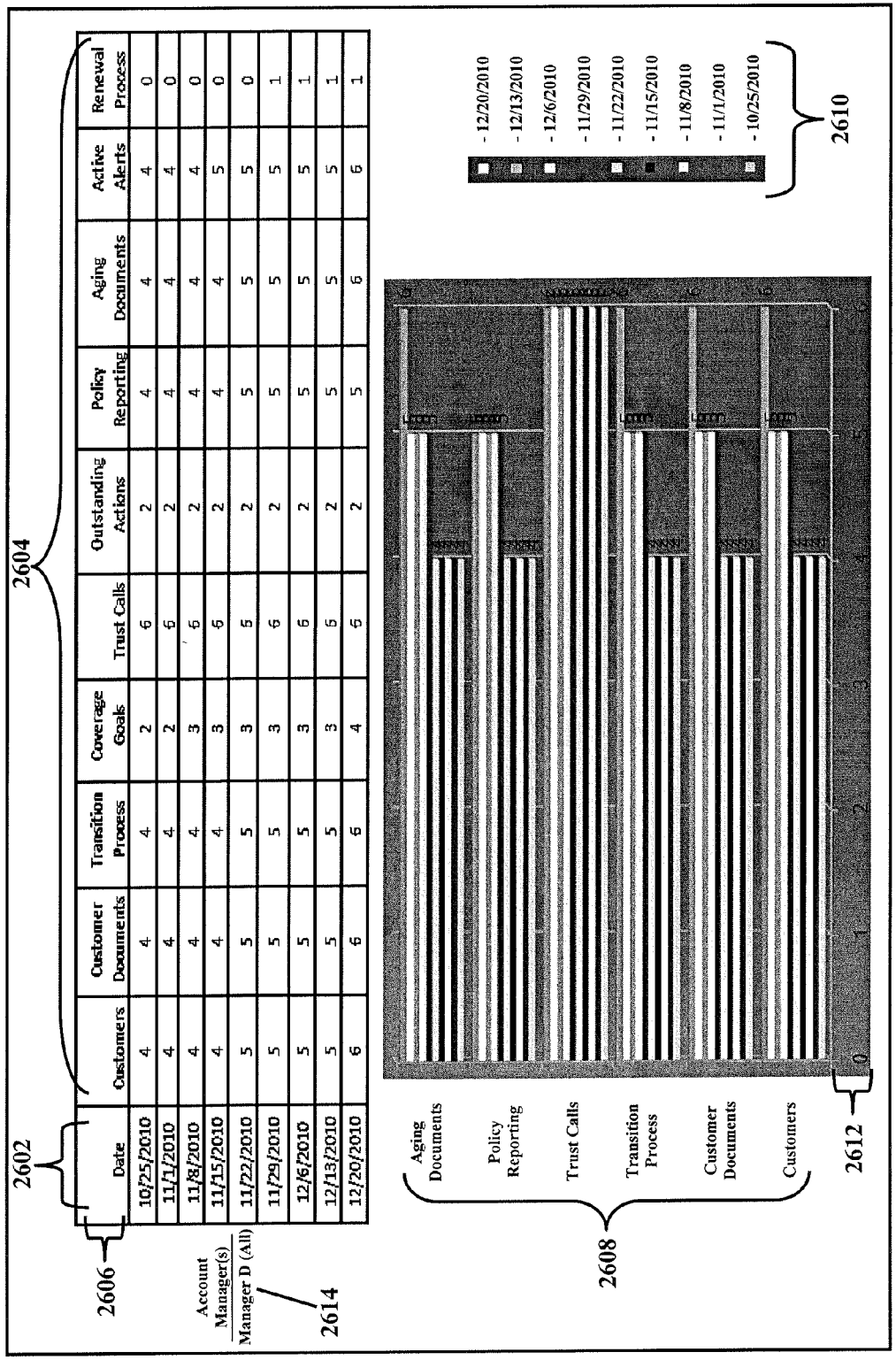
FIG. 27 is a graphical display illustrating an exemplary Account Manager Report according to a non-limiting embodiment of the present invention.

To aggregate the data in FIGS. 26 and 27 on a week-to-week basis, the user has selected the information type for the reference column 2602 of a table as weekly dates and has selected the information type for the quantity columns 2604 of the table as the quantity of customers for which the corresponding account managers are responsible; the quantity of documents required to manage those customers' credit insurance policy or policies that have been acquired, uploaded, and stored; the quantity of required processes that have been followed for introducing those customers and/or their credit insurance policy or polices into the system 100 of the present invention; the quantity of those customers' Coverage Goals that are being met; the quantity of status calls that have occurred as required for compliance with those customers' credit insurance policies; the quantity of outstanding Actions that need to be taken to satisfy those customers' Coverage goals and/or to bring those customers back into compliance with their credit insurance policies; the quantity of reporting requirements for those customers that have been met; the quantity of AR Aging reports that have been acquired, uploaded, and stored for those customers; the quantity of Alerts for those customers that still include Milestones that need to be completed; and the quantity of policy renewal requests that have been submitted for those customers. The data in the quantity columns 2604 is aggregated and displayed according to the corresponding date in the reference column 2602. And a description of the data in each of those columns 2602 and 2604 is provided in a header row 2606 (i.e., "Date", "Customers", "Customer Documents", "Transition Process", "Coverage Goals", "Trust Calls", "Outstanding Actions", "Policy Reporting", "Aging Documents", "Active Alerts", and "Renewal Process", respectively).

Also in FIGS. 26 and 27, the user has selected the information type for the legends 2608 of graph as the weekly dates and has selected the information type for the plotted quantities 2610 of the table as the quantity of customers for which the corresponding account managers are responsible; the quantity of documents required to manage those customers' credit insurance policy or policies that have been acquired, uploaded, and stored; the quantity of required processes that have been followed for introducing those customers and/or their credit insurance policy or polices into the system 100 of the present invention; the quantity of status calls that have occurred as required for compliance with those customers' credit insurance policies; the quantity of reporting requirements for those customers that have been met; and the quantity of AR Aging reports that have been acquired, uploaded, and stored for those customers. The quantities 2612 plotted in the graph correspond to the quantities in the table for those types of information. But all of the data provided in the table need not be plotted in the graph. Instead, as illustrated in FIGS. 26 and 27, the user can select the specific data from the table that will be plotted in the graph. In that way, the user can obtain both a tabular and graphical representation of various data.

Although the table and graph in FIGS. 26 and 27 display data for the same types of information, they display different data based on different filtering options 2614. In the Broker Report 2600 of FIG. 26, for example, the user has selected to view all of the data for all of the account managers for which Broker A is responsible (i.e., Account Manager(s): Broker A (All)). And in the Account Manager Report 2700 of FIG. 27, the user has selected to view all of data for only Manager D (i.e., Account Manager(s): Manage D (All)). The user may also filter that data by any other logical grouping (e.g., organization, region, country, area, policy type, etc), such as by the Named credit insurance policies managed by a specific broker (e.g., Account Manager(s): Broker A (Named)). Moreover, a customer can sort the data within each table after it is created based on the content of the data provided in different columns 2602 and 2604 (e.g., alphabetically, numerically, temporally, etc.). In FIGS. 26 and 27, the data is sorted temporally based on the dates in the reference column 2602, but they may also be sorted by the quantities in any of the quantity columns 2604.

In addition, although the graph in FIGS. 26 and 27 is a bar graph, any other suitable graph may be generated as desired by the user. For example, the user can choose to create pie charts and line graphs similar to those illustrated in FIGS. 2-5. Accordingly, the user can also use the Brokerage Module to create tables and graphs for a plurality of customers that include similar information to that described with respect to FIGS. 2-5.

In FIG. 28, a user has created a graphical display, or Carrier Summary 2800, that provides data on the various credit insurance policies under its control. More specifically, the user has created a graphical display 2800 that provides aggregated summary data on the number customers with credit insurance policies from different credit insurers as well as the average and total values for the premiums paid on those policies. That graphical display 2800 also provides data on which of those credit insurance policies are new policies and when those new policies were obtained. That data has been aggregated for each of a plurality of credit insurers, with the totals 2802 for all of the corresponding quantities being provided at the bottom of each quantity column 2604.

The Carrier Summary 2800 of FIG. 28 can be created in substantially the same manner described above with respect to the Broker Report 2600 of FIG. 26 and the Account Manager Report 2700 of FIG. 27. In the Carrier Summary 2800 of FIG. 28, however, the user has not selected a filtering option 2614, so the data provided includes information for the credit insurance policies of all the brokers, account managers, etc. for which that user is responsible. In addition, the user has defined two different types of quantity columns 2604—one for "Total Policies" and one for "New Policies". A user can create different types of quantity columns 2604 by grouping those columns 2604 as they are selected and naming those groups. The names of those groups will appear in a separate header row 2606' so as to properly identify those groups, as illustrated in FIG. 28. A user can group rows in a similar manner.

In FIG. 29, a user has created a graphical display, or Activity Summary 2900, that provides data on the Actions being taken on the various credit insurance policies under its control. More specifically, the user has created a graphical display 2900 that provides aggregated summary data on the number of cancellations, claims denials, and coverage reductions have been appealed in the credit insurance policies for which that user is responsible. That graphical display 2900 also provides aggregated summary data on the number of requests for new credit limits and the number of claims filed on those credit insurance policies. That data has been aggregated based on the status of those Actions (i.e., "Open," "Successful", or "Unsuccessful"), with the totals for all of the corresponding quantities being provided at the bottom of each quantity column 2604. The user has not selected a filtering option 2614.

The Activity Summary 2900 of FIG. 29 can be created in substantially the same manner described above with respect to the Broker Report 2600 of FIG. 26, the Account Manager Report 2700 of FIG. 27, and the Carrier Summary 2800 of FIG. 28. In the Activity Summary 2900 of FIG. 29, however, the user has further selected to add a custom row 2902 in which the percentage of "Successful" Actions is provided. A user can create custom rows 2902 by defining equations that use cells from the reference column 2602 and/or the quantity columns 2604 to calculate a desired value e.g., ["Successful" Row/("Successful" Row+"Unsuccessful" Row)* 100]= "Success %"). The user can name such custom rows 2902 to describe the result of that equation (e.g., "Success %"), with the corresponding name appearing in the reference column 2602. The user can define custom columns (not shown) in a similar manner as required to suit its needs and/or desires. Accordingly, the Brokerage Module not only provides functionality for a user to create graphical displays that include any of the data captured by the applications server 102, it also provides functionality for a user to manipulate that data with user-defined equations and to display the results of those equations.

In FIG. 30, a user has created a graphical display, or Renewal Summary 3000, that provides renewal data for the various credit insurance policies under its control. More specifically, the user has created a graphical display 3000 that provides aggregated summary data on the number of credit insurance policies coming up for renewal in the next thirty, sixty, or ninety days. That graphical display 3000 also provides aggregated summary data on the number credit insurance policies for which renewals have been completed in the past thirty days as well as the number of credit insurance policies for which renewal was not sought and/or obtained. That data has been aggregated for each of a plurality of credit insurers, with the totals for all of the corresponding quantities being provided at the bottom of each quantity column 2604. The user has not selected a filtering option 2614.

The Renewal Summary 3000 of FIG. 30 can be created in substantially the same manner described above with respect to the Broker Report 2600 of FIG. 26, the Account Manager Report 2700 of FIG. 27, the Carrier Summary 2800 of FIG. 28, and the Activity Summary 2900 of FIG. 29. Accordingly, a user can add additional quantity columns 2604 (e.g., adding "Number of Customers", "Average Premium", and "Total Premium" columns), remove quantity columns 2604 (e.g., removing the "Non-Renewals" column), and/or combine quantity columns 2604 (e.g., combining the "Next 30 Days", "Next 60 Days", and "Next 90 Days" columns in the Renewal Summary 3000 into a single "Next 90 Days" column that includes all of the credit insurance policies coming due in the next ninety days) as required to suit its needs and/or desires. The user can also separate the information in the Renewal Summary 3000 into separate groups that are identified by a separate header row 2606' and/or add custom rows 2902 or custom columns the Renewal Summary 3000.

In FIG. 31, a user has created a graphical display, or Coverage Stability Summary 3100, that provides data on the propensity of a credit insurer to provide and maintain credit limits on debtors. More specifically, the user has created a graphical display 3100 that provides aggregated summary data on the number of customers, the number of requests for coverage filed by those customers, the number of claims filed by those customers, and the number of those claims that were paid. That graphical display 3100 also provides aggregated summary data on the number of cancellations, reductions, denials, and partial approvals of coverage. That data has been aggregated for a specific time period (i.e., Jan. 1, 2010, through Dec. 31, 2010) and includes the associated dollar amounts and percentages for each of those items of data. As FIG. 31 illustrates, although Insurer C has not canceled many credit limits (i.e., Percent Cancelled=5.7%) or denied many claims (i.e., Percent Denied=12.5%), coverage appears somewhat difficult to obtain from that credit insure (i.e., Percent Denied=46.7% and Percent Partially Approve=24.4%, leaving only 29.9% fully approved).

Each of the graphical displays 2600, 2700, 2800, 2900, 3000, and 3100 discussed above can be customized by a user as required to suit its needs and/or desires using the functionality of the Broker Module. For example, the user can select any data captured by the applications server 102 to display, group columns and rows of data, create custom columns and rows of data, add/remove/combine columns and rows of data, and add and/or remove different types of graphs in each of those graphical displays 2600, 2700, 2800, 2900, 3000, and 3100. And because the user can do that for a plurality of different customers, the Broker Module is particularly useful for performing statistical analyses of the activities of brokers and the account managers that those brokers manage. But, while that functionality is described as being provided in the Broker Module, that description is of a preferred embodiment. Accordingly, it should be understood that the functionality in the Broker Module may also be provided in any other software modules and/or shared between any of number of software modules without departing from the spirit of the present invention.

VI. Summary

Together, the Marketplace Module, the Goal/Compliance Module, and the Broker Module provide the functionality required to efficiently and effectively optimize credit insurance policies. More particularly, that functionality enables potential policyholders to obtain and maintain credit insurance policies with the maximum amount of coverage desired, the maximum payability of covered claims, and the maximum coverage available relative to the premium paid. And that functionality operates in real time to ensure that those credit insurance policies remain optimized by immediately identifying any Events that might affect optimization and alerting a user of those Events so the user can take the appropriate Action required to return its policy or policies to the optimized state. Moreover, that functionality provides automated processes for automatically implementing the appropriate steps for taking those Actions and/or for walking the user through the appropriate steps for taking those Actions. And if the present invention is not able to automate or walk a user through those steps, the system 100 of the present invention is supported by over two hundred back office servicing people around the world that will help the user identify and take those steps.

In practice, the present invention has proven very successful in maintaining optimization of credit insurance policies. For example, the present invention has been used to overturn 62% of coverage cancellations and 68% of coverage denials. And approximately 91.5% of claims filed via the system 100 of the present invention were paid as compared to an industry average of 65%. Those improved results were achieved because the present invention takes a proactive approach to monitoring compliance issues instead of waiting until after a claim is denied to negotiate with a carrier and appeal a decision.

In addition, there are over eighteen vendors worldwide that offer credit insurance and other types of accounts receivable protection. Accordingly, the task of looking at all options and combinations of options to ensure the optimal value of a customer's coverage would be near impossible without the automated functionality of the present invention. Moreover, allowing customers to choose from all of those options and combinations of options forces the carriers to compete for customers' business.

The foregoing description and drawings should be considered as illustrative only of the principles of the invention. The invention may be configured in a variety of ways and is not intended to be limited by the preferred embodiment. And numerous applications of the invention will readily occur to those skilled in the art. It is therefore not desired to limit the invention to the specific examples disclosed or the exact construction and operation shown and described. Rather, all suitable modifications and equivalents may be resorted to, falling within the scope of the invention.

What is claimed is:

1. An apparatus for optimizing one or more of a customer's insurance policies:
   a processing device that imports the various terms and conditions from one or more insurer systems and imports accounts receivable information from one or more customer systems, the processing device being in electronic data communication with the one or more insurer systems and the one or more customer systems via a network connection;
   a compliance module that instructs the processing device to import the various terms and conditions from the one or more insurer systems, imports the accounts receivable information from the one or more customer systems, identifies overdue accounts receivable and time periods for which those accounts receivable have been overdue, compares the terms and conditions to the time periods to determine if the customer is not in compliance with any of one of the various terms and conditions, and generates an alert when the customer is not in compliance with any one of the various terms and conditions; and
   a graphical user interface in electronic data communication with the processing device that generates a graphical display that includes the overdue accounts receivable identified by the processing device,
   wherein the accounts receivable information corresponds to one or more of the customer's debtors,
   wherein the various terms and conditions identify a deadline for filing a claim on the overdue accounts receivable for the one or more debtors, and
   wherein the compliance module instructs the processing device to electronically submit a claim to one or more insurers via the one or more insurer systems as the time period for the overdue accounts receivable for the one or more debtors covered by the one or more insurers comes within a predetermined number of days from the deadline for filing the claim.

2. The apparatus of claim 1, wherein the graphical user interface generates a graphical display that includes the number of days from the deadline for filing the claim.

3. The apparatus of claim 1, wherein the compliance module instructs the processing device to generate an alert that notifies the customer and/or a broker managing the customer's one or more insurance policies that the number of days from the deadline for filing the claim has come within the predetermined number.

4. The apparatus of claim 3, wherein the graphical user interface generates a graphical display that includes a selectable button that can be clicked on or otherwise selected by the customer and/or broker to instruct the processing device to electronically submit the claim to the one or more insurers via the one or more insurer systems.

5. The apparatus of claim 1, wherein
   the accounts receivable information corresponds to one or more of the customer's debtors,
   wherein the various terms and conditions identify a deadline for submitting a notification to one or more insurers that the one or more debtors have disputed an invoice and/or entered protracted default, and
   wherein the compliance module instructs the processing device to electronically submit a notification to the one or more insurers via the one or more insurer systems as the time period for the overdue accounts receivable for the one or more debtors covered by the one or more insurers comes within a predefined time of the deadline for filing the notification.

6. The apparatus of claim 5, wherein the graphical user interface generates a graphical display that includes numbers of days for which the one or more debtors' accounts receivable have been overdue and a corresponding value of the accounts receivable that have been overdue for those numbers of days.

7. The apparatus of claim 6, wherein the graphical user interface generates a graphical display that includes a disputed amount of the one or more debtors' accounts receivable that have been overdue.

8. The apparatus of claim 7, wherein the compliance module instructs the processing device to receive input from a user to define the disputed amount and to electronically submit that disputed amount to the one or more insurers as part of the notification.

9. The apparatus of claim 8, wherein the graphical user interface generates a graphical display that includes an approved amount of the disputed amount, the approved amount being approved by the one or more insurers in response to the notification.

10. The apparatus of claim 5, wherein the compliance module instructs the processing device to generate an alert that notifies the customer and/or a broker managing the customer's one or more insurance policies that the number of days from the deadline for filing the notification has come within the predetermined number.

11. The apparatus of claim 10, wherein the graphical user interface generates a graphical display that includes a selectable button that can be clicked on or otherwise selected by the customer an tor broker to instruct the processing device to electronically submit the notification to the one or more insurers via the one or more insurer systems.

12. A method for optimizing one or more of a customer's insurance policies, the method being embodied on a computer-readable media and executed by a processing device in electronic data communication with one or more insurer systems and one or more customer systems via a network connection, the method comprising the steps of:
    importing various terms and conditions from the one or more insurer systems;
    importing accounts receivable information from the one or more customer systems;
    identifying overdue accounts receivable and time periods for which those accounts receivable have been overdue;
    comparing the terms and conditions to the time periods to determine if the customer is not in compliance with any of one of the various terms and conditions;
    generating an alert when the customer is not in compliance with any one of the various terms and conditions; and
    generating a graphical display on a graphical user interface that includes the overdue accounts receivable identified by the processing device, wherein:
    the accounts receivable information corresponds to one or more of the customer's debtors;
    the various terms and conditions identify a deadline for filing a claim on the overdue accounts receivable for the one or more debtors; and
    the method further comprises the step of electronically submitting a claim to one or more insurers via the one or more insurer systems as the time period for the overdue accounts receivable for the one or more debtors covered by the one or more insurers comes within a predetermined number of days from the deadline for filing the claim.

13. The method of claim 12, further comprising the step of generating a graphical display on the graphical user interface that includes the number of days from the deadline for filing the claim.

14. The method of claim 12, wherein the step of generating an alert includes notifying the customer and/or a broker managing the customer's one or more insurance policies that the number of days from the deadline for filing the claim has come within the predetermined number.

15. The method of claim 14, further comprising the step of generating a graphical display on the graphical user interface that includes a selectable button that can be clicked on or otherwise selected by the customer and/or broker to instruct the processing device to electronically submit the claim to the one or more insurers via the one or more insurer systems.

16. The method of claim 12,
    the accounts receivable information corresponds to one or more of the customer's debtors;
    the various terms and conditions identify a deadline for submitting notification to one or more insurers that the one or more debtors have disputed an invoice and/or entered protracted default; and
    the method further comprises the step of electronically submitting a notification to the one or more insurers via the one or more insurer systems as the time period for the overdue accounts receivable for the one or more debtors covered by the one or more insurers comes within a predefined time of the deadline for filing the notification.

17. The method of claim 16, further comprising the step of generating a graphical display on the graphical user interface that includes numbers of days for which the one or more debtors' accounts receivable have been overdue and a corresponding value of the accounts receivable that have been overdue for those numbers of days.

18. The method of claim 17, further comprising the step of generating a graphical display on the graphical user interface that includes a disputed amount of the one or more debtors' accounts receivable that have been overdue.

19. The method of claim 18, further comprising the step of receiving input from a user to define the disputed amount, wherein the step of electronically submitting a notification to the one or more insurers includes electronically submitting that disputed amount to the one or more insurers as part of the notification.

20. The method of claim 19, further comprising the steps of:
    receiving approval of at least a portion the disputed amount from the one or more insurers in response to the notification; and
    generating a graphical display on the graphical user interface that includes the approved portion of the disputed amount.

21. The method of claim 16, wherein the step of generating an alert includes notifying the customer and/or a broker managing the customer's one or more insurance policies that the number of days from the deadline for filing the notification has come within the predetermined number.

22. The method of claim 21, further comprising the step of generating a graphical display on the graphical user interface that includes a selectable button that can be clicked on or otherwise selected by the customer and/or broker to instruct the processing device to electronically submit the notification to the one or more insurers via the one or more insurer systems.

* * * * *